US012438865B2

(12) United States Patent
Ead et al.

(10) Patent No.: US 12,438,865 B2
(45) Date of Patent: Oct. 7, 2025

(54) ARCHITECTURE AND SERVICES PROVIDED BY A MULTI-CLOUD INFRASTRUCTURE

(71) Applicant: Oracle International Corporation, Redwood Shores, CA (US)

(72) Inventors: Mostafa Gaber Mohammed Ead, West Vancouver (CA); Shobhank Sharma, Kirkland, WA (US); Norka Beatriz Lucena Mogollon, Kirkland, WA (US)

(73) Assignee: Oracle International Corporation, Redwood Shores, CA (US)

( * ) Notice: Subject to any disclaimer, the term of this patent is extended or adjusted under 35 U.S.C. 154(b) by 176 days.

(21) Appl. No.: 18/486,402

(22) Filed: Oct. 13, 2023

(65) Prior Publication Data

US 2024/0126848 A1 Apr. 18, 2024

Related U.S. Application Data

(60) Provisional application No. 63/471,573, filed on Jun. 7, 2023, provisional application No. 63/469,763, filed
(Continued)

(51) Int. Cl.
 *H04L 9/40* (2022.01)
 *G06F 9/455* (2018.01)
(Continued)

(52) U.S. Cl.
 CPC ...... *H04L 63/0815* (2013.01); *G06F 9/45558* (2013.01); *G06F 21/31* (2013.01);
(Continued)

(58) Field of Classification Search
 CPC .... H04L 63/107; H04L 63/0807; H04L 67/10
 See application file for complete search history.

(56) References Cited

U.S. PATENT DOCUMENTS 8,510,426 B2 8/2013 Mercuri
9,071,605 B2 6/2015 Ishino
(Continued)

FOREIGN PATENT DOCUMENTS

WO 2014039772 A1 3/2014
WO 2014039918 A1 3/2014
(Continued)

OTHER PUBLICATIONS

U.S. Appl. No. 17/738,988, "Notice of Allowance", Apr. 28, 2023, 7 pages.
(Continued)

*Primary Examiner* — Michael Won
(74) *Attorney, Agent, or Firm* — Kilpatrick Townsend & Stockton, LLP

(57) ABSTRACT

Techniques are described for providing a multi-cloud control plane (MCCP) in a first cloud infrastructure (included in a first cloud environment provided by a first cloud services provider) that enables services and/or resources provided in the first cloud infrastructure to be utilized by users of a second cloud environment, where the second cloud environment is different than the first cloud environment. The multi-cloud infrastructure enables a user associated with an account with a second cloud services provider to use, from the second cloud infrastructure, a first service from the set of one or more cloud services. The multi-cloud infrastructure creates a link between the account with the second cloud service provider and a tenancy created in the first cloud infrastructure for enabling using the first service by the user.

20 Claims, 17 Drawing Sheets

Related U.S. Application Data on May 30, 2023, provisional application No. 63/468,739, filed on May 24, 2023, provisional application No. 63/467,241, filed on May 17, 2023, provisional application No. 63/464,903, filed on May 8, 2023, provisional application No. 63/416,042, filed on Oct. 14, 2022.

(51) Int. Cl.
*G06F 21/31* (2013.01)
*H04L 12/46* (2006.01)
*H04L 12/66* (2006.01)
*H04L 41/0806* (2022.01)
*H04L 47/125* (2022.01)
*H04L 47/70* (2022.01)
*H04L 61/256* (2022.01)
*H04L 67/141* (2022.01)

(52) U.S. Cl.
CPC .......... *H04L 12/4633* (2013.01); *H04L 12/66* (2013.01); *H04L 41/0806* (2013.01); *H04L 47/125* (2013.01); *H04L 47/82* (2013.01); *H04L 61/256* (2013.01); *H04L 67/141* (2013.01); *G06F 2009/4557* (2013.01); *G06F 2009/45587* (2013.01); *G06F 2009/45595* (2013.01)

(56) References Cited

U.S. PATENT DOCUMENTS

| | | | |
|---|---|---|---|
| 9,699,114 | B1 | 7/2017 | Hintermeister et al. |
| 10,097,372 | B2 | 10/2018 | Bhattacharya et al. |
| 10,142,160 | B1 | 11/2018 | Adams et al. |
| 10,355,989 | B1 | 7/2019 | Panchal et al. |
| 10,382,401 | B1 | 8/2019 | Lee et al. |
| 10,671,360 | B1 | 6/2020 | Todd et al. |
| 10,680,831 | B2 | 6/2020 | Abraham |
| 10,735,263 | B1 | 8/2020 | Mcalary et al. |
| 10,965,497 | B1 | 3/2021 | Tregenza Dancer |
| 10,992,576 | B1 | 4/2021 | Panchal et al. |
| 11,010,191 | B1 | 5/2021 | Hornbeck |
| 11,057,350 | B2 | 7/2021 | Janakiraman et al. |
| 11,082,487 | B1 | 8/2021 | Jain et al. |
| 11,102,074 | B2 | 8/2021 | Hooda et al. |
| 11,134,146 | B2 | 9/2021 | Iyer et al. |
| 11,169,974 | B1 | 11/2021 | Brunzema et al. |
| 11,216,309 | B2* | 1/2022 | Piercey ............... G06F 9/45558 |
| 11,218,421 | B1 | 1/2022 | Khan et al. |
| 11,388,227 | B1 | 7/2022 | Sun et al. |
| 11,411,771 | B1 | 8/2022 | Dawani et al. |
| 11,412,051 | B1 | 8/2022 | Chiganmi et al. |
| 11,552,930 | B2 | 1/2023 | Iqbal et al. |
| 11,658,890 | B1 | 5/2023 | Cherkas |
| 11,695,697 | B2 | 7/2023 | Hira |
| 11,734,044 | B2 | 8/2023 | Berry et al. |
| 11,916,775 | B1 | 2/2024 | Thakore et al. |
| 11,979,277 | B2 | 5/2024 | Choi et al. |
| 12,021,743 | B1 | 6/2024 | Shevade et al. |
| 12,041,058 | B2* | 7/2024 | Ramachandran ... H04L 63/0815 |
| 12,101,222 | B2 | 9/2024 | Choi et al. |
| 12,149,380 | B2 | 11/2024 | Choi et al. |
| 12,204,955 | B2 | 1/2025 | Kondratiev et al. |
| 12,206,657 | B2* | 1/2025 | Nagaraja ............... H04L 9/3213 |
| 12,301,556 | B2 | 5/2025 | Nagaraja et al. |
| 2004/0024899 | A1 | 2/2004 | Sturrock et al. |
| 2006/0236382 | A1 | 10/2006 | Hinton et al. |
| 2012/0124211 | A1 | 5/2012 | Kampas et al. |
| 2013/0024926 | A1 | 1/2013 | Sakayama et al. |
| 2013/0185413 | A1 | 7/2013 | Beaty et al. |
| 2013/0238785 | A1 | 9/2013 | Hawk et al. |
| 2014/0006580 | A1 | 1/2014 | Raghu |
| 2014/0059226 | A1 | 2/2014 | Messerli et al. |
| 2014/0075565 | A1 | 3/2014 | Srinivasan et al. |
| 2014/0108474 | A1 | 4/2014 | David et al. |
| 2014/0164942 | A1 | 6/2014 | Lemarquand et al. |
| 2014/0280738 | A1 | 9/2014 | Kölker et al. |
| 2015/0052525 | A1 | 2/2015 | Raghu |
| 2015/0124586 | A1 | 5/2015 | Pani |
| 2015/0281067 | A1 | 10/2015 | Wu |
| 2015/0281316 | A1* | 10/2015 | Bragstad ................. H04L 65/80 709/224 |
| 2015/0326467 | A1 | 11/2015 | Fullbright et al. |
| 2016/0088092 | A1 | 3/2016 | Cardona-Gonzalez et al. |
| 2016/0105392 | A1 | 4/2016 | Thakkar et al. |
| 2016/0105393 | A1 | 4/2016 | Thakkar et al. |
| 2016/0124722 | A1 | 5/2016 | Mathew et al. |
| 2016/0142409 | A1 | 5/2016 | Frei et al. |
| 2016/0218939 | A1 | 7/2016 | Tiwari |
| 2016/0337473 | A1 | 11/2016 | Rao |
| 2016/0352862 | A1 | 12/2016 | Bergeson et al. |
| 2017/0063674 | A1 | 3/2017 | Maskalik et al. |
| 2017/0097841 | A1 | 4/2017 | Chang et al. |
| 2017/0134237 | A1 | 5/2017 | Yang et al. |
| 2017/0155639 | A1 | 6/2017 | Hu et al. |
| 2017/0214550 | A1 | 7/2017 | Kumar et al. |
| 2017/0244598 | A1 | 8/2017 | Crouse |
| 2017/0339176 | A1 | 11/2017 | Backer et al. |
| 2017/0346686 | A1 | 11/2017 | Mudigonda |
| 2018/0062920 | A1 | 3/2018 | Srinivasan et al. |
| 2018/0063176 | A1 | 3/2018 | Katrekar et al. |
| 2018/0063193 | A1 | 3/2018 | Chandrashekhar et al. |
| 2018/0069787 | A1 | 3/2018 | Hill et al. |
| 2018/0084010 | A1 | 3/2018 | Joseph et al. |
| 2018/0123964 | A1 | 5/2018 | Kore et al. |
| 2018/0343300 | A1 | 11/2018 | Halter et al. |
| 2019/0034367 | A1 | 1/2019 | Kakaiya et al. |
| 2019/0058768 | A1 | 2/2019 | Feijoo et al. |
| 2019/0068403 | A1 | 2/2019 | Lee et al. |
| 2019/0158482 | A1 | 5/2019 | Wang |
| 2019/0173757 | A1 | 6/2019 | Hira et al. |
| 2019/0197246 | A1 | 6/2019 | Viswanathan et al. |
| 2019/0332452 | A1 | 10/2019 | Brown |
| 2019/0386831 | A1 | 12/2019 | Jamkhedkar et al. |
| 2019/0394204 | A1 | 12/2019 | Bansal et al. |
| 2020/0008250 | A1 | 1/2020 | Wang et al. |
| 2020/0059492 | A1 | 2/2020 | Janakiraman et al. |
| 2020/0067733 | A1 | 2/2020 | Hira et al. |
| 2020/0081606 | A1 | 3/2020 | Mo et al. |
| 2020/0153736 | A1 | 5/2020 | Liebherr et al. |
| 2020/0235990 | A1 | 7/2020 | Janakiraman et al. |
| 2020/0249999 | A1 | 8/2020 | Golway et al. |
| 2020/0314006 | A1 | 10/2020 | Mackie et al. |
| 2020/0336570 | A1 | 10/2020 | Harper et al. |
| 2020/0382471 | A1 | 12/2020 | Janakiraman et al. |
| 2021/0011825 | A1 | 1/2021 | Aggarwal et al. |
| 2021/0019194 | A1 | 1/2021 | Bahl et al. |
| 2021/0027291 | A1 | 1/2021 | Ranganathan et al. |
| 2021/0064347 | A1 | 3/2021 | Junior et al. |
| 2021/0099459 | A1 | 4/2021 | Zhang et al. |
| 2021/0160231 | A1 | 5/2021 | Kumar et al. |
| 2021/0165871 | A1 | 6/2021 | Jensen et al. |
| 2021/0168128 | A1 | 6/2021 | Carru et al. |
| 2021/0203550 | A1 | 7/2021 | Thakkar et al. |
| 2021/0218598 | A1 | 7/2021 | Ganapathy et al. |
| 2021/0266255 | A1 | 8/2021 | Ganapathy et al. |
| 2021/0281428 | A1 | 9/2021 | Kempf et al. |
| 2021/0281581 | A1 | 9/2021 | Atighetchi et al. |
| 2021/0311957 | A1 | 10/2021 | Georgievski et al. |
| 2021/0314388 | A1 | 10/2021 | Zhou et al. |
| 2021/0326161 | A1 | 10/2021 | Son et al. |
| 2021/0382912 | A1 | 12/2021 | Horowitz et al. |
| 2022/0038544 | A1 | 2/2022 | Grinstein et al. |
| 2022/0131827 | A1 | 4/2022 | Gao |
| 2022/0156114 | A1 | 5/2022 | Nagpal et al. |
| 2022/0158995 | A1 | 5/2022 | Shachar et al. |
| 2022/0159093 | A1 | 5/2022 | Joshi et al. |
| 2022/0201673 | A1 | 6/2022 | Pandey et al. |
| 2022/0210068 | A1 | 6/2022 | Brar et al. |
| 2022/0215111 | A1 | 7/2022 | Ekins |
| 2022/0263791 | A1 | 8/2022 | Brar et al. |
| 2022/0350632 | A1 | 11/2022 | Shaikh et al. |
| 2022/0382590 | A1 | 12/2022 | Hashimoto et al. |

(56) References Cited

U.S. PATENT DOCUMENTS

| | | | |
|---|---|---|---|
| 2023/0104368 A1 | 4/2023 | Miriyala et al. | |
| 2023/0111266 A1 | 4/2023 | Augustin et al. | |
| 2023/0164224 A1 | 5/2023 | Adogla et al. | |
| 2023/0208843 A1 | 6/2023 | Katahanas et al. | |
| 2023/0231912 A1 | 7/2023 | Vohra et al. | |
| 2023/0239301 A1 | 7/2023 | Ivanov et al. | |
| 2023/0244505 A1* | 8/2023 | Hernandez Serrano | G06F 9/451 715/744 |
| 2023/0246962 A1* | 8/2023 | Choi | H04L 12/4633 709/238 |
| 2023/0247027 A1* | 8/2023 | Brar | H04L 63/0272 726/4 |
| 2023/0247087 A1* | 8/2023 | Nagaraja | H04L 9/3213 709/201 |
| 2023/0269114 A1 | 8/2023 | Lochhead et al. | |
| 2023/0291667 A1 | 9/2023 | Sivakumar et al. | |
| 2024/0080269 A1 | 3/2024 | Kreger-Stickles et al. | |
| 2024/0097901 A1 | 3/2024 | Lee et al. | |
| 2024/0126590 A1 | 4/2024 | Ead et al. | |
| 2024/0126591 A1 | 4/2024 | Ead et al. | |
| 2024/0126848 A1 | 4/2024 | Ead et al. | |
| 2024/0129242 A1 | 4/2024 | Ead et al. | |
| 2024/0129258 A1 | 4/2024 | Ead et al. | |
| 2024/0129285 A1* | 4/2024 | Ead | H04L 45/76 |
| 2024/0129371 A1 | 4/2024 | Ead et al. | |
| 2024/0333640 A1 | 10/2024 | Shevade et al. | |
| 2024/0380638 A1 | 11/2024 | Zong et al. | |
| 2025/0088572 A1* | 3/2025 | O'Neill | H04L 67/568 |

FOREIGN PATENT DOCUMENTS

| | | |
|---|---|---|
| WO | 2018213350 A1 | 11/2018 |
| WO | 2020013738 A1 | 1/2020 |
| WO | 2023015574 A1 | 2/2023 |

OTHER PUBLICATIONS

U.S. Appl. No. 18/104,563, "Corrected Notice of Allowability", Feb. 12, 2024, 3 pages.
U.S. Appl. No. 18/104,569, "Corrected Notice of Allowability", Feb. 9, 2024, 2 pages.
U.S. Appl. No. 18/162,939, "Non-Final Office Action", Feb. 27, 2024, 10 pages.
PCT/US2023/076778, "International Search Report and Written Opinion", Feb. 7, 2024, 12 pages.
PCT/US2023/076779, "International Search Report and Written Opinion", Jan. 3, 2024, 13 pages.
U.S. Appl. No. 18/104,569, Corrected Notice of Allowability mailed on Aug. 14, 2024, 2 pages.
U.S. Appl. No. 18/104,577, Non-Final Office Action mailed on Sep. 17, 2024, 20 pages.
U.S. Appl. No. 18/162,889, Corrected Notice of Allowability mailed on Aug. 5, 2024, 2 pages.
U.S. Appl. No. 18/162,924, Advisory Action mailed on Aug. 8, 2024, 4 pages.
U.S. Appl. No. 18/162,924, Notice of Allowance mailed on Sep. 13, 2024, 5 pages.
U.S. Appl. No. 18/162,939, Corrected Notice of Allowability mailed on Sep. 18, 2024, 2 pages.
U.S. Appl. No. 18/162,939, Notice of Allowance mailed on Sep. 9, 2024, 6 pages.
U.S. Appl. No. 18/423,065, Non-Final Office Action mailed on Aug. 22, 2024, 19 pages.
International Application No. PCT/US2023/012075, International Preliminary Report on Patentability mailed on Aug. 15, 2024, 10 pages.
International Application No. PCT/US2023/012079, International Preliminary Report on Patentability mailed on Aug. 15, 2024, 9 pages.
International Application No. PCT/US2023/012080, International Preliminary Report on Patentability mailed on Aug. 15, 2024, 10 pages.
International Application No. PCT/US2023/012084, International Preliminary Report on Patentability mailed on Aug. 15, 2024, 9 pages.
International Application No. PCT/US2023/012085, International Preliminary Report on Patentability mailed on Aug. 15, 2024, 10 pages.
International Application No. PCT/US2023/061713, International Preliminary Report on Patentability mailed on Aug. 15, 2024, 9 pages.
International Application No. PCT/US2023/061715, International Preliminary Report on Patentability mailed on Aug. 15, 2024, 9 pages.
International Application No. PCT/US2023/061718, International Preliminary Report on Patentability mailed on Aug. 15, 2024, 11 pages.
International Application No. PCT/US2023/061719, International Preliminary Report on Patentability mailed on Aug. 15, 2024, 11 pages.
International Application No. PCT/US2023/061721, International Preliminary Report on Patentability mailed on Aug. 15, 2024, 11 pages.
International Application No. PCT/US2023/061723, International Preliminary Report on Patentability mailed on Aug. 15, 2024, 9 pages.
Learn About Connecting Oracle Cloud with Microsoft Azure, Oracle, 2021, pp. 1-4.
U.S. Appl. No. 18/104,563, Final Office Action mailed on Oct. 5, 2023, 10 pages.
U.S. Appl. No. 18/104,563, Non-Final Office Action mailed on Jul. 28, 2023, 9 pages.
U.S. Appl. No. 18/104,569, Corrected Notice of Allowability mailed on Nov. 9, 2023, 2 pages.
U.S. Appl. No. 18/104,569, Notice of Allowance mailed on Oct. 30, 2023, 15 pages.
U.S. Appl. No. 18/162,924, Non-Final Office Action mailed on Nov. 9, 2023, 9 pages.
Alhamazani et al., Cross-Layer Multi-Cloud Real-Time Application QoS Monitoring and Benchmarking As-a-Service Framework, IEEE Transactions ON Cloud Computing, IEEE Computer Society, vol. 7, No. 1, Jan. 1, 2019, pp. 48-61.
Arif, How to Setup the Interconnect Between Oracle Cloud Infrastructure and Microsoft Azure, Available Online at: https://medium.com/@j.jamalarif/how-to-setup-the-interconnect-between-oracle-cloud-infrastructure-and-microsoft-azure-da359233e5e9, Jun. 20, 2019, 21 pages.
Arif, How to Setup the Interconnect Between Oracle Cloud Infrastructure and Microsoft Azure, Available Online at: https://medium.com/@j.jamalarif/how-to-setup-the-interconnect-between-oracle-cloud-infrastructure-and-microsoft-azure-da359233e5e9, Jun. 21, 2019, 26 pages.
Chandrashekar, Oracle and Microsoft Interconnect Clouds to Accelerate Enterprise Cloud Adoption, Available Online at: https://blogs.oracle.com/cloud-infrastructure/post/oracle-and-microsoft-interconnect-clouds-to-accelerate-enterprise-cloud-adoption?source=post_page, Jun. 5, 2019, pp. 1-4.
Mishra et al., AWS Cloudwatch Tutorial, Available Online at:https://web.archive.org/web/20211019093341/https://mindmajix.com/aws-cloudwatch-tutorial, Oct. 7, 2021, 16 pages.
International Application No. PCT/US2023/012075, International Search Report and Written Opinion mailed on mailed on May 12, 2023, 12 pages.
International Application No. PCT/US2023/012079, International Search Report and Written Opinion mailed on May 17, 2023, 11 pages.
International Application No. PCT/US2023/012080, International Search Report and Written Opinion mailed on Apr. 20, 2023, 12 pages.
International Application No. PCT/US2023/012084, International Search Report and Written Opinion mailed on Apr. 25, 2023, 11 pages.

(56) References Cited

OTHER PUBLICATIONS

International Application No. PCT/US2023/012085, International Search Report and Written Opinion mailed on May 12, 2023, 14 pages.
International Application No. PCT/US2023/061713, International Search Report and Written Opinion mailed on Apr. 20, 2023, 11 pages.
International Application No. PCT/US2023/061715, International Search Report and Written Opinion mailed on May 12, 2023, 11 pages.
International Application No. PCT/US2023/061718, International Search Report and Written Opinion mailed on Apr. 20, 2023, 13 pages.
International Application No. PCT/US2023/061719, International Search Report and Written Opinion mailed on Apr. 20, 2023, 13 pages.
International Application No. PCT/US2023/061721, International Search Report and Written Opinion mailed on May 10, 2023, 14 pages.
International Application No. PCT/US2023/061723, International Search Report and Written Opinion mailed on May 12, 2023, 11 pages.
Rao, Building Multi-Cloud Apps on Microsoft Azure and Oracle Cloud Infrastructure, Available Online at: https://medium.com/oracledevs/from-azure-to-autonomous-an-enterprise-multi-cloud-journey-an-enterprise-multi-cloud-journey-cc070a28cb10, Jul. 26, 2019, 16 pages.
Sitaram et al., Keystone Federated Security, 8th International Conference for Internet Technology and Secured Transactions (ICITST—2013), Infonomics Society, Dec. 9, 2013, pp. 659-664.
U.S. Appl. No. 18/104,563, Notice of Allowance mailed on Dec. 22, 2023, 7 pages.
U.S. Appl. No. 18/104,569, Corrected Notice of Allowability mailed on Dec. 14, 2023, 2 pages.
International Application No. PCT/US2023/076775, International Search Report and Written Opinion mailed on Feb. 7, 2024, 10 pages.
U.S. Appl. No. 18/104,563, Corrected Notice of Allowability mailed on Mar. 27, 2024, 3 pages.
U.S. Appl. No. 18/162,889, Non-Final Office Action mailed on Mar. 28, 2024, 15 pages.
International Application No. PCT/US2023/076771, International Search Report and Written Opinion mailed on Feb. 14, 2024, 13 pages.
International Application No. PCT/US2023/076773, International Search Report and Written Opinion mailed on Feb. 26, 2024, 13 pages.
International Application No. PCT/US2023/076774, International Search Report and Written Opinion mailed on Feb. 8, 2024, 12 pages.
International Application No. PCT/US2023/076777, International Search Report and Written Opinion mailed on Feb. 6, 2024, 13 pages.
U.S. Appl. No. 18/104,577, Final Office Action mailed on Apr. 24, 2025, 21 pages.
U.S. Appl. No. 18/162,947, Corrected Notice of Allowability mailed on Apr. 10, 2025, 2 pages.
U.S. Appl. No. 18/486,427, Non-Final Office Action mailed on Apr. 23, 2025, 19 pages.
U.S. Appl. No. 18/486,474, Corrected Notice of Allowability mailed on Apr. 9, 2025, 2 pages.
U.S. Appl. No. 18/486,474, Notice of Allowance mailed on Mar. 31, 2025, 8 pages.
U.S. Appl. No. 18/486,511, Non-Final Office Action mailed on Apr. 29, 2025, 9 pages.
U.S. Appl. No. 18/610,115, Notice of Allowance mailed on Mar. 31, 2025, 10 pages.
Ghazizadeh et al., Trusted Computing Strengthens Cloud Authentication, The Scientific World Journal, vol. 2014, No. 1, Feb. 18, 2014, pp. 1-17.
Lewis et al., What is a Gateway? Definition From WhatIs.com, Available online at. https://www.techtarget.com/iotagenda/definition/gateway, Accessed from Internet on May 1, 2025, pp. 1-6.
International Application No. PCT/US2023/076771, International Preliminary Report on Patentability mailed on Apr. 24, 2025, 9 pages.
International Application No. PCT/US2023/076773, International Preliminary Report on Patentability mailed on Apr. 24, 2025, 10 pages.
International Application No. PCT/US2023/076774, International Preliminary Report on Patentability mailed on Apr. 24, 2025, 8 pages.
International Application No. PCT/US2023/076775, International Preliminary Report on Patentability mailed on Apr. 24, 2025, 7 pages.
International Application No. PCT/US2023/076777, International Preliminary Report on Patentability mailed on Apr. 24, 2025, 11 pages.
International Application No. PCT/US2023/076778, International Preliminary Report on Patentability mailed on Apr. 24, 2025, 9 pages.
International Application No. PCT/US2023/076779, International Preliminary Report on Patentability mailed on Apr. 24, 2025, 10 pages.
U.S. Appl. No. 18/104,561, Non-Final Office Action mailed on Mar. 21, 2025, 12 pages.
U.S. Appl. No. 18/162,947, Corrected Notice of Allowability mailed on Mar. 19, 2025, 2 pages.
U.S. Appl. No. 18/162,947, Notice of Allowance mailed on Feb. 18, 2025, 8 pages.
U.S. Appl. No. 18/423,065, Notice of Allowance mailed on Mar. 19, 2025, 14 pages.
U.S. Appl. No. 18/486,496, Non-Final Office Action mailed on Mar. 24, 2025, 25 pages.
Bernstein et al., Blueprint for the Intercloud—Protocols and Formats for Cloud Computing Interoperability, 2009 Fourth International Conference on Internet and Web Applications and Services, May 24-28, 2009, 10 pages.
Bouzerzour et al., A Survey on the Service Interoperability in Cloud Computing: Client-centric and Provider-centric Perspectives, Software: Practice and Experience, vol. 50, No. 7, Jul. 2020, pp. 1025-1060.
Tomarchio et al., Cloud Resource Orchestration in the Multi-cloud Landscape: a Systematic Review of Existing Frameworks, Journal of Cloud Computing: Advances, Systems and Applications, vol. 9, Article 49, Sep. 10, 2020, pp. 1-24.
U.S. Appl. No. 18/104,569 , "Notice of Allowance", May 8, 2024, 16 pages.
U.S. Appl. No. 18/162,889 , "Notice of Allowance", Jul. 8, 2024, 9 pages.
U.S. Appl. No. 18/162,924 , "Final Office Action", Jun. 5, 2024, 12 pages.
U.S. Appl. No. 18/486,474 , "Non-Final Office Action", Jun. 27, 2024, 17 pages.
U.S. Appl. No. 18/162,947, Non-Final Office Action mailed on Nov. 22, 2024, 9 pages.
U.S. Appl. No. 18/162,939, Corrected Notice of Allowability mailed on Dec. 18, 2024, 2 pages.

\* cited by examiner

ARCHITECTURE AND SERVICES PROVIDED BY A MULTI-CLOUD INFRASTRUCTURE

CROSS-REFERENCES TO RELATED APPLICATIONS

The present application is a non-provisional of and claims the benefit of each of the following provisional applications. The entire contents of each of the following provisional applications is incorporated herein by reference for all purposes:
(1) U.S. Provisional Application No. 63/416,042, filed on Oct. 14, 2022;
(2) U.S. Provisional Application No. 63/464,903, filed on May 8, 2023;
(3) U.S. Provisional Application No. 63/467,241, filed on May 17, 2023;
(4) U.S. Provisional Application No. 63/468,739, filed on May 24, 2023;
(5) U.S. Provisional Application No. 63/469,763, filed on May 30, 2023;
(6) U.S. Provisional Application No. 63/471,573, filed on Jun. 7, 2023;

FIELD

The present disclosure relates to cloud architectures, and more particularly to techniques for linking two cloud environments that are provided by different cloud services providers. A user of one cloud environment that is provided by a services provider can utilize and manage a service provided by another cloud environment that is provided by another cloud services provider.

BACKGROUND

The last few years have seen a dramatic increase in the adoption of cloud services and this trend is only going to increase. Various different cloud environments are being provided by different cloud service providers (CSPs), each cloud environment providing a set of one or more cloud services. The set of cloud services offered by a cloud environment may include one or more different types of services including but not restricted to Software-as-a-Service (SaaS) services, Infrastructure-as-a-Service (IaaS) services, Platform-as-a-Service (PaaS) services, and others.

While various different cloud environments are currently available, each cloud environment provides a closed ecosystem for its subscribing customers. As a result, a customer of a cloud environment is restricted to using the services offered by that cloud environment. There is no easy way for a customer subscribing to a cloud environment provided by a CSP to, via that cloud environment, use a service offered in a different cloud environment provided by a different CSP. Embodiments discussed herein address these and other issues.

SUMMARY

The present disclosure relates to cloud architectures, and more particularly to techniques for linking two cloud environments that are provided by different cloud services providers. A user of one cloud environment provided by a services provider can manage a service provided by another cloud environment provided by another cloud services provider. Various embodiments are described herein, including methods, systems, non-transitory computer-readable storage media storing programs, code, or instructions executable by one or more processors, and the like. Some embodiments may be implemented by using a computer program product, comprising computer program/instructions which, when executed by a processor, cause the processor to perform any of the methods described in the disclosure.

Embodiments of the present disclosure provide for a multi-cloud control plane (MCCP) framework that provisions for capabilities to deliver services of a particular cloud network (e.g., Oracle Cloud Infrastructure (OCI)) to users on other clouds (e.g., AWS). The MCCP framework allows users (of other cloud environment(s)) to access services (e.g., PaaS services, database services such as autonomous database services, etc.) of a cloud environment, while providing with a user experience as close as possible to that of the native cloud environment(s) of the user. A key value proposition to MCCP is that customers will be able to experience the full data plane capabilities of the services in external clouds.

One embodiment of the present disclosure is directed to a method comprising: receiving, by a multi-cloud infrastructure included in a first cloud environment, a request from a user associated with an account in a second cloud environment, the request requesting a signup of the user with respect to a service provided by the multi-cloud infrastructure, and including metadata information associated with the user; responsive to determining, based on the metadata information, that a set of pre-requisite resources is not configured in the second cloud environment for the user, transmitting by the multi-cloud infrastructure, a notification to the user, the notification indicating that the set of pre-requisite resources is to be configured in the second cloud environment; validating, by the multi-cloud infrastructure, the set of pre-requisite resources and a user setup configured in the second cloud environment; and creating, by the multi-cloud infrastructure, a link resource object that includes information linking a tenancy of the user in the first cloud environment to the account of the user in the second cloud environment, the link resource object enabling the user to utilize the service provided by the multi-cloud infrastructure.

By one aspect of the present disclosure, there is provided one or more computer readable non-transitory media storing computer-executable instructions that, when executed by one or more processors, cause: receiving, by a multi-cloud infrastructure included in a first cloud environment, a request from a user associated with an account in a second cloud environment, the request requesting a signup of the user with respect to a service provided by the multi-cloud infrastructure, and including metadata information associated with the user; responsive to determining, based on the metadata information, that a set of pre-requisite resources is not configured in the second cloud environment for the user, transmitting by the multi-cloud infrastructure, a notification to the user, the notification indicating that the set of pre-requisite resources is to be configured in the second cloud environment; validating, by the multi-cloud infrastructure, the set of pre-requisite resources and a user setup configured in the second cloud environment; and creating, by the multi-cloud infrastructure, a link resource object that includes information linking a tenancy of the user in the first cloud environment to the account of the user in the second cloud environment, the link resource object enabling the user to utilize the service provided by the multi-cloud infrastructure.

By one aspect of the present disclosure, there is provided a computing device comprising: one or more processors; and a memory including instructions that, when executed with the one or more processors, cause the computing device to, at least: receive, by a multi-cloud infrastructure included in a first cloud environment, a request from a user associated with an account in a second cloud environment, the request requesting a signup of the user with respect to a service provided by the multi-cloud infrastructure, and including metadata information associated with the user; responsive to determining, based on the metadata information, that a set of pre-requisite resources is not configured in the second cloud environment for the user, transmit by the multi-cloud infrastructure, a notification to the user, the notification indicating that the set of pre-requisite resources is to be configured in the second cloud environment; validate, by the multi-cloud infrastructure, the set of pre-requisite resources and a user setup configured in the second cloud environment; and create, by the multi-cloud infrastructure, a link resource object that includes information linking a tenancy of the user in the first cloud environment to the account of the user in the second cloud environment, the link resource object enabling the user to utilize the service provided by the multi-cloud infrastructure.

An aspect of the present disclosure provides for a computing device comprising one or more data processors, and a non-transitory computer readable storage medium containing instructions which, when executed on the one or more data processors, cause the computing device to perform part or all of one or more methods disclosed herein.

Another aspect of the present disclosure provides for a computer-program product tangibly embodied in a non-transitory machine-readable storage medium, including instructions configured to cause one or more data processors to perform part or all of one or more methods disclosed herein.

The foregoing, together with other features and embodiments will become more apparent upon referring to the following specification, claims, and accompanying drawings.

BRIEF DESCRIPTION OF THE DRAWINGS

Features, embodiments, and advantages of the present disclosure are better understood when the following Detailed Description is read with reference to the accompanying drawings.

DETAILED DESCRIPTION

Figure 1:
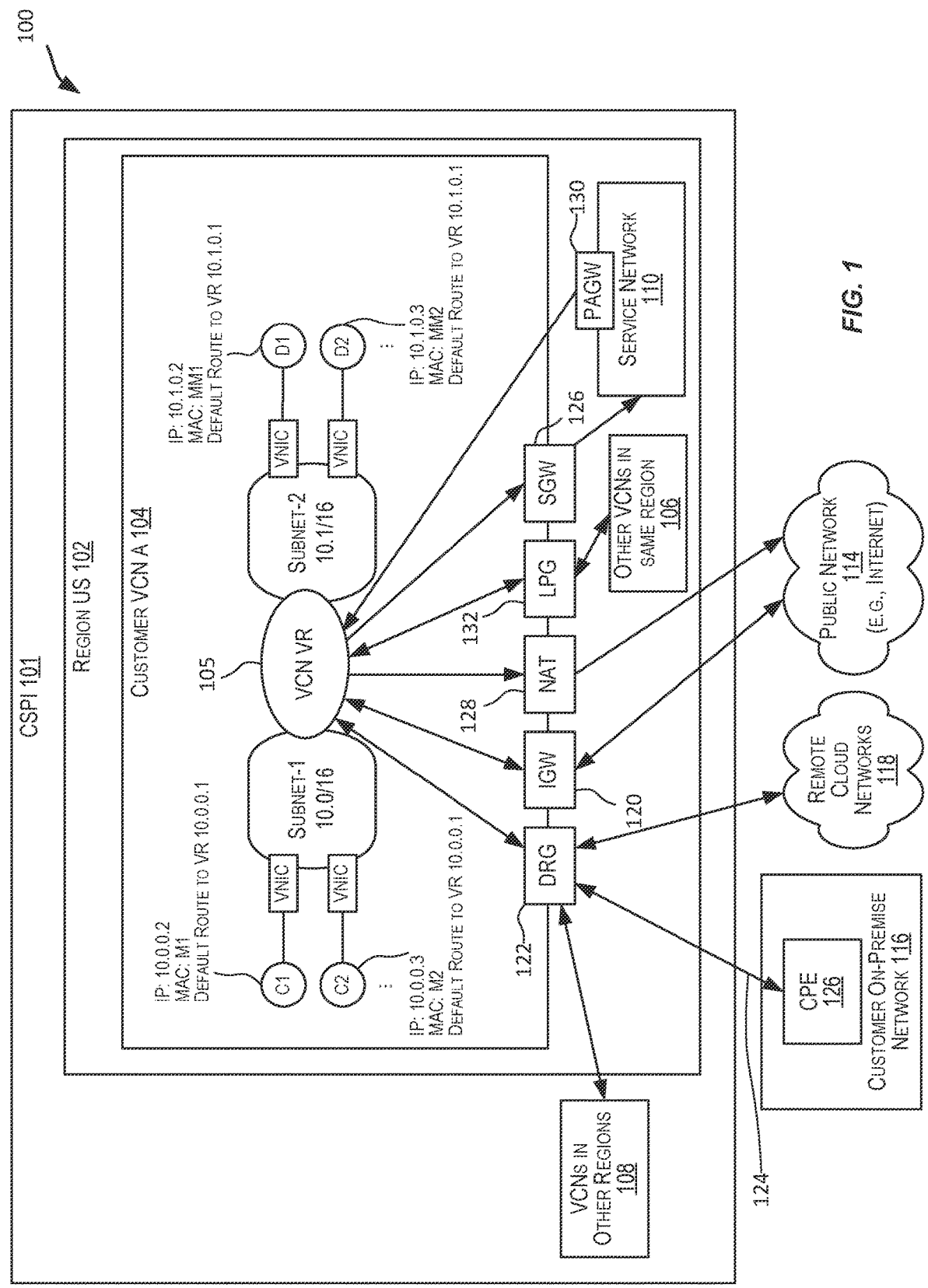
FIG. 1 is a high-level diagram of a distributed environment showing a virtual or overlay cloud network hosted by a cloud service provider infrastructure according to certain embodiments.

In the following description, for the purposes of explanation, specific details are set forth in order to provide a thorough understanding of certain embodiments. However, it will be apparent that various embodiments may be practiced without these specific details. The figures and description are not intended to be restrictive. The word "exemplary" is used herein to mean "serving as an example, instance, or illustration." Any embodiment or design described herein as "exemplary" is not necessarily to be construed as preferred or advantageous over other embodiments or designs.

The present disclosure relates generally to improved cloud architectures, and more particularly to techniques for linking two cloud environments (each provided by a different cloud services provider (CSP)) such that a user of one cloud environment can use a service provided by another different cloud environment. Various embodiments are described herein, including methods, systems, non-transitory computer-readable storage media storing programs, code, or instructions executable by one or more processors, and the like. Some embodiments may be implemented by using a computer program product, comprising computer program/instructions which, when executed by a processor, cause the processor to perform any of the methods described in the disclosure.

Embodiments of the present disclosure provide for a multi-cloud control plane (MCCP) framework that provisions for capabilities to deliver services of a particular cloud network (e.g., Oracle Cloud Infrastructure (OCI)) to users on other clouds (e.g., in Amazons AWS). The MCCP framework allows users (of other cloud environment(s)) to access services (e.g., PaaS services) of a cloud environment, while providing with a user experience as close as possible to that of the native cloud environment(s) of the user. A key value proposition to MCCP is that customers will be able to experience the full data plane capabilities of the services in external clouds.

The MCCP enables users of a second cloud infrastructure (e.g., AWS users) to make use of resources (e.g., database resources) provided by a first cloud infrastructure (e.g., OCI) in a way that is transparent to the user. Specifically, the services provided by the first cloud infrastructure appear as "native" services in the second cloud infrastructure. This allows customers of the second cloud infrastructure to natively access services provided by the first cloud infrastructure. As will be described below with reference to FIGS. 6-11, the MCCP is a collection of microservices executed in the first cloud infrastructure, which exposes resources of the first cloud infrastructure to be utilized by external cloud users (e.g., users of the second cloud infrastructure). Each of the microservices acts as a proxy providing communication to resources provided by the first cloud infrastructure.

Examples of Cloud Networks

The term cloud service is generally used to refer to a service that is made available by a cloud services provider (CSP) to users or customers on demand (e.g., via a subscription model) using systems and infrastructure (cloud infrastructure) provided by the CSP. Typically, the servers and systems that make up the CSP's infrastructure are separate from the customer's own on-premises servers and systems. Customers can thus avail themselves of cloud services provided by the CSP without having to purchase separate hardware and software resources for the services. Cloud services are designed to provide a subscribing customer easy, scalable access to applications and computing resources without the customer having to invest in procuring the infrastructure that is used for providing the services.

There are several cloud service providers that offer various types of cloud services. There are various different types or models of cloud services including Software-as-a-Service (SaaS), Platform-as-a-Service (PaaS), Infrastructure-as-a-Service (IaaS), and others.

A customer can subscribe to one or more cloud services provided by a CSP. The customer can be any entity such as an individual, an organization, an enterprise, and the like. When a customer subscribes to or registers for a service provided by a CSP, a tenancy or an account is created for that customer. The customer can then, via this account, access the subscribed-to one or more cloud resources associated with the account.

As noted above, infrastructure as a service (IaaS) is one particular type of cloud computing service. In an IaaS model, the CSP provides infrastructure (referred to as cloud services provider infrastructure or CSPI) that can be used by customers to build their own customizable networks and deploy customer resources. The customer's resources and networks are thus hosted in a distributed environment by infrastructure provided by a CSP. This is different from traditional computing, where the customer's resources and networks are hosted by infrastructure provided by the customer.

The CSPI may comprise interconnected high-performance compute resources including various host machines, memory resources, and network resources that form a physical network, which is also referred to as a substrate network or an underlay network. The resources in CSPI may be spread across one or more data centers that may be geographically spread across one or more geographical regions. Virtualization software may be executed by these physical resources to provide a virtualized distributed environment. The virtualization creates an overlay network (also known as a software-based network, a software-defined network, or a virtual network) over the physical network. The CSPI physical network provides the underlying basis for creating one or more overlay or virtual networks on top of the physical network. The physical network (or substrate network or underlay network) comprises physical network devices such as physical switches, routers, computers and host machines, and the like. An overlay network is a logical (or virtual) network that runs on top of a physical substrate network. A given physical network can support one or multiple overlay networks. Overlay networks typically use encapsulation techniques to differentiate between traffic belonging to different overlay networks. A virtual or overlay network is also referred to as a virtual cloud network (VCN). The virtual networks are implemented using software virtualization technologies (e.g., hypervisors, virtualization functions implemented by network virtualization devices (NVDs) (e.g., smartNICs), top-of-rack (TOR) switches, smart TORs that implement one or more functions performed by an NVD, and other mechanisms) to create layers of network abstraction that can be run on top of the physical network. Virtual networks can take on many forms, including peer-to-peer networks, IP networks, and others. Virtual networks are typically either Layer-3 IP networks or Layer-2 VLANs. This method of virtual or overlay networking is often referred to as virtual or overlay Layer-3 networking. Examples of protocols developed for virtual networks include IP-in-IP (or Generic Routing Encapsulation (GRE)) Virtual Extensible LAN (VXLAN—IETF RFC 7348), Virtual Private Networks (VPNs) (e.g., MPLS Layer-3 Virtual Private Networks (RFC 4364)), VMware's NSX, GENEVE (Generic Network Virtualization Encapsulation), and others.

For IaaS, the infrastructure (CSPI) provided by a CSP can be configured to provide virtualized computing resources over a public network (e.g., the Internet). In an IaaS model, a cloud computing services provider can host the infrastructure components (e.g., servers, storage devices, network nodes (e.g., hardware), deployment software, platform virtualization (e.g., a hypervisor layer), or the like). In some cases, an IaaS provider may also supply a variety of services to accompany those infrastructure components (e.g., billing, monitoring, logging, security, load balancing and clustering, etc.). Thus, as these services may be policy-driven, IaaS users may be able to implement policies to drive load balancing to maintain application availability and performance. CSPI provides infrastructure and a set of complementary cloud services that enable customers to build and run a wide range of applications and services in a highly available hosted distributed environment. CSPI offers high-performance compute resources and capabilities and storage capacity in a flexible virtual network that is securely accessible from various networked locations such as from a customer's on-premises network. When a customer subscribes to or registers for an IaaS service provided by a CSP, the tenancy created for that customer is a secure and isolated partition within the CSPI where the customer can create, organize, and administer their cloud resources.

Customers can build their own virtual networks using compute, memory, and networking resources provided by CSPI. One or more customer resources or workloads, such as compute instances, can be deployed on these virtual networks. For example, a customer can use resources provided by CSPI to build one or multiple customizable and private virtual network(s) referred to as virtual cloud networks (VCNs). A customer can deploy one or more customer resources, such as compute instances, on a customer VCN. Compute instances can take the form of virtual machines, bare metal instances, and the like. The CSPI thus provides infrastructure and a set of complementary cloud services that enable customers to build and run a wide range of applications and services in a highly available virtual hosted environment. The customer does not manage or control the underlying physical resources provided by CSPI but has control over operating systems, storage, and deployed applications; and possibly limited control of select networking components (e.g., firewalls).

The CSP may provide a console that enables customers and network administrators to configure, access, and manage resources deployed in the cloud using CSPI resources. In certain embodiments, the console provides a web-based user interface that can be used to access and manage CSPI. In some implementations, the console is a web-based application provided by the CSP.

CSPI may support single-tenancy or multi-tenancy architectures. In a single tenancy architecture, a software (e.g., an application, a database) or a hardware component (e.g., a host machine or a server) serves a single customer or tenant. In a multi-tenancy architecture, a software or a hardware component serves multiple customers or tenants. Thus, in a multi-tenancy architecture, CSPI resources are shared between multiple customers or tenants. In a multi-tenancy situation, precautions are taken, and safeguards put in place within CSPI to ensure that each tenant's data is isolated and remains invisible to other tenants.

In a physical network, a network endpoint ("endpoint") refers to a computing device or system that is connected to a physical network and communicates back and forth with the network to which it is connected. A network endpoint in the physical network may be connected to a Local Area Network (LAN), a Wide Area Network (WAN), or other type of physical network. Examples of traditional endpoints in a physical network include modems, hubs, bridges, switches, routers, and other networking devices, physical computers (or host machines), and the like. Each physical device in the physical network has a fixed network address that can be used to communicate with the device. This fixed network address can be a Layer-2 address (e.g., a MAC address), a fixed Layer-3 address (e.g., an IP address), and the like. In a virtualized environment or in a virtual network, the endpoints can include various virtual endpoints such as virtual machines that are hosted by components of the physical network (e.g., hosted by physical host machines). These endpoints in the virtual network are addressed by overlay addresses such as overlay Layer-2 addresses (e.g., overlay MAC addresses) and overlay Layer-3 addresses (e.g., overlay IP addresses). Network overlays enable flexibility by allowing network managers to move around the overlay addresses associated with network endpoints using software management (e.g., via software implementing a control plane for the virtual network). Accordingly, unlike in a physical network, in a virtual network, an overlay address (e.g., an overlay IP address) can be moved from one endpoint to another using network management software. Since the virtual network is built on top of a physical network, communications between components in the virtual network involves both the virtual network and the underlying physical network. In order to facilitate such communications, the components of CSPI are configured to learn and store mappings that map overlay addresses in the virtual network to actual physical addresses in the substrate network, and vice versa. These mappings are then used to facilitate the communications. Customer traffic is encapsulated to facilitate routing in the virtual network.

Accordingly, physical addresses (e.g., physical IP addresses) are associated with components in physical networks and overlay addresses (e.g., overlay IP addresses) are associated with entities in virtual or overlay networks. A physical IP address is an IP address associated with a physical device (e.g., a network device) in the substrate or physical network. For example, each NVD has an associated physical IP address. An overlay IP address is an overlay address associated with an entity in an overlay network, such as with a compute instance in a customer's virtual cloud network (VCN). Two different customers or tenants, each with their own private VCNs can potentially use the same overlay IP address in their VCNs without any knowledge of each other. Both the physical IP addresses and overlay IP addresses are types of real IP addresses. These are separate from virtual IP addresses. A virtual IP address is typically a single IP address that is represents or maps to multiple real IP addresses. A virtual IP address provides a 1-to-many mapping between the virtual IP address and multiple real IP addresses. For example, a load balancer may use a VIP to map to or represent multiple servers, each server having its own real IP address.

The cloud infrastructure or CSPI is physically hosted in one or more data centers in one or more regions around the world. The CSPI may include components in the physical or substrate network and virtualized components (e.g., virtual networks, compute instances, virtual machines, etc.) that are in a virtual network built on top of the physical network components. In certain embodiments, the CSPI is organized and hosted in realms, regions, and availability domains. A region is typically a localized geographic area that contains one or more data centers. Regions are generally independent of each other and can be separated by vast distances, for example, across countries or even continents. For example, a first region may be in Australia, another one in Japan, yet another one in India, and the like. CSPI resources are divided among regions such that each region has its own independent subset of CSPI resources. Each region may provide a set of core infrastructure services and resources, such as, compute resources (e.g., bare metal servers, virtual machine, containers and related infrastructure, etc.); storage resources (e.g., block volume storage, file storage, object storage, archive storage); networking resources (e.g., virtual cloud networks (VCNs), load balancing resources, connections to on-premise networks), database resources; edge networking resources (e.g., DNS); and access management and monitoring resources, and others. Each region generally has multiple paths connecting it to other regions in the realm.

Generally, an application is deployed in a region (i.e., deployed on infrastructure associated with that region) where it is most heavily used, because using nearby resources is faster than using distant resources. Applications can also be deployed in different regions for various reasons, such as redundancy to mitigate the risk of region-wide events such as large weather systems or earthquakes, to meet varying requirements for legal jurisdictions, tax domains, and other business or social criteria, and the like.

The data centers within a region can be further organized and subdivided into availability domains (ADs). An availability domain may correspond to one or more data centers located within a region. A region can be composed of one or more availability domains. In such a distributed environment, CSPI resources are either region-specific, such as a virtual cloud network (VCN), or availability domain-specific, such as a compute instance.

ADs within a region are isolated from each other, fault tolerant, and are configured such that they are very unlikely to fail simultaneously. This is achieved by the ADs not sharing critical infrastructure resources such as networking, physical cables, cable paths, cable entry points, etc., such that a failure at one AD within a region is unlikely to impact the availability of the other ADs within the same region. The ADs within the same region may be connected to each other by a low latency, high bandwidth network, which makes it possible to provide high-availability connectivity to other networks (e.g., the Internet, customers' on-premises networks, etc.) and to build replicated systems in multiple ADs for both high-availability and disaster recovery. Cloud services use multiple ADs to ensure high availability and to protect against resource failure. As the infrastructure provided by the IaaS provider grows, more regions and ADs may be added with additional capacity. Traffic between availability domains is usually encrypted.

In certain embodiments, regions are grouped into realms. A realm is a logical collection of regions. Realms are isolated from each other and do not share any data. Regions in the same realm may communicate with each other, but regions in different realms cannot. A customer's tenancy or account with the CSP exists in a single realm and can be spread across one or more regions that belong to that realm. Typically, when a customer subscribes to an IaaS service, a tenancy or account is created for that customer in the customer-specified region (referred to as the "home" region) within a realm. A customer can extend the customer's tenancy across one or more other regions within the realm. A customer cannot access regions that are not in the realm where the customer's tenancy exists.

An IaaS provider can provide multiple realms, each realm catered to a particular set of customers or users. For example, a commercial realm may be provided for commercial customers. As another example, a realm may be provided for a specific country for customers within that country. As yet another example, a government realm may be provided for a government, and the like. For example, the government realm may be catered for a specific government and may have a heightened level of security than a commercial realm. For example, Oracle Cloud Infrastructure (OCI) currently offers a realm for commercial regions and two realms (e.g., FedRAMP authorized and IL5 authorized) for government cloud regions.

In certain embodiments, an AD can be subdivided into one or more fault domains. A fault domain is a grouping of infrastructure resources within an AD to provide anti-affinity. Fault domains allow for the distribution of compute instances such that the instances are not on the same physical hardware within a single AD. This is known as anti-affinity. A fault domain refers to a set of hardware components (computers, switches, and more) that share a single point of failure. A compute pool is logically divided up into fault domains. Due to this, a hardware failure or compute hardware maintenance event that affects one fault domain does not affect instances in other fault domains. Depending on the embodiment, the number of fault domains for each AD may vary. For instance, in certain embodiments each AD contains three fault domains. A fault domain acts as a logical data center within an AD.

When a customer subscribes to an IaaS service, resources from CSPI are provisioned for the customer and associated with the customer's tenancy. The customer can use these provisioned resources to build private networks and deploy resources on these networks. The customer networks that are hosted in the cloud by the CSPI are referred to as virtual cloud networks (VCNs). A customer can set up one or more virtual cloud networks (VCNs) using CSPI resources allocated for the customer. A VCN is a virtual or software defined private network. The customer resources that are deployed in the customer's VCN can include compute instances (e.g., virtual machines, bare-metal instances) and other resources. These compute instances may represent various customer workloads such as applications, load balancers, databases, and the like. A compute instance deployed on a VCN can communicate with publicly accessible endpoints ("public endpoints") over a public network such as the Internet, with other instances in the same VCN or other VCNs (e.g., the customer's other VCNs, or VCNs not belonging to the customer), with the customer's on-premise data centers or networks, and with service endpoints, and other types of endpoints.

The CSP may provide various services using the CSPI. In some instances, customers of CSPI may themselves act like service providers and provide services using CSPI resources. A service provider may expose a service endpoint, which is characterized by identification information (e.g., an IP Address, a DNS name and port). A customer's resource (e.g., a compute instance) can consume a particular service by accessing a service endpoint exposed by the service for that particular service. These service endpoints are generally endpoints that are publicly accessible by users using public IP addresses associated with the endpoints via a public communication network such as the Internet. Network endpoints that are publicly accessible are also sometimes referred to as public endpoints.

In certain embodiments, a service provider may expose a service via an endpoint (sometimes referred to as a service endpoint) for the service. Customers of the service can then use this service endpoint to access the service. In certain implementations, a service endpoint provided for a service can be accessed by multiple customers that intend to consume that service. In other implementations, a dedicated service endpoint may be provided for a customer such that only that customer can access the service using that dedicated service endpoint.

In certain embodiments, when a VCN is created, it is associated with a private overlay Classless Inter-Domain Routing (CIDR) address space, which is a range of private overlay IP addresses that are assigned to the VCN (e.g., 10.0/16). A VCN includes associated subnets, route tables, and gateways. A VCN resides within a single region but can span one or more or all of the region's availability domains. A gateway is a virtual interface that is configured for a VCN and enables communication of traffic to and from the VCN to one or more endpoints outside the VCN. One or more different types of gateways may be configured for a VCN to enable communication to and from different types of endpoints.

A VCN can be subdivided into one or more sub-networks such as one or more subnets. A subnet is thus a unit of configuration or a subdivision that can be created within a VCN. A VCN can have one or multiple subnets. Each subnet within a VCN is associated with a contiguous range of overlay IP addresses (e.g., 10.0.0.0/24 and 10.0.1.0/24) that do not overlap with other subnets in that VCN, and which represent an address space subset within the address space of the VCN.

Each compute instance is associated with a virtual network interface card (VNIC), that enables the compute instance to participate in a subnet of a VCN. A VNIC is a logical representation of physical Network Interface Card (NIC). In general. a VNIC is an interface between an entity (e.g., a compute instance, a service) and a virtual network. A VNIC exists in a subnet, has one or more associated IP addresses, and associated security rules or policies. A VNIC is equivalent to a Layer-2 port on a switch. A VNIC is attached to a compute instance and to a subnet within a VCN. A VNIC associated with a compute instance enables the compute instance to be a part of a subnet of a VCN and enables the compute instance to communicate (e.g., send and receive packets) with endpoints that are on the same subnet as the compute instance, with endpoints in different subnets in the VCN, or with endpoints outside the VCN. The VNIC associated with a compute instance thus determines how the compute instance connects with endpoints inside and outside the VCN. A VNIC for a compute instance is created and associated with that compute instance when the compute instance is created and added to a subnet within a VCN. For a subnet comprising a set of compute instances, the subnet contains the VNICs corresponding to the set of compute instances, each VNIC attached to a compute instance within the set of computer instances.

Each compute instance is assigned a private overlay IP address via the VNIC associated with the compute instance. This private overlay IP address is assigned to the VNIC that is associated with the compute instance when the compute instance is created and used for routing traffic to and from the compute instance. All VNICs in a given subnet use the same route table, security lists, and DHCP options. As described above, each subnet within a VCN is associated with a contiguous range of overlay IP addresses (e.g., 10.0.0.0/24 and 10.0.1.0/24) that do not overlap with other subnets in that VCN, and which represent an address space subset within the address space of the VCN. For a VNIC on a particular subnet of a VCN, the private overlay IP address that is assigned to the VNIC is an address from the contiguous range of overlay IP addresses allocated for the subnet.

In certain embodiments, a compute instance may optionally be assigned additional overlay IP addresses in addition to the private overlay IP address, such as, for example, one or more public IP addresses if in a public subnet. These multiple addresses are assigned either on the same VNIC or over multiple VNICs that are associated with the compute instance. Each instance however has a primary VNIC that is created during instance launch and is associated with the overlay private IP address assigned to the instance—this primary VNIC cannot be removed. Additional VNICs, referred to as secondary VNICs, can be added to an existing instance in the same availability domain as the primary VNIC. All the VNICs are in the same availability domain as the instance. A secondary VNIC can be in a subnet in the same VCN as the primary VNIC, or in a different subnet that is either in the same VCN or a different one.

A compute instance may optionally be assigned a public IP address if it is in a public subnet. A subnet can be designated as either a public subnet or a private subnet at the time the subnet is created. A private subnet means that the resources (e.g., compute instances) and associated VNICs in the subnet cannot have public overlay IP addresses. A public subnet means that the resources and associated VNICs in the subnet can have public IP addresses. A customer can designate a subnet to exist either in a single availability domain or across multiple availability domains in a region or realm.

As described above, a VCN may be subdivided into one or more subnets. In certain embodiments, a Virtual Router (VR) configured for the VCN (referred to as the VCN VR or just VR) enables communications between the subnets of the VCN. For a subnet within a VCN, the VR represents a logical gateway for that subnet that enables the subnet (i.e., the compute instances on that subnet) to communicate with endpoints on other subnets within the VCN, and with other endpoints outside the VCN. The VCN VR is a logical entity that is configured to route traffic between VNICs in the VCN and virtual gateways ("gateways") associated with the VCN. Gateways are further described below with respect to FIG. 1. A VCN VR is a Layer-3/IP Layer concept. In one embodiment, there is one VCN VR for a VCN where the VCN VR has potentially an unlimited number of ports addressed by IP addresses, with one port for each subnet of the VCN. In this manner, the VCN VR has a different IP address for each subnet in the VCN that the VCN VR is attached to. The VR is also connected to the various gateways configured for a VCN. In certain embodiments, a particular overlay IP address from the overlay IP address range for a subnet is reserved for a port of the VCN VR for that subnet. For example, consider a VCN having two subnets with associated address ranges 10.0/16 and 10.1/16, respectively. For the first subnet within the VCN with address range 10.0/16, an address from this range is reserved for a port of the VCN VR for that subnet. In some instances, the first IP address from the range may be reserved for the VCN VR. For example, for the subnet with overlay IP address range 10.0/16, IP address 10.0.0.1 may be reserved for a port of the VCN VR for that subnet. For the second subnet within the same VCN with address range 10.1/16, the VCN VR may have a port for that second subnet with IP address 10.1.0.1. The VCN VR has a different IP address for each of the subnets in the VCN.

In some other embodiments, each subnet within a VCN may have its own associated VR that is addressable by the subnet using a reserved or default IP address associated with the VR. The reserved or default IP address may, for example, be the first IP address from the range of IP addresses associated with that subnet. The VNICs in the subnet can communicate (e.g., send and receive packets) with the VR associated with the subnet using this default or reserved IP address. In such an embodiment, the VR is the ingress/egress point for that subnet. The VR associated with a subnet within the VCN can communicate with other VRs associated with other subnets within the VCN. The VRs can also communicate with gateways associated with the VCN. The VR function for a subnet is running on or executed by one or more NVDs executing VNICs functionality for VNICs in the subnet.

Route tables, security rules, and DHCP options may be configured for a VCN. Route tables are virtual route tables for the VCN and include rules to route traffic from subnets within the VCN to destinations outside the VCN by way of gateways or specially configured instances. A VCN's route tables can be customized to control how packets are forwarded/routed to and from the VCN. DHCP options refers to configuration information that is automatically provided to the instances when they boot up.

Security rules configured for a VCN represent overlay firewall rules for the VCN. The security rules can include ingress and egress rules, and specify the types of traffic (e.g., based upon protocol and port) that is allowed in and out of the instances within the VCN. The customer can choose whether a given rule is stateful or stateless. For instance, the customer can allow incoming SSH traffic from anywhere to a set of instances by setting up a stateful ingress rule with source CIDR 0.0.0.0/0, and destination TCP port 22. Security rules can be implemented using network security groups or security lists. A network security group consists of a set of security rules that apply only to the resources in that group. A security list, on the other hand, includes rules that apply to all the resources in any subnet that uses the security list. A VCN may be provided with a default security list with default security rules. DHCP options configured for a VCN provide configuration information that is automatically provided to the instances in the VCN when the instances boot up.

In certain embodiments, the configuration information for a VCN is determined and stored by a VCN Control Plane. The configuration information for a VCN may include, for example, information about the address range associated with the VCN, subnets within the VCN and associated information, one or more VRs associated with the VCN, compute instances in the VCN and associated VNICs, NVDs executing the various virtualization network functions (e.g., VNICs, VRs, gateways) associated with the VCN, state information for the VCN, and other VCN-related information. In certain embodiments, a VCN Distribution Service publishes the configuration information stored by the VCN Control Plane, or portions thereof, to the NVDs. The distributed information may be used to update information (e.g., forwarding tables, routing tables, etc.) stored and used by the NVDs to forward packets to and from the compute instances in the VCN.

In certain embodiments, the creation of VCNs and subnets are handled by a VCN Control Plane (CP), and the launching of compute instances is handled by a Compute Control Plane. The Compute Control Plane is responsible for allocating the physical resources for the compute instance and then calls the VCN Control Plane to create and attach VNICs to the compute instance. The VCN CP also sends VCN data mappings to the VCN data plane that is configured to perform packet forwarding and routing functions. In certain embodiments, the VCN CP provides a distribution service that is responsible for providing updates to the VCN data plane. Examples of a VCN Control Plane are also depicted in FIGS. 12, 13, 14, and 15 (see references 1216, 1316, 1416, and 1516) and described below.

A customer may create one or more VCNs using resources hosted by CSPI. A compute instance deployed on a customer VCN may communicate with different endpoints. These endpoints can include endpoints that are hosted by CSPI and endpoints outside CSPI.

Various different architectures for implementing cloud-based service using CSPI are depicted in FIGS. 1, 2, 3, 4, 5, and 12-16, and are described below. FIG. 1 is a high-level diagram of a distributed environment 100 showing an overlay or customer VCN hosted by CSPI according to certain embodiments. The distributed environment depicted in FIG. 1 includes multiple components in the overlay network. Distributed environment 100 depicted in FIG. 1 is merely an example and is not intended to unduly limit the scope of claimed embodiments. Many variations, alternatives, and modifications are possible. For example, in some implementations, the distributed environment depicted in FIG. 1 may have more or fewer systems or components than those shown in FIG. 1, may combine two or more systems, or may have a different configuration or arrangement of systems.

As shown in the example depicted in FIG. 1, distributed environment 100 comprises CSPI 101 that provides services and resources that customers can subscribe to and use to build their virtual cloud networks (VCNs). In certain embodiments, CSPI 101 offers IaaS services to subscribing customers. The data centers within CSPI 101 may be organized into one or more regions. One example region "Region US" 102 is shown in FIG. 1. A customer has configured a customer VCN c/o Oracle International Corporation for region 102. The customer may deploy various compute instances on VCN 104, where the compute instances may include virtual machines or bare metal instances. Examples of instances include applications, database, load balancers, and the like.

In the embodiment depicted in FIG. 1, customer VCN 104 comprises two subnets, namely, "Subnet-1" and "Subnet-2", each subnet with its own CIDR IP address range. In FIG. 1, the overlay IP address range for Subnet-1 is 10.0/16 and the address range for Subnet-2 is 10.1/16. A VCN Virtual Router 105 represents a logical gateway for the VCN that enables communications between subnets of the VCN 104, and with other endpoints outside the VCN. VCN VR 105 is configured to route traffic between VNICs in VCN 104 and gateways associated with VCN 104. VCN VR 105 provides a port for each subnet of VCN 104. For example, VR 105 may provide a port with IP address 10.0.0.1 for Subnet-1 and a port with IP address 10.1.0.1 for Subnet-2.

Multiple compute instances may be deployed on each subnet, where the compute instances can be virtual machine instances, and/or bare metal instances. The compute instances in a subnet may be hosted by one or more host machines within CSPI 101. A compute instance participates in a subnet via a VNIC associated with the compute instance. For example, as shown in FIG. 1, a compute instance C1 is part of Subnet-1 via a VNIC associated with the compute instance. Likewise, compute instance C2 is part of Subnet-1 via a VNIC associated with C2. In a similar manner, multiple compute instances, which may be virtual machine instances or bare metal instances, may be part of Subnet-1. Via its associated VNIC, each compute instance is assigned a private overlay IP address and a MAC address. For example, in FIG. 1, compute instance C1 has an overlay IP address of 10.0.0.2 and a MAC address of M1, while compute instance C2 has a private overlay IP address of 10.0.0.3 and a MAC address of M2. Each compute instance in Subnet-1, including compute instances C1 and C2, has a default route to VCN VR 105 using IP address 10.0.0.1, which is the IP address for a port of VCN VR 105 for Subnet-1.

Subnet-2 can have multiple compute instances deployed on it, including virtual machine instances and/or bare metal instances. For example, as shown in FIG. 1, compute instances D1 and D2 are part of Subnet-2 via VNICs associated with the respective compute instances. In the embodiment depicted in FIG. 1, compute instance D1 has an overlay IP address of 10.1.0.2 and a MAC address of MM1, while compute instance D2 has a private overlay IP address of 10.1.0.3 and a MAC address of MM2. Each compute instance in Subnet-2, including compute instances D1 and D2, has a default route to VCN VR 105 using IP address 10.1.0.1, which is the IP address for a port of VCN VR 105 for Subnet-2.

VCN A 104 may also include one or more load balancers. For example, a load balancer may be provided for a subnet and may be configured to load balance traffic across multiple compute instances on the subnet. A load balancer may also be provided to load balance traffic across subnets in the VCN.

A particular compute instance deployed on VCN 104 can communicate with various different endpoints. These endpoints may include endpoints that are hosted by CSPI 200 and endpoints outside CSPI 200. Endpoints that are hosted by CSPI 101 may include: an endpoint on the same subnet as the particular compute instance (e.g., communications between two compute instances in Subnet-1); an endpoint on a different subnet but within the same VCN (e.g., communication between a compute instance in Subnet-1 and a compute instance in Subnet-2); an endpoint in a different VCN in the same region (e.g., communications between a compute instance in Subnet-1 and an endpoint in a VCN in the same region 106 or 110, communications between a compute instance in Subnet-1 and an endpoint in service network 110 in the same region); or an endpoint in a VCN in a different region (e.g., communications between a compute instance in Subnet-1 and an endpoint in a VCN in a different region 108). A compute instance in a subnet hosted by CSPI 101 may also communicate with endpoints that are not hosted by CSPI 101 (i.e., are outside CSPI 101). These outside endpoints include endpoints in the customer's on-premises network 116, endpoints within other remote cloud hosted networks 118, public endpoints 114 accessible via a public network such as the Internet, and other endpoints.

Communications between compute instances on the same subnet are facilitated using VNICs associated with the source compute instance and the destination compute instance. For example, compute instance C1 in Subnet-1 may want to send packets to compute instance C2 in Subnet-1. For a packet originating at a source compute instance and whose destination is another compute instance in the same subnet, the packet is first processed by the VNIC associated with the source compute instance. Processing performed by the VNIC associated with the source compute instance can include determining destination information for the packet from the packet headers, identifying any policies (e.g., security lists) configured for the VNIC associated with the source compute instance, determining a next hop for the packet, performing any packet encapsulation/decapsulation functions as needed, and then forwarding/routing the packet to the next hop with the goal of facilitating communication of the packet to its intended destination. When the destination compute instance is in the same subnet as the source compute instance, the VNIC associated with the source compute instance is configured to identify the VNIC associated with the destination compute instance and forward the packet to that VNIC for processing. The VNIC associated with the destination compute instance is then executed and forwards the packet to the destination compute instance.

For a packet to be communicated from a compute instance in a subnet to an endpoint in a different subnet in the same VCN, the communication is facilitated by the VNICs associated with the source and destination compute instances and the VCN VR. For example, if compute instance C1 in Subnet-1 in FIG. 1 wants to send a packet to compute instance D1 in Subnet-2, the packet is first processed by the VNIC associated with compute instance C1. The VNIC associated with compute instance C1 is configured to route the packet to the VCN VR 105 using default route or port 10.0.0.1 of the VCN VR. VCN VR 105 is configured to route the packet to Subnet-2 using port 10.1.0.1. The packet is then received and processed by the VNIC associated with D1 and the VNIC forwards the packet to compute instance D1.

For a packet to be communicated from a compute instance in VCN 104 to an endpoint that is outside VCN 104, the communication is facilitated by the VNIC associated with the source compute instance, VCN VR 105, and gateways associated with VCN 104. One or more types of gateways may be associated with VCN 104. A gateway is an interface between a VCN and another endpoint, where another endpoint is outside the VCN. A gateway is a Layer-3/IP layer concept and enables a VCN to communicate with endpoints outside the VCN. A gateway thus facilitates traffic flow between a VCN and other VCNs or networks. Various different types of gateways may be configured for a VCN to facilitate different types of communications with different types of endpoints. Depending upon the gateway, the communications may be over public networks (e.g., the Internet) or over private networks. Various communication protocols may be used for these communications.

For example, compute instance C1 may want to communicate with an endpoint outside VCN 104. The packet may be first processed by the VNIC associated with source compute instance C1. The VNIC processing determines that the destination for the packet is outside the Subnet-1 of C1. The VNIC associated with C1 may forward the packet to VCN VR 105 for VCN 104. VCN VR 105 then processes the packet and as part of the processing, based upon the destination for the packet, determines a particular gateway associated with VCN 104 as the next hop for the packet. VCN VR 105 may then forward the packet to the particular identified gateway. For example, if the destination is an endpoint within the customer's on-premise network, then the packet may be forwarded by VCN VR 105 to Dynamic Routing Gateway (DRG) gateway 122 configured for VCN 104. The packet may then be forwarded from the gateway to a next hop to facilitate communication of the packet to it final intended destination.

Various different types of gateways may be configured for a VCN. Examples of gateways that may be configured for a VCN are depicted in FIG. 1 and described below. Examples of gateways associated with a VCN are also depicted in FIGS. 12, 13, 14, and 15 (for example, gateways referenced by reference numbers 1234, 1236, 1238, 1334, 1336, 1338, 1434, 1436, 1438, 1534, 1536, and 1538) and described below. As shown in the embodiment depicted in FIG. 1, a Dynamic Routing Gateway (DRG) 122 may be added to or be associated with customer VCN 104 and provides a path for private network traffic communication between customer VCN 104 and another endpoint, where the another endpoint can be the customer's on-premise network 116, a VCN 108 in a different region of CSPI 101, or other remote cloud networks 118 not hosted by CSPI 101. Customer on-premise network 116 may be a customer network or a customer data center built using the customer's resources. Access to customer on-premise network 116 is generally very restricted. For a customer that has both a customer on-premise network 116 and one or more VCNs 104 deployed or hosted in the cloud by CSPI 101, the customer may want their on-premise network 116 and their cloud based VCN 104 to be able to communicate with each other. This enables a customer to build an extended hybrid environment encompassing the customer's VCN 104 hosted by CSPI 101 and their on-premises network 116. DRG 122 enables this communication. To enable such communications, a communication channel 124 is set up where one endpoint of the channel is in customer on-premise network 116 and the other endpoint is in CSPI 101 and connected to customer VCN 104. Communication channel 124 can be over public communication networks such as the Internet or private communication networks. Various different communication protocols may be used such as IPsec VPN technology over a public communication network such as the Internet, Oracle's Fast-Connect technology that uses a private network instead of a public network, and others. The device or equipment in customer on-premise network 116 that forms one end point for communication channel 124 is referred to as the customer premise equipment (CPE), such as CPE 126 depicted in FIG. 1. On the CSPI 101 side, the endpoint may be a host machine executing DRG 122.

In certain embodiments, a Remote Peering Connection (RPC) can be added to a DRG, which allows a customer to peer one VCN with another VCN in a different region. Using such an RPC, customer VCN 104 can use DRG 122 to connect with a VCN 108 in another region. DRG 122 may also be used to communicate with other remote cloud networks 118, not hosted by CSPI 101 such as a Microsoft Azure cloud, Amazon AWS cloud, and others.

As shown in FIG. 1, an Internet Gateway (IGW) 120 may be configured for customer VCN 104 the enables a compute instance on VCN 104 to communicate with public endpoints 114 accessible over a public network such as the Internet. IGW 120 is a gateway that connects a VCN to a public network such as the Internet. IGW 120 enables a public subnet (where the resources in the public subnet have public overlay IP addresses) within a VCN, such as VCN 104, direct access to public endpoints 112 on a public network 114 such as the Internet. Using IGW 120, connections can be initiated from a subnet within VCN 104 or from the Internet.

A Network Address Translation (NAT) gateway 128 can be configured for customer's VCN 104 and enables cloud resources in the customer's VCN, which do not have dedicated public overlay IP addresses, access to the Internet and it does so without exposing those resources to direct incoming Internet connections (e.g., L4-L7 connections). This enables a private subnet within a VCN, such as private Subnet-1 in VCN 104, with private access to public endpoints on the Internet. In NAT gateways, connections can be initiated only from the private subnet to the public Internet and not from the Internet to the private subnet.

In certain embodiments, a Service Gateway (SGW) 126 can be configured for customer VCN 104 and provides a path for private network traffic between VCN 104 and supported services endpoints in a service network 110. In certain embodiments, service network 110 may be provided by the CSP and may provide various services. An example of such a service network is Oracle's Services Network, which provides various services that can be used by customers. For example, a compute instance (e.g., a database system) in a private subnet of customer VCN 104 can back up data to a service endpoint (e.g., Object Storage) without needing public IP addresses or access to the Internet. In certain embodiments, a VCN can have only one SGW, and connections can only be initiated from a subnet within the VCN and not from service network 110. If a VCN is peered with another, resources in the other VCN typically cannot access the SGW. Resources in on-premises networks that are connected to a VCN with FastConnect or VPN Connect can also use the service gateway configured for that VCN.

In certain implementations, SGW 126 uses the concept of a service Classless Inter-Domain Routing (CIDR) label, which is a string that represents all the regional public IP address ranges for the service or group of services of interest. The customer uses the service CIDR label when they configure the SGW and related route rules to control traffic to the service. The customer can optionally utilize it when configuring security rules without needing to adjust them if the service's public IP addresses change in the future.

A Local Peering Gateway (LPG) 132 is a gateway that can be added to customer VCN 104 and enables VCN 104 to peer with another VCN in the same region. Peering means that the VCNs communicate using private IP addresses, without the traffic traversing a public network such as the Internet or without routing the traffic through the customer's on-premises network 116. In preferred embodiments, a VCN has a separate LPG for each peering it establishes. Local Peering or VCN Peering is a common practice used to establish network connectivity between different applications or infrastructure management functions.

Service providers, such as providers of services in service network 110, may provide access to services using different access models. According to a public access model, services may be exposed as public endpoints that are publicly accessible by compute instance in a customer VCN via a public network such as the Internet and or may be privately accessible via SGW 126. According to a specific private access model, services are made accessible as private IP endpoints in a private subnet in the customer's VCN. This is referred to as a Private Endpoint (PE) access and enables a service provider to expose their service as an instance in the customer's private network. A Private Endpoint resource represents a service within the customer's VCN. Each PE manifests as a VNIC (referred to as a PE-VNIC, with one or more private IPs) in a subnet chosen by the customer in the customer's VCN. A PE thus provides a way to present a service within a private customer VCN subnet using a VNIC. Since the endpoint is exposed as a VNIC, all the features associates with a VNIC such as routing rules, security lists, etc., are now available for the PE VNIC.

A service provider can register their service to enable access through a PE. The provider can associate policies with the service that restricts the service's visibility to the customer tenancies. A provider can register multiple services under a single virtual IP address (VIP), especially for multi-tenant services. There may be multiple such private endpoints (in multiple VCNs) that represent the same service.

Compute instances in the private subnet can then use the PE VNIC's private IP address or the service DNS name to access the service. Compute instances in the customer VCN can access the service by sending traffic to the private IP address of the PE in the customer VCN. A Private Access Gateway (PAGW) 130 is a gateway resource that can be attached to a service provider VCN (e.g., a VCN in service network 110) that acts as an ingress/egress point for all traffic from/to customer subnet private endpoints. PAGW 130 enables a provider to scale the number of PE connections without utilizing its internal IP address resources. A provider needs only configure one PAGW for any number of services registered in a single VCN. Providers can represent a service as a private endpoint in multiple VCNs of one or more customers. From the customer's perspective, the PE VNIC, which, instead of being attached to a customer's instance, appears attached to the service with which the customer wishes to interact. The traffic destined to the private endpoint is routed via PAGW 130 to the service. These are referred to as customer-to-service private connections (C2S connections).

The PE concept can also be used to extend the private access for the service to customer's on-premises networks and data centers, by allowing the traffic to flow through FastConnect/IPsec links and the private endpoint in the customer VCN. Private access for the service can also be extended to the customer's peered VCNs, by allowing the traffic to flow between LPG 132 and the PE in the customer's VCN.

A customer can control routing in a VCN at the subnet level, so the customer can specify which subnets in the customer's VCN, such as VCN 104, use each gateway. A VCN's route tables are used to decide if traffic is allowed out of a VCN through a particular gateway. For example, in a particular instance, a route table for a public subnet within customer VCN 104 may send non-local traffic through IGW 120. The route table for a private subnet within the same customer VCN 104 may send traffic destined for CSP services through SGW 126. All remaining traffic may be sent via the NAT gateway 128. Route tables only control traffic going out of a VCN.

Security lists associated with a VCN are used to control traffic that comes into a VCN via a gateway via inbound connections. All resources in a subnet use the same route table and security lists. Security lists may be used to control specific types of traffic allowed in and out of instances in a subnet of a VCN. Security list rules may comprise ingress (inbound) and egress (outbound) rules. For example, an ingress rule may specify an allowed source address range, while an egress rule may specify an allowed destination address range. Security rules may specify a particular protocol (e.g., TCP, ICMP), a particular port (e.g., 22 for SSH, 3389 for Windows RDP), etc. In certain implementations, an instance's operating system may enforce its own firewall rules that are aligned with the security list rules. Rules may be stateful (e.g., a connection is tracked, and the response is automatically allowed without an explicit security list rule for the response traffic) or stateless.

Access from a customer VCN (i.e., by a resource or compute instance deployed on VCN 104) can be categorized as public access, private access, or dedicated access. Public access refers to an access model where a public IP address or a NAT is used to access a public endpoint. Private access enables customer workloads in VCN 104 with private IP addresses (e.g., resources in a private subnet) to access services without traversing a public network such as the Internet. In certain embodiments, CSPI 101 enables customer VCN workloads with private IP addresses to access the (public service endpoints of) services using a service gateway. A service gateway thus offers a private access model by establishing a virtual link between the customer's VCN and the service's public endpoint residing outside the customer's private network.

Additionally, CSPI may offer dedicated public access using technologies such as FastConnect public peering where customer on-premises instances can access one or more services in a customer VCN using a FastConnect connection and without traversing a public network such as the Internet. CSPI also may also offer dedicated private access using FastConnect private peering where customer on-premises instances with private IP addresses can access the customer's VCN workloads using a FastConnect connection. FastConnect is a network connectivity alternative to using the public Internet to connect a customer's on-premise network to CSPI and its services. FastConnect provides an easy, elastic, and economical way to create a dedicated and private connection with higher bandwidth options and a more reliable and consistent networking experience when compared to Internet-based connections.

Figure 2:
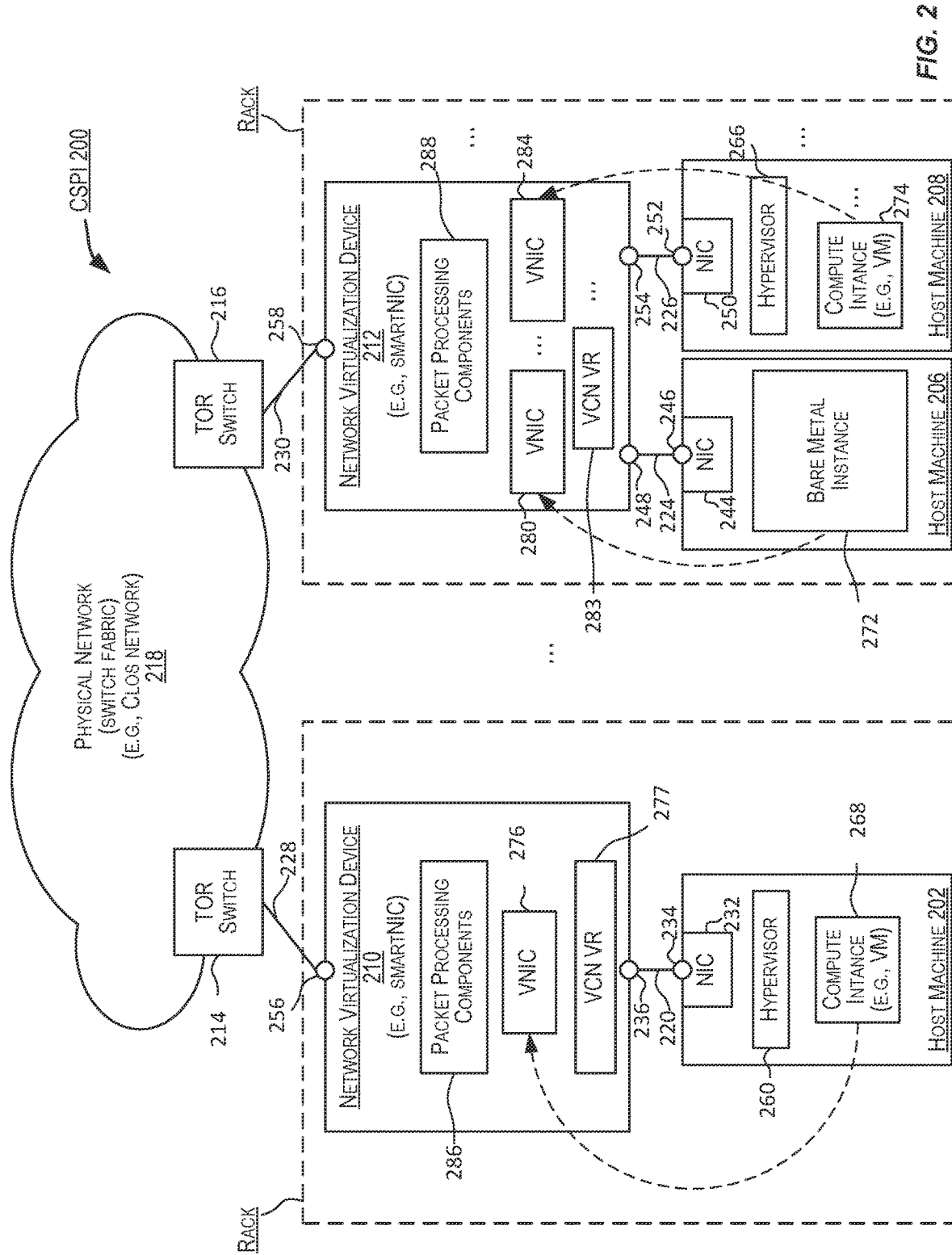
FIG. 2 depicts a simplified architectural diagram of the physical components in the physical network within CSPI according to certain embodiments.

FIG. 1 and the accompanying description above describes various virtualized components in an example virtual network. As described above, the virtual network is built on the underlying physical or substrate network. FIG. 2 depicts a simplified architectural diagram of the physical components in the physical network within CSPI 200 that provide the underlay for the virtual network according to certain embodiments. As shown, CSPI 200 provides a distributed environment comprising components and resources (e.g., compute, memory, and networking resources) provided by a cloud service provider (CSP). These components and resources are used to provide cloud services (e.g., IaaS services) to subscribing customers, i.e., customers that have subscribed to one or more services provided by the CSP. Based upon the services subscribed to by a customer, a subset of resources (e.g., compute, memory, and networking resources) of CSPI 200 are provisioned for the customer. Customers can then build their own cloud-based (i.e., CSPI-hosted) customizable and private virtual networks using physical compute, memory, and networking resources provided by CSPI 200. As previously indicated, these customer networks are referred to as virtual cloud networks (VCNs). A customer can deploy one or more customer resources, such as compute instances, on these customer VCNs. Compute instances can be in the form of virtual machines, bare metal instances, and the like. CSPI 200 provides infrastructure and a set of complementary cloud services that enable customers to build and run a wide range of applications and services in a highly available hosted environment.

In the example embodiment depicted in FIG. 2, the physical components of CSPI 200 include one or more physical host machines or physical servers (e.g., 202, 206, 208), network virtualization devices (NVDs) (e.g., 210, 212), top-of-rack (TOR) switches (e.g., 214, 216), and a physical network (e.g., 218), and switches in physical network 218. The physical host machines or servers may host and execute various compute instances that participate in one or more subnets of a VCN. The compute instances may include virtual machine instances, and bare metal instances. For example, the various compute instances depicted in FIG. 1 may be hosted by the physical host machines depicted in FIG. 2. The virtual machine compute instances in a VCN may be executed by one host machine or by multiple different host machines. The physical host machines may also host virtual host machines, container-based hosts or functions, and the like. The VNICs and VCN VR depicted in FIG. 1 may be executed by the NVDs depicted in FIG. 2. The gateways depicted in FIG. 1 may be executed by the host machines and/or by the NVDs depicted in FIG. 2.

The host machines or servers may execute a hypervisor (also referred to as a virtual machine monitor or VMM) that creates and enables a virtualized environment on the host machines. The virtualization or virtualized environment facilitates cloud-based computing. One or more compute instances may be created, executed, and managed on a host machine by a hypervisor on that host machine. The hypervisor on a host machine enables the physical computing resources of the host machine (e.g., compute, memory, and networking resources) to be shared between the various compute instances executed by the host machine.

For example, as depicted in FIG. 2, host machines 202 and 208 execute hypervisors 260 and 266, respectively. These hypervisors may be implemented using software, firmware, or hardware, or combinations thereof. Typically, a hypervisor is a process or a software layer that sits on top of the host machine's operating system (OS), which in turn executes on the hardware processors of the host machine. The hypervisor provides a virtualized environment by enabling the physical computing resources (e.g., processing resources such as processors/cores, memory resources, networking resources) of the host machine to be shared among the various virtual machine compute instances executed by the host machine. For example, in FIG. 2, hypervisor 260 may sit on top of the OS of host machine 202 and enables the computing resources (e.g., processing, memory, and networking resources) of host machine 202 to be shared between compute instances (e.g., virtual machines) executed by host machine 202. A virtual machine can have its own operating system (referred to as a guest operating system), which may be the same as or different from the OS of the host machine. The operating system of a virtual machine executed by a host machine may be the same as or different from the operating system of another virtual machine executed by the same host machine. A hypervisor thus enables multiple operating systems to be executed alongside each other while sharing the same computing resources of the host machine. The host machines depicted in FIG. 2 may have the same or different types of hypervisors.

A compute instance can be a virtual machine instance or a bare metal instance. In FIG. 2, compute instances 268 on host machine 202 and 274 on host machine 208 are examples of virtual machine instances. Host machine 206 is an example of a bare metal instance that is provided to a customer.

In certain instances, an entire host machine may be provisioned to a single customer, and all of the one or more compute instances (either virtual machines or bare metal instance) hosted by that host machine belong to that same customer. In other instances, a host machine may be shared between multiple customers (i.e., multiple tenants). In such a multi-tenancy scenario, a host machine may host virtual machine compute instances belonging to different customers. These compute instances may be members of different VCNs of different customers. In certain embodiments, a bare metal compute instance is hosted by a bare metal server without a hypervisor. When a bare metal compute instance is provisioned, a single customer or tenant maintains control of the physical CPU, memory, and network interfaces of the host machine hosting the bare metal instance and the host machine is not shared with other customers or tenants.

As previously described, each compute instance that is part of a VCN is associated with a VNIC that enables the compute instance to become a member of a subnet of the VCN. The VNIC associated with a compute instance facilitates the communication of packets or frames to and from the compute instance. A VNIC is associated with a compute instance when the compute instance is created. In certain embodiments, for a compute instance executed by a host machine, the VNIC associated with that compute instance is executed by an NVD connected to the host machine. For example, in FIG. 2, host machine 202 executes a virtual machine compute instance 268 that is associated with VNIC 276, and VNIC 276 is executed by NVD 210 connected to host machine 202. As another example, bare metal instance 272 hosted by host machine 206 is associated with VNIC 280 that is executed by NVD 212 connected to host machine 206. As yet another example, VNIC 284 is associated with compute instance 274 executed by host machine 208, and VNIC 284 is executed by NVD 212 connected to host machine 208.

For compute instances hosted by a host machine, an NVD connected to that host machine also executes VCN VRs corresponding to VCNs of which the compute instances are members. For example, in the embodiment depicted in FIG. 2, NVD 210 executes VCN VR 277 corresponding to the VCN of which compute instance 268 is a member. NVD 212 may also execute one or more VCN VRs 283 corresponding to VCNs corresponding to the compute instances hosted by host machines 206 and 208.

A host machine may include one or more network interface cards (NIC) that enable the host machine to be connected to other devices. A NIC on a host machine may provide one or more ports (or interfaces) that enable the host machine to be communicatively connected to another device. For example, a host machine may be connected to an NVD using one or more ports (or interfaces) provided on the host machine and on the NVD. A host machine may also be connected to other devices such as another host machine.

For example, in FIG. 2, host machine 202 is connected to NVD 210 using link 220 that extends between a port 234 provided by a NIC 232 of host machine 202 and between a port 236 of NVD 210. Host machine 206 is connected to NVD 212 using link 224 that extends between a port 246 provided by a NIC 244 of host machine 206 and between a port 248 of NVD 212. Host machine 208 is connected to NVD 212 using link 226 that extends between a port 252 provided by a NIC 250 of host machine 208 and between a port 254 of NVD 212.

The NVDs are in turn connected via communication links to top-of-the-rack (TOR) switches, which are connected to physical network 218 (also referred to as the switch fabric). In certain embodiments, the links between a host machine and an NVD, and between an NVD and a TOR switch are Ethernet links. For example, in FIG. 2, NVDs 210 and 212 are connected to TOR switches 214 and 216, respectively, using links 228 and 230. In certain embodiments, the links 220, 224, 226, 228, and 230 are Ethernet links. The collection of host machines and NVDs that are connected to a TOR is sometimes referred to as a rack.

Figure 5:
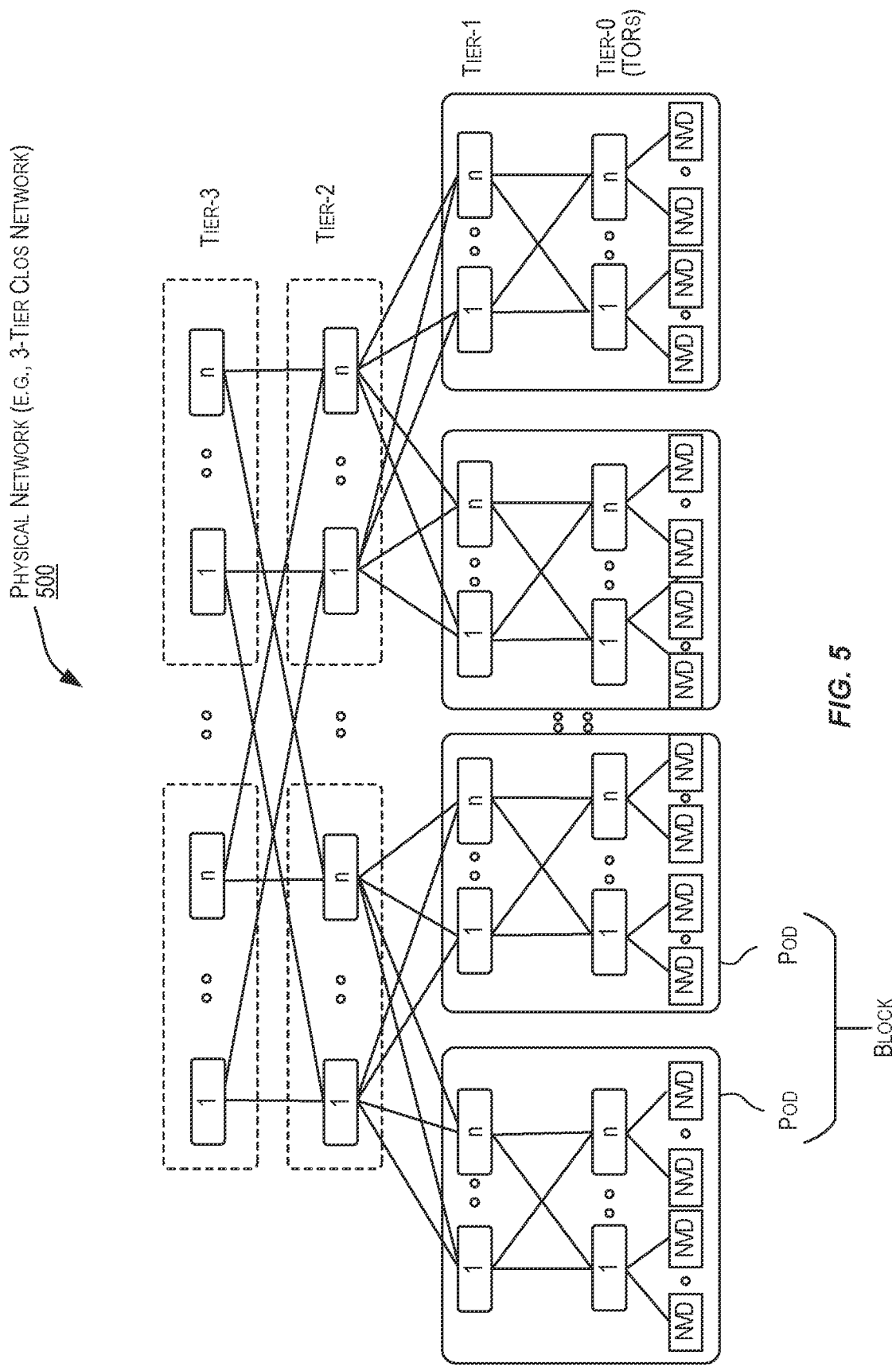
FIG. 5 depicts a simplified block diagram of a physical network provided by a CSPI according to certain embodiments.

Physical network 218 provides a communication fabric that enables TOR switches to communicate with each other. Physical network 218 can be a multi-tiered network. In certain implementations, physical network 218 is a multi-tiered Clos network of switches, with TOR switches 214 and 216 representing the leaf level nodes of the multi-tiered and multi-node physical switching network 218. Different Clos network configurations are possible including but not limited to a 2-tier network, a 3-tier network, a 4-tier network, a 5-tier network, and in general a "n"-tiered network. An example of a Clos network is depicted in FIG. 5 and described below.

Various different connection configurations are possible between host machines and NVDs such as one-to-one configuration, many-to-one configuration, one-to-many configuration, and others. In a one-to-one configuration implementation, each host machine is connected to its own separate NVD. For example, in FIG. 2, host machine 202 is connected to NVD 210 via NIC 232 of host machine 202. In a many-to-one configuration, multiple host machines are connected to one NVD. For example, in FIG. 2, host machines 206 and 208 are connected to the same NVD 212 via NICs 244 and 250, respectively.

Figure 3:
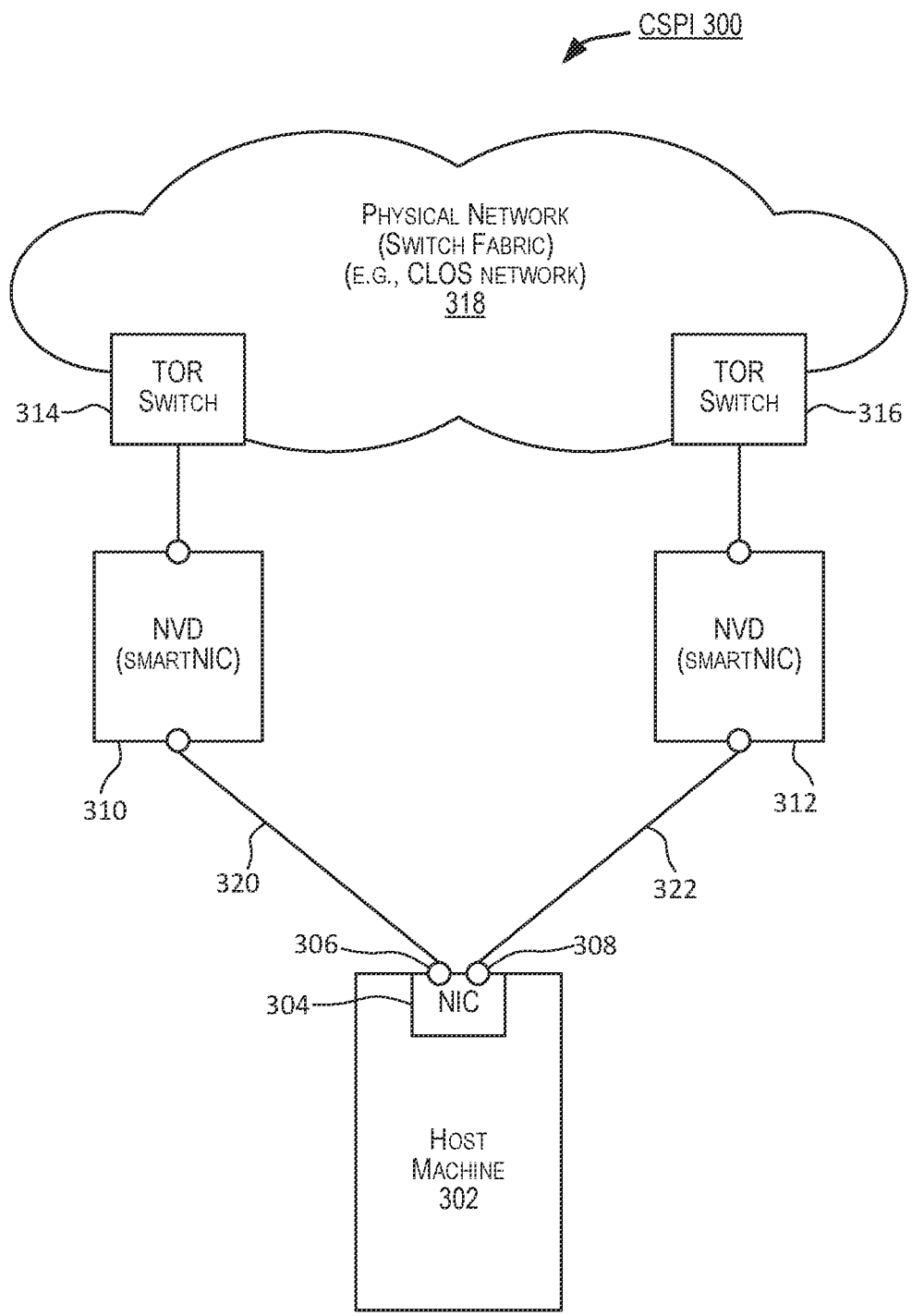
FIG. 3 shows an example arrangement within CSPI where a host machine is connected to multiple network virtualization devices (NVDs) according to certain embodiments.

In a one-to-many configuration, one host machine is connected to multiple NVDs. FIG. 3 shows an example within CSPI 300 where a host machine is connected to multiple NVDs. As shown in FIG. 3, host machine 302 comprises a network interface card (NIC) 304 that includes multiple ports 306 and 308. Host machine 300 is connected to a first NVD 310 via port 306 and link 320 and connected to a second NVD 312 via port 308 and link 322. Ports 306 and 308 may be Ethernet ports and the links 320 and 322 between host machine 302 and NVDs 310 and 312 may be Ethernet links. NVD 310 is in turn connected to a first TOR switch 314 and NVD 312 is connected to a second TOR switch 316. The links between NVDs 310 and 312, and TOR switches 314 and 316 may be Ethernet links. TOR switches 314 and 316 represent the Tier-0 switching devices in multi-tiered physical network 318.

The arrangement depicted in FIG. 3 provides two separate physical network paths to and from physical switch network 318 to host machine 302: a first path traversing TOR switch 314 to NVD 310 to host machine 302, and a second path traversing TOR switch 316 to NVD 312 to host machine 302. The separate paths provide for enhanced availability (referred to as high availability) of host machine 302. If there are problems in one of the paths (e.g., a link in one of the paths goes down) or devices (e.g., a particular NVD is not functioning), then the other path may be used for communications to/from host machine 302.

In the configuration depicted in FIG. 3, the host machine is connected to two different NVDs using two different ports provided by a NIC of the host machine. In other embodiments, a host machine may include multiple NICs that enable connectivity of the host machine to multiple NVDs.

Referring back to FIG. 2, an NVD is a physical device or component that performs one or more network and/or storage virtualization functions. An NVD may be any device with one or more processing units (e.g., CPUs, Network Processing Units (NPUs), FPGAs, packet processing pipelines, etc.), memory including cache, and ports. The various virtualization functions may be performed by software/firmware executed by the one or more processing units of the NVD.

An NVD may be implemented in various different forms. For example, in certain embodiments, an NVD is implemented as an interface card referred to as a smartNIC or an intelligent MC with an embedded processor onboard. A smartNIC is a separate device from the NICs on the host machines. In FIG. 2, the NVDs 210 and 212 may be implemented as smartNICs that are connected to host machines 202, and host machines 206 and 208, respectively.

A smartNIC is however just one example of an NVD implementation. Various other implementations are possible. For example, in some other implementations, an NVD or one or more functions performed by the NVD may be incorporated into or performed by one or more host machines, one or more TOR switches, and other components of CSPI 200. For example, an NVD may be embodied in a host machine where the functions performed by an NVD are performed by the host machine. As another example, an NVD may be part of a TOR switch, or a TOR switch may be configured to perform functions performed by an NVD that enables the TOR switch to perform various complex packet transformations that are used for a public cloud. A TOR that performs the functions of an NVD is sometimes referred to as a smart TOR. In yet other implementations, where virtual machines (VMs) instances, but not bare metal (BM) instances, are offered to customers, functions performed by an NVD may be implemented inside a hypervisor of the host machine. In some other implementations, some of the functions of the NVD may be offloaded to a centralized service running on a fleet of host machines.

In certain embodiments, such as when implemented as a smartNIC as shown in FIG. 2, an NVD may comprise multiple physical ports that enable it to be connected to one or more host machines and to one or more TOR switches. A port on an NVD can be classified as a host-facing port (also referred to as a "south port") or a network-facing or TOR-facing port (also referred to as a "north port"). A host-facing port of an NVD is a port that is used to connect the NVD to a host machine. Examples of host-facing ports in FIG. 2 include port 236 on NVD 210, and ports 248 and 254 on NVD 212. A network-facing port of an NVD is a port that is used to connect the NVD to a TOR switch. Examples of network-facing ports in FIG. 2 include port 256 on NVD 210, and port 258 on NVD 212. As shown in FIG. 2, NVD 210 is connected to TOR switch 214 using link 228 that extends from port 256 of NVD 210 to the TOR switch 214. Likewise, NVD 212 is connected to TOR switch 216 using link 230 that extends from port 258 of NVD 212 to the TOR switch 216.

An NVD receives packets and frames from a host machine (e.g., packets and frames generated by a compute instance hosted by the host machine) via a host-facing port and, after performing the necessary packet processing, may forward the packets and frames to a TOR switch via a network-facing port of the NVD. An NVD may receive packets and frames from a TOR switch via a network-facing port of the NVD and, after performing the necessary packet processing, may forward the packets and frames to a host machine via a host-facing port of the NVD.

In certain embodiments, there may be multiple ports and associated links between an NVD and a TOR switch. These ports and links may be aggregated to form a link aggregator group of multiple ports or links (referred to as a LAG). Link aggregation allows multiple physical links between two endpoints (e.g., between an NVD and a TOR switch) to be treated as a single logical link. All the physical links in a given LAG may operate in full-duplex mode at the same speed. LAGs help increase the bandwidth and reliability of the connection between two endpoints. If one of the physical links in the LAG goes down, traffic is dynamically and transparently reassigned to one of the other physical links in the LAG. The aggregated physical links deliver higher bandwidth than each individual link. The multiple ports associated with a LAG are treated as a single logical port. Traffic can be load-balanced across the multiple physical links of a LAG. One or more LAGs may be configured between two endpoints. The two endpoints may be between an NVD and a TOR switch, between a host machine and an NVD, and the like.

An NVD implements or performs network virtualization functions. These functions are performed by software/firmware executed by the NVD. Examples of network virtualization functions include without limitation: packet encapsulation and de-capsulation functions; functions for creating a VCN network; functions for implementing network policies such as VCN security list (firewall) functionality; functions that facilitate the routing and forwarding of packets to and from compute instances in a VCN; and the like. In certain embodiments, upon receiving a packet, an NVD is configured to execute a packet processing pipeline for processing the packet and determining how the packet is to be forwarded or routed. As part of this packet processing pipeline, the NVD may execute one or more virtual functions associated with the overlay network such as executing VNICs associated with compute instances in the VCN, executing a Virtual Router (VR) associated with the VCN, the encapsulation and decapsulation of packets to facilitate forwarding or routing in the virtual network, execution of certain gateways (e.g., the Local Peering Gateway), the implementation of Security Lists, Network Security Groups, network address translation (NAT) functionality (e.g., the translation of Public IP to Private IP on a host by host basis), throttling functions, and other functions.

In certain embodiments, the packet processing data path in an NVD may comprise multiple packet pipelines, each composed of a series of packet transformation stages. In certain implementations, upon receiving a packet, the packet is parsed and classified to a single pipeline. The packet is then processed in a linear fashion, one stage after another, until the packet is either dropped or sent out over an interface of the NVD. These stages provide basic functional packet processing building blocks (e.g., validating headers, enforcing throttle, inserting new Layer-2 headers, enforcing L4 firewall, VCN encapsulation/decapsulation, etc.) so that new pipelines can be constructed by composing existing stages, and new functionality can be added by creating new stages and inserting them into existing pipelines.

An NVD may perform both control plane and data plane functions corresponding to a control plane and a data plane of a VCN. Examples of a VCN Control Plane are also depicted in FIGS. 12, 13, 14, and 15 (see references 1216, 1316, 1416, and 1516) and described below. Examples of a VCN Data Plane are depicted in FIGS. 12, 13, 14, and 15 (see references 1218, 1318, 1418, and 1518) and described below. The control plane functions include functions used for configuring a network (e.g., setting up routes and route tables, configuring VNICs, etc.) that controls how data is to be forwarded. In certain embodiments, a VCN Control Plane is provided that computes all the overlay-to-substrate mappings centrally and publishes them to the NVDs and to the virtual network edge devices such as various gateways such as the DRG, the SGW, the IGW, etc. Firewall rules may also be published using the same mechanism. In certain embodiments, an NVD only gets the mappings that are relevant for that NVD. The data plane functions include functions for the actual routing/forwarding of a packet based upon configuration set up using control plane. A VCN data plane is implemented by encapsulating the customer's network packets before they traverse the substrate network. The encapsulation/decapsulation functionality is implemented on the NVDs. In certain embodiments, an NVD is configured to intercept all network packets in and out of host machines and perform network virtualization functions.

As indicated above, an NVD executes various virtualization functions including VNICs and VCN VRs. An NVD may execute VNICs associated with the compute instances hosted by one or more host machines connected to the VNIC. For example, as depicted in FIG. 2, NVD 210 executes the functionality for VNIC 276 that is associated with compute instance 268 hosted by host machine 202 connected to NVD 210. As another example, NVD 212 executes VNIC 280 that is associated with bare metal compute instance 272 hosted by host machine 206 and executes VNIC 284 that is associated with compute instance 274 hosted by host machine 208. A host machine may host compute instances belonging to different VCNs, which belong to different customers, and the NVD connected to the host machine may execute the VNICs (i.e., execute VNICs-relate functionality) corresponding to the compute instances.

An NVD also executes VCN Virtual Routers corresponding to the VCNs of the compute instances. For example, in the embodiment depicted in FIG. 2, NVD 210 executes VCN VR 277 corresponding to the VCN to which compute instance 268 belongs. NVD 212 executes one or more VCN VRs 283 corresponding to one or more VCNs to which compute instances hosted by host machines 206 and 208 belong. In certain embodiments, the VCN VR corresponding to that VCN is executed by all the NVDs connected to host machines that host at least one compute instance belonging to that VCN. If a host machine hosts compute instances belonging to different VCNs, an NVD connected to that host machine may execute VCN VRs corresponding to those different VCNs.

In addition to VNICs and VCN VRs, an NVD may execute various software (e.g., daemons) and include one or more hardware components that facilitate the various network virtualization functions performed by the NVD. For purposes of simplicity, these various components are grouped together as "packet processing components" shown in FIG. 2. For example, NVD 210 comprises packet processing components 286 and NVD 212 comprises packet processing components 288. For example, the packet processing components for an NVD may include a packet processor that is configured to interact with the NVD's ports and hardware interfaces to monitor all packets received by and communicated using the NVD and store network information. The network information may, for example, include network flow information identifying different network flows handled by the NVD and per flow information (e.g., per flow statistics). In certain embodiments, network flows information may be stored on a per VNIC basis. The packet processor may perform packet-by-packet manipulations as well as implement stateful NAT and L4 firewall (FW). As another example, the packet processing components may include a replication agent that is configured to replicate information stored by the NVD to one or more different replication target stores. As yet another example, the packet processing components may include a logging agent that is configured to perform logging functions for the NVD. The packet processing components may also include software for monitoring the performance and health of the NVD and, also possibly of monitoring the state and health of other components connected to the NVD.

FIG. 1 shows the components of an example virtual or overlay network including a VCN, subnets within the VCN, compute instances deployed on subnets, VNICs associated with the compute instances, a VR for a VCN, and a set of gateways configured for the VCN. The overlay components depicted in FIG. 1 may be executed or hosted by one or more of the physical components depicted in FIG. 2. For example, the compute instances in a VCN may be executed or hosted by one or more host machines depicted in FIG. 2. For a compute instance hosted by a host machine, the VNIC associated with that compute instance is typically executed by an NVD connected to that host machine (i.e., the VNIC functionality is provided by the NVD connected to that host machine). The VCN VR function for a VCN is executed by all the NVDs that are connected to host machines hosting or executing the compute instances that are part of that VCN. The gateways associated with a VCN may be executed by one or more different types of NVDs. For example, certain gateways may be executed by smartNICs, while others may be executed by one or more host machines or other implementations of NVDs.

As described above, a compute instance in a customer VCN may communicate with various different endpoints, where the endpoints can be within the same subnet as the source compute instance, in a different subnet but within the same VCN as the source compute instance, or with an endpoint that is outside the VCN of the source compute instance. These communications are facilitated using VNICs associated with the compute instances, the VCN VRs, and the gateways associated with the VCNs.

For communications between two compute instances on the same subnet in a VCN, the communication is facilitated using VNICs associated with the source and destination compute instances. The source and destination compute instances may be hosted by the same host machine or by different host machines. A packet originating from a source compute instance may be forwarded from a host machine hosting the source compute instance to an NVD connected to that host machine. On the NVD, the packet is processed using a packet processing pipeline, which can include execution of the VNIC associated with the source compute instance. Since the destination endpoint for the packet is within the same subnet, execution of the VNIC associated with the source compute instance results in the packet being forwarded to an NVD executing the VNIC associated with the destination compute instance, which then processes and forwards the packet to the destination compute instance. The VNICs associated with the source and destination compute instances may be executed on the same NVD (e.g., when both the source and destination compute instances are hosted by the same host machine) or on different NVDs (e.g., when the source and destination compute instances are hosted by different host machines connected to different NVDs). The VNICs may use routing/forwarding tables stored by the NVD to determine the next hop for the packet.

For a packet to be communicated from a compute instance in a subnet to an endpoint in a different subnet in the same VCN, the packet originating from the source compute instance is communicated from the host machine hosting the source compute instance to the NVD connected to that host machine. On the NVD, the packet is processed using a packet processing pipeline, which can include execution of one or more VNICs, and the VR associated with the VCN. For example, as part of the packet processing pipeline, the NVD executes or invokes functionality corresponding to the VNIC (also referred to as executes the VNIC) associated with source compute instance. The functionality performed by the VNIC may include looking at the VLAN tag on the packet. Since the packet's destination is outside the subnet, the VCN VR functionality is next invoked and executed by the NVD. The VCN VR then routes the packet to the NVD executing the VNIC associated with the destination compute instance. The VNIC associated with the destination compute instance then processes the packet and forwards the packet to the destination compute instance. The VNICs associated with the source and destination compute instances may be executed on the same NVD (e.g., when both the source and destination compute instances are hosted by the same host machine) or on different NVDs (e.g., when the source and destination compute instances are hosted by different host machines connected to different NVDs).

If the destination for the packet is outside the VCN of the source compute instance, then the packet originating from the source compute instance is communicated from the host machine hosting the source compute instance to the NVD connected to that host machine. The NVD executes the VNIC associated with the source compute instance. Since the destination end point of the packet is outside the VCN, the packet is then processed by the VCN VR for that VCN. The NVD invokes the VCN VR functionality, which may result in the packet being forwarded to an NVD executing the appropriate gateway associated with the VCN. For example, if the destination is an endpoint within the customer's on-premise network, then the packet may be forwarded by the VCN VR to the NVD executing the DRG gateway configured for the VCN. The VCN VR may be executed on the same NVD as the NVD executing the VNIC associated with the source compute instance or by a different NVD. The gateway may be executed by an NVD, which may be a smartNIC, a host machine, or other NVD implementation. The packet is then processed by the gateway and forwarded to a next hop that facilitates communication of the packet to its intended destination endpoint. For example, in the embodiment depicted in FIG. 2, a packet originating from compute instance 268 may be communicated from host machine 202 to NVD 210 over link 220 (using NIC 232). On NVD 210, VNIC 276 is invoked since it is the VNIC associated with source compute instance 268. VNIC 276 is configured to examine the encapsulated information in the packet and determine a next hop for forwarding the packet with the goal of facilitating communication of the packet to its intended destination endpoint, and then forward the packet to the determined next hop.

A compute instance deployed on a VCN can communicate with various different endpoints. These endpoints may include endpoints that are hosted by CSPI 200 and endpoints outside CSPI 200. Endpoints hosted by CSPI 200 may include instances in the same VCN or other VCNs, which may be the customer's VCNs, or VCNs not belonging to the customer. Communications between endpoints hosted by CSPI 200 may be performed over physical network 218. A compute instance may also communicate with endpoints that are not hosted by CSPI 200 or are outside CSPI 200. Examples of these endpoints include endpoints within a customer's on-premise network or data center, or public endpoints accessible over a public network such as the Internet. Communications with endpoints outside CSPI 200 may be performed over public networks (e.g., the Internet) (not shown in FIG. 2) or private networks (not shown in FIG. 2) using various communication protocols.

The architecture of CSPI 200 depicted in FIG. 2 is merely an example and is not intended to be limiting. Variations, alternatives, and modifications are possible in alternative embodiments. For example, in some implementations, CSPI 200 may have more or fewer systems or components than those shown in FIG. 2, may combine two or more systems, or may have a different configuration or arrangement of systems. The systems, subsystems, and other components depicted in FIG. 2 may be implemented in software (e.g., code, instructions, program) executed by one or more processing units (e.g., processors, cores) of the respective systems, using hardware, or combinations thereof. The software may be stored on a non-transitory storage medium (e.g., on a memory device).

Figure 4:
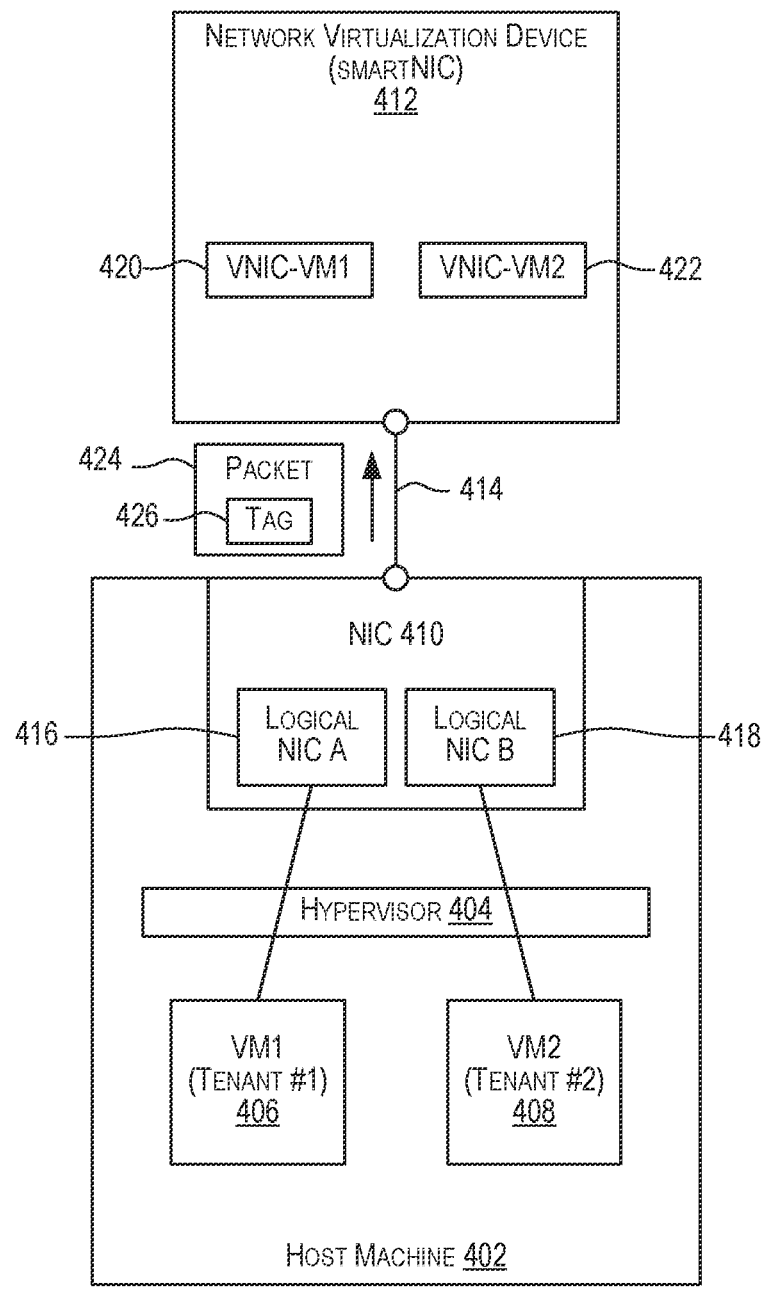
FIG. 4 depicts connectivity between a host machine and an NVD for providing I/O virtualization for supporting multitenancy according to certain embodiments.

FIG. 4 depicts connectivity between a host machine and an NVD for providing I/O virtualization for supporting multitenancy according to certain embodiments. As depicted in FIG. 4, host machine 402 executes a hypervisor 404 that provides a virtualized environment. Host machine 402 executes two virtual machine instances, VM1 406 belonging to customer/tenant #1 and VM2 408 belonging to customer/tenant #2. Host machine 402 comprises a physical NIC 410 that is connected to an NVD 412 via link 414. Each of the compute instances is attached to a VNIC that is executed by NVD 412. In the embodiment in FIG. 4, VM1 406 is attached to VNIC-VM1 420 and VM2 408 is attached to VNIC-VM2 422.

As shown in FIG. 4, NIC 410 comprises two logical NICs, logical NIC A 416 and logical NIC B 418. Each virtual machine is attached to and configured to work with its own logical NIC. For example, VM1 406 is attached to logical NIC A 416 and VM2 408 is attached to logical NIC B 418. Even though host machine 402 comprises only one physical NIC 410 that is shared by the multiple tenants, due to the logical NICs, each tenant's virtual machine believes they have their own host machine and NIC.

In certain embodiments, each logical NIC is assigned its own VLAN ID. Thus, a specific VLAN ID is assigned to logical NIC A 416 for Tenant #1 and a separate VLAN ID is assigned to logical NIC B 418 for Tenant #2. When a packet is communicated from VM1 406, a tag assigned to Tenant #1 is attached to the packet by the hypervisor and the packet is then communicated from host machine 402 to NVD 412 over link 414. In a similar manner, when a packet is communicated from VM2 408, a tag assigned to Tenant #2 is attached to the packet by the hypervisor and the packet is then communicated from host machine 402 to NVD 412 over link 414. Accordingly, a packet 424 communicated from host machine 402 to NVD 412 has an associated tag 426 that identifies a specific tenant and associated VM. On the NVD, for a packet 424 received from host machine 402, the tag 426 associated with the packet is used to determine whether the packet is to be processed by VNIC-VM1 420 or by VNIC-VM2 422. The packet is then processed by the corresponding VNIC. The configuration depicted in FIG. 4 enables each tenant's compute instance to believe that they own their own host machine and NIC. The setup depicted in FIG. 4 provides for I/O virtualization for supporting multi-tenancy.

FIG. 5 depicts a simplified block diagram of a physical network 500 according to certain embodiments. The embodiment depicted in FIG. 5 is structured as a Clos network. A Clos network is a particular type of network topology designed to provide connection redundancy while maintaining high bisection bandwidth and maximum resource utilization. A Clos network is a type of non-blocking, multistage or multi-tiered switching network, where the number of stages or tiers can be two, three, four, five, etc. The embodiment depicted in FIG. 5 is a 3-tiered network comprising tiers 1, 2, and 3. The TOR switches 504 represent Tier-0 switches in the Clos network. One or more NVDs are connected to the TOR switches. Tier-0 switches are also referred to as edge devices of the physical network. The Tier-0 switches are connected to Tier-1 switches, which are also referred to as leaf switches. In the embodiment depicted in FIG. 5, a set of "n" Tier-0 TOR switches are connected to a set of "n" Tier-1 switches and together form a pod. Each Tier-0 switch in a pod is interconnected to all the Tier-1 switches in the pod, but there is no connectivity of switches between pods. In certain implementations, two pods are referred to as a block. Each block is served by or connected to a set of "n" Tier-2 switches (sometimes referred to as spine switches). There can be several blocks in the physical network topology. The Tier-2 switches are in turn connected to "n" Tier-3 switches (sometimes referred to as super-spine switches). Communication of packets over physical network 500 is typically performed using one or more Layer-3 communication protocols. Typically, all the layers of the physical network, except for the TORs layer are n-ways redundant thus allowing for high availability. Policies may be specified for pods and blocks to control the visibility of switches to each other in the physical network so as to enable scaling of the physical network.

A feature of a Clos network is that the maximum hop count to reach from one Tier-0 switch to another Tier-0 switch (or from an NVD connected to a Tier-0-switch to another NVD connected to a Tier-0 switch) is fixed. For example, in a 3-Tiered Clos network at most seven hops are needed for a packet to reach from one NVD to another NVD, where the source and target NVDs are connected to the leaf tier of the Clos network. Likewise, in a 4-tiered Clos network, at most nine hops are needed for a packet to reach from one NVD to another NVD, where the source and target NVDs are connected to the leaf tier of the Clos network. Thus, a Clos network architecture maintains consistent latency throughout the network, which is important for communication within and between data centers. A Clos topology scales horizontally and is cost effective. The bandwidth/throughput capacity of the network can be easily increased by adding more switches at the various tiers (e.g., more leaf and spine switches) and by increasing the number of links between the switches at adjacent tiers.

In certain embodiments, each resource within CSPI is assigned a unique identifier called a Cloud Identifier (CID). This identifier is included as part of the resource's information and can be used to manage the resource, for example, via a Console or through APIs. An example syntax for a CID is:

ocid1.<RESOURCE TYPE>.<REALM>.[REGION] [.FUTURE USE].<UNIQUE ID> where, ocid1: The literal string indicating the version of the CID;
resource type: The type of resource (for example, instance, volume, VCN, subnet, user, group, and so on);
realm: The realm the resource is in. Example values are "c1" for the commercial realm, "c2" for the Government Cloud realm, or "c3" for the Federal Government Cloud realm, etc. Each realm may have its own domain name;
region: The region the resource is in. If the region is not applicable to the resource, this part might be blank;
future use: Reserved for future use.
unique ID: The unique portion of the ID. The format may vary depending on the type of resource or service.

Multi-Cloud Introduction

Figure 6:
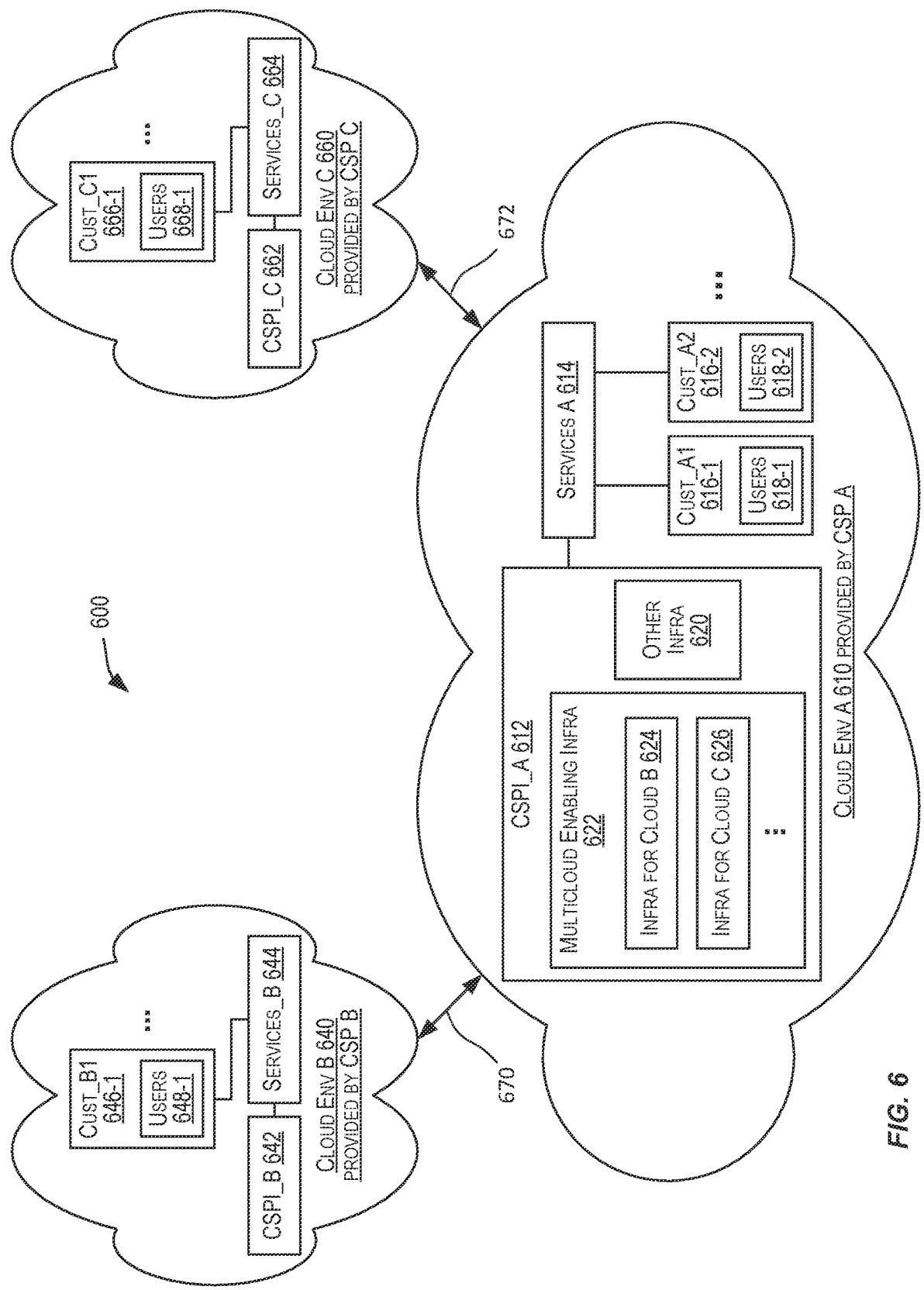
FIG. 6 depicts a simplified high-level diagram of a distributed environment comprising multiple cloud environments provided by different cloud service providers (CSPs) wherein the cloud environments include a particular cloud environment that provides specialized infrastructure that enables one or more cloud services provided by that particular cloud environment to be used by customers of other cloud environments according to certain embodiments.

FIG. 6 depicts a simplified high-level diagram of a distributed environment 600 comprising multiple cloud environments provided by different cloud service providers (CSPs) wherein the cloud environments include a particular cloud environment that provides specialized infrastructure that enables one or more cloud services provided by that particular cloud environment to be used by customers of other cloud environments according to certain embodiments. As depicted in FIG. 6, various different cloud environments (also referred to as "clouds") may be provided by different cloud service providers (CSPs), each cloud environment or cloud offering one or more cloud services that can be subscribed to by one or more customers of that cloud environment. The set of cloud services offered by a cloud environment provided by a CSP may include one or more different types of cloud services including but not restricted to Software-as-a-Service (SaaS) services, Infrastructure-as-a-Service (IaaS) services, Platform-as-a-Service (PaaS) services, Database-as-a-Service (DBaaS) services, and others. Examples of cloud environments provided by various CSPs include Oracle® Cloud Infrastructure (OCI) provided by Oracle Corporation, Microsoft® Azure provided by Microsoft Corporation, Google Cloud™ provided by Google LLC, Amazon Web Services (AWS®) provided by Amazon Corporation, and others. The cloud services offered by a particular cloud environment may be different from the set of cloud services offered by another cloud environment.

In a typical cloud environment, a CSP provides cloud service infrastructure (CSPI) that is used to provide the one or more cloud services that are offered by that cloud environment to its customers. The CSPI provided by a CSP may include various types of hardware and software resources including compute resources, memory resources, networking resources, consoles for accessing the cloud services, and others. A customer of a cloud environment provided by a CSP may subscribe to one or more of the cloud services offered by that cloud environment. Various subscription models may be offered by the CSP to its customers. After a customer subscribes to a cloud service provided by a cloud environment, one or more users may be associated with the subscribing customer and these users can use the cloud service subscribed to by the customer. In certain implementations, when a customer subscribes to a cloud service provided by a particular cloud environment, a customer account or customer tenancy is created for that customer. One or more users can then be associated with the customer tenancy and these users can then use the services subscribed to by the customer under the customer tenancy. Information regarding the services subscribed to by a customer, the users associated with the customer tenancy, etc. is usually stored within the cloud environment and associated with the customer tenancy.

For example, three different cloud environments provided by three different CSPs are depicted in FIG. 6. These include a Cloud Environment A (cloud A) 610 provided by a CSP A, a Cloud Environment B (cloud B) 640 provided by a CSP B, and a Cloud Environment C (cloud C) 660 provided by a CSP C. Cloud A 610 includes infrastructure CSPI_A 612 provided by CSP A, and this infrastructure may be used to provide a set of services "Services A" 614 offered by cloud A 610. One or more customers (e.g., Cust_A1 616-1, Cust_A2 616-2) may subscribe to one or more services from Services A 614 provided by cloud A 610. One or more users 618-1 may be associated with Customer A1 616-1 and can use the services subscribed to by customer A1 616-1 in cloud A 610. In a similar manner, one or more users 618-2 may be associated with customer A2 616-2 and can use the services subscribed to by customer A2 616-2 in cloud A 610. In various use cases, the services subscribed to by customer A1 616-1 may be different from the services subscribed to by customer A2 616-2.

As depicted in FIG. 6, cloud B 640 includes infrastructure CSPI B 642 provided by CSP B, and this infrastructure may be used to provide a set of services "Services B" 644 offered by cloud B 640. One or more customers (e.g., Cust_B1 646-1) may subscribe to one or more services from Services B 644. One or more users 648-1 may be associated with Customer B1 646-1 and can use the services subscribed to by customer B1 646-1 in cloud B 640.

As depicted in FIG. 6, cloud C 660 includes infrastructure CSPI C 662 provided by CSP C, and this infrastructure may be used to provide a set of services "Services C" 664 offered by cloud C 660. One or more customers (e.g., Cust_C1 666-1) may subscribe to one or more services from Services C 664. One or more users 668-1 may be associated with Customer C1 666-1 and can use the services subscribed to by customer C1 666-1 in cloud C 660. It is to be noted that Services A 614, Services B 644, and Services C 664 can be different from each other.

In existing cloud implementations, each cloud provides a closed ecosystem for its subscribing customers and associated users. As a result, a customer of a cloud environment and it associated users are restricted to using the services offered by the cloud that the customer subscribes to. For example, customer B1 646-1 and its users 648-1 are restricted to using services B 644 provided by cloud B 640 and cannot use their account in cloud B 640 to access services from a different cloud environment, such as a services from services A 614 offered by cloud A 610 or a service from Services C 664 offered by cloud C 660. The teachings described herein overcome this limitation. As described in this disclosure, various techniques are described that enable a link to be created between two cloud environments that enables a service provided by a first cloud environment provided by a first CSP to be used by a customer (and associated users) of a second different cloud environment provided by a second different CSP, using the customer's account in the second cloud environment.

For example, in the embodiment depicted in FIG. 6, infrastructure CSPI_A 612 provided by CSP A, in addition to other infrastructure 620, includes special infrastructure 622 (referred to as multi-cloud enabling infrastructure 622 or MEI 622 or multi-cloud infrastructure 622) that enables one or more services 614 offered by cloud A to be used by customers and associated users of other clouds, such as clouds B 640 and C 660, using the customer accounts in those other clouds. In certain implementations, customers of clouds B and C do not have to open separate accounts with cloud A to use one or more of services 614 offered by cloud A 610. A customer B1 646-1 of cloud B 640 and an associated user 648-1 can use their customer account or tenancy in cloud B 640 to use one or more services 614 provided by cloud A 610. As another example, a customer C1 666-1 of cloud C 660 and an associated user 668-1 can use their customer account or tenancy in cloud C 660 to use one or more services 614 provided by cloud A 610.

In certain implementations, MEI 622 enables links to be created between cloud A 610 and other clouds, where these links can be used by customers of the other clouds and their associated users to access and make use of services provided by cloud A 610. This is symbolically shown in FIG. 6 as a link 670 created between cloud A 610 and cloud B 640, and a link 672 created between cloud A 610 and cloud C 660. Via link 670, a customer of cloud B 640 can access or use one or more services 614 provided by cloud A 610. Likewise, via link 672, a customer of cloud C 660 can access or use one or more services 614 provided by cloud A 610.

There are different ways in which MEI 612 may be implemented. In certain embodiments, MEI 612 may include components that enable links to be established with different clouds. For example, in FIG. 6, MEI 622 includes an infrastructure component 624 that is responsible for enabling link 670 with cloud B 640, and an infrastructure component 626 for enabling link 672 with cloud C 660. In a similar manner, MEI 622 may include other components that enable and facilitate links with other clouds. In some implementations, a component of MEI 622 may also facilitate links with multiple different clouds.

There are several reasons why a customer of one cloud may want or desire to use a cloud service provided by a different cloud. Using FIG. 6 as an example, there are multiple reasons why a customer B1 646-1 of cloud B 640 may want to use a cloud service 614 provided by cloud A 610. In one use case scenario, this may happen because cloud A 610 offers a cloud service with functionality that is not provided by cloud B 640. As another use case scenario, clouds A and B may offer a similar service, but the service provided by cloud A 610 may be better (e.g., more features/functionality, faster, etc.) that the corresponding service offered by cloud B 640. As yet another use case scenario, customer B1 646-1 of cloud B 640 may want to use a cloud service provided by cloud A 610 because the service is provided at a cheaper price point than by cloud B 640. In some cases, there may be geographical restrictions or other reasons why customer B1 646-1 of cloud B 640 might want to use a cloud service provided by cloud A 610. For example, cloud A 610 may offer the desired service in a geographical area that is not serviced by cloud B 640, or the particular service is not provided by cloud B 640 in a geographical area in which the customer desires the service. Several other use case scenarios are also possible as to why a customer of one cloud might want to use a service provided by a different cloud.

In certain embodiments, MEI 622 provides capabilities and performs functions for creating the link between cloud A 610 and another cloud, and via the link, enabling a user associated with a customer of the other cloud to, in a seamless manner, access and use, from the other cloud itself, a service provided by cloud A 610. For example, MEI 622 enables a user 648-1 associated with customer B1 646-1 of cloud 640 to access a service from services A 614 provided by cloud A 610 in a seamless manner. In certain implementations, user interfaces (e.g., a console) may be provided that user 648-1 can access from within cloud B 640 that enable the user to see a list of services 614 offered by cloud A 610 and to select a particular service that the user 648-1 desires to access. In response to the user selection, MEI 622 is responsible for performing processing that establishes link 670 between clouds A and B to enable access to the requested service. The processing for setting up link 670 is performed substantially automatically by MEI 622. Customer B1 646-1 or associated users 648-1 do not have worry about performing any system, networking, or other configuration changes that are needed to facilitate the creation, maintenance, and usage of link 670 between clouds A 610 and B 640. No burden is placed on the users or the customers in the creation of the link between the clouds. The link is created in a fast and efficient manner using the techniques described in this disclosure.

MEI 622 may use various techniques to make the creation and use of the link seamless to users and customers and thus provide for an enhanced user experience. In certain implementations, MEI 622 causes the user interfaces (e.g., graphical user interfaces GUIs, etc.) and process flows that a customer B1 and associated users 648-1 interact with, such as for requesting a service from cloud A 610 and for accessing the requested service from cloud A 610, to be substantially similar to the interfaces and process flows that the customer/user would experience in cloud B 640. In this manner, the customer or user, who may be accustomed to the interfaces and process flows of cloud B 640, does not have to learn new interfaces and process flows to access a service 614 from cloud A 610. MEI 622 may present different interfaces and process flows for users of different cloud environments. For example, a first set of user interfaces and process flows that are substantially similar to the user interfaces and flows of cloud B may be presented to a user from cloud B 640, while a different set of user interfaces and process flows that are substantially similar to the user interfaces and flows of cloud C may be presented to a user accessing cloud A 610 from cloud C 660. This is done to simplify and consequently enhance a user's experience for accessing services 614 of cloud A 610 from other clouds.

As another example, each cloud environment typically includes an identify management system that is configured to provide security for the cloud environment. The identity management system is configured to protect resources in the cloud environment, including resources provided by the CSP and resources of subscribing cloud customers that are deployed in the cloud environment. Functions performed by the identity management system include, for example, managing identity credentials (e.g., usernames, passwords, etc.) associated with the cloud's subscribing customers and associated users, using the identity credentials to regulate users' access to cloud resources and services based upon permission/access policies configured for the cloud environment, and other functions. Different clouds may use different identity management systems and associated techniques. For example, the identity management system and associated procedures in cloud A 610 may be completely different from the identity management system and associated procedures in cloud B 640, which in turn may be completely different from the identity management system and associated procedures in cloud C 660. In certain implementations, in spite of these differences in identity management systems and associated procedures between different cloud environments, the techniques described herein enable a user associated with a customer of a first cloud to access a cloud service provided by a different cloud using the same identity credentials associated with the customer and the user in the first cloud.

For example, in the embodiment depicted in FIG. 6, cloud B 640 provided by CSP B may include an identity management system that assigns or allocates identity credentials to its subscribing customers and associated users, such as customer B1 646-1 and associated users 648-1. These identity credentials are associated with the tenancy created for customer B1 646-1 in cloud B 640. In certain implementations, MEI 622 provided by cloud A 610 enables a user 648-1 associated with cloud B customer B1 646-1 to access a service from services A 614 in cloud A 610 using identity credentials associated with users 648-1 and customer B1 646-1 in cloud B 640. This greatly enhances the user experience for users 648-1 since they do not have to create new identity credentials that are specific to cloud A 610 just for the purpose of accessing a service 614 in cloud A 610. The MEI 622 facilitates such access.

As an example, a customer B1 of cloud B 640 may select to use a service, such as a Database-as-a Service (DBaaS), from the set of services 614 provided by cloud A 610. In response to such a selection, MEI 622 causes a link 670 to be automatically created between cloud A 610 and cloud B 640 to enable users 648-1 associated with customer B1 646-1 to use the DBaaS service provided by cloud A 610. The automatic setup of link 670 is facilitated by MEI 622. After link 670 has been set up, a user 668-1 can use the DBaaS service in cloud A 610 via cloud B 640. As part of using this service, user 668-1 can, via cloud B 640 send a request to cloud A 610 to create a database resource. In response, CSPI_A 612 may create the requested database in cloud A 610. In certain implementations, the created database may be provisioned in a virtual network (e.g., a virtual cloud network or VCN) created for customer B1 in cloud A 610 and is accessible to user 668-1 via cloud B 640. User 668-1 may then send, from cloud B 640, requests to cloud A 610 to use the provisioned database. These requests may include, for example, requests to write data to the database, to update data stored in the database, to delete data in the database, to delete the database, to create additional databases, and the like. In some use cases, these requests may originate from a user 668-1 via cloud B 640 or from a service 644 provided by cloud B 640. In this manner, MEI 622 provided by cloud A 610 enables a user associated with a customer of a different cloud provided by a different CSP to seamlessly access a service provided by cloud A 610.

Distributed environment 600 depicted in FIG. 6 is merely an example and is not intended to unduly limit the scope of claimed embodiments. Many variations, alternatives, and modifications are possible. For example, in alternative embodiments, distributed environment 600 may have more or fewer cloud environments. The cloud environments may also have more or fewer systems and components or may have a different configuration or arrangement of the systems and components. The systems and components depicted in FIG. 6 may be implemented in software (e.g., code, instructions, program) executed by one or more processing units (e.g., processors, cores) of the respective systems, using hardware, or combinations thereof. The software may be stored on a non-transitory storage medium (e.g., on a memory device).

Multi Cloud Control Plane (MCCP)

Figure 7:
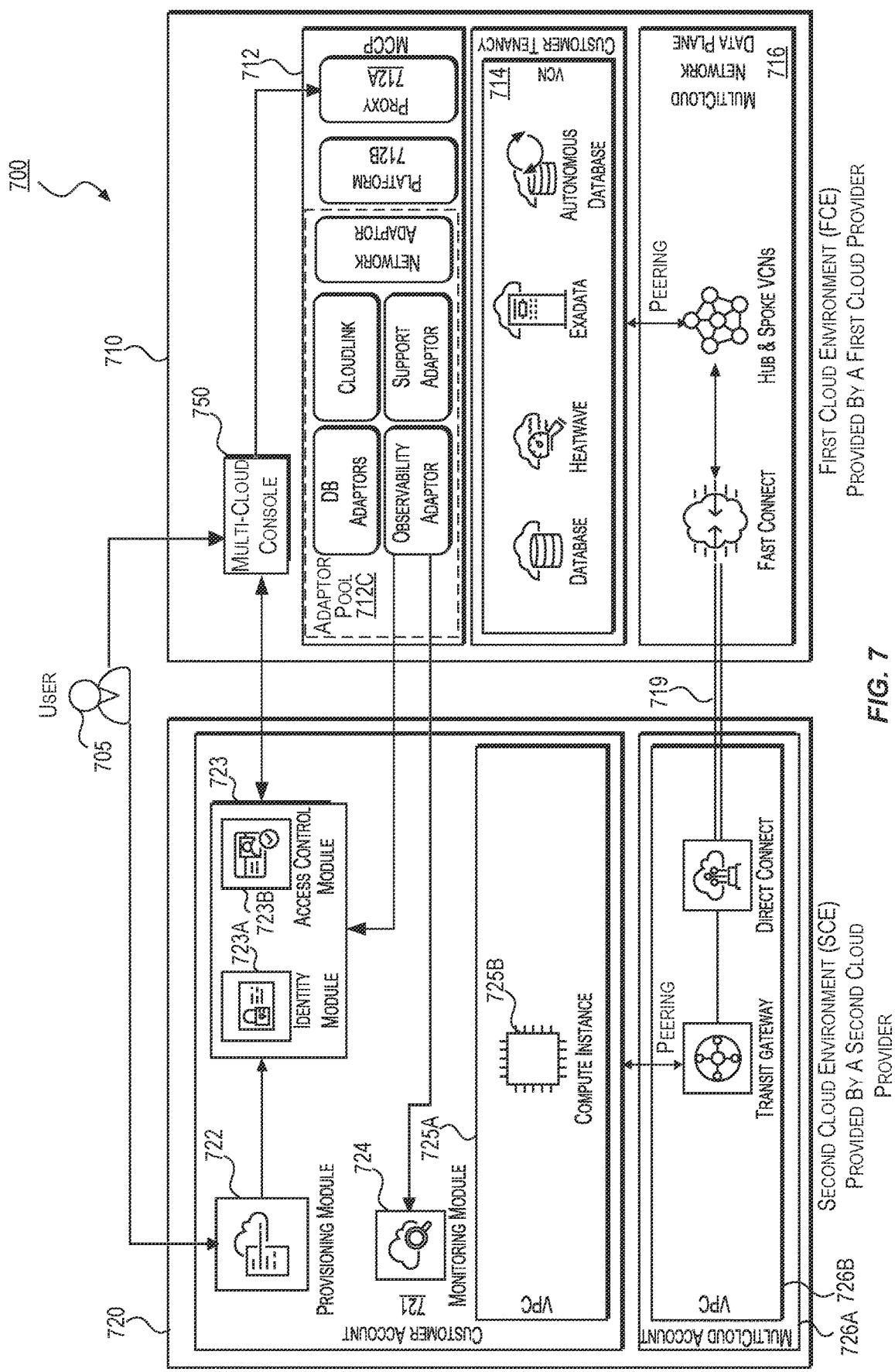
FIG. 7 depicts an exemplary high-level architecture of a multi-cloud infrastructure that interconnects two different cloud environments, according to some embodiments.

FIG. 7 depicts a high-level architecture of a multi-cloud infrastructure that interconnects two different cloud environments, each of which are provided by a cloud services provider according to some embodiments. As shown in FIG.

7, the high-level architecture 700 includes a first cloud environment provided by a first cloud services provider (e.g., OCI) 710 and a second cloud environment provided by a second cloud services provider 720 (e.g., AWS). The first cloud environment 710 includes a multi-cloud infrastructure that provisions for capabilities to deliver services of the first cloud environment to users of other cloud environments (e.g., the second cloud environment 720). Specifically, as will be described below, the multi-cloud infrastructure includes a multi-cloud control plane (MCCP) 712 and a multi-cloud network data plane (MCNDP) 716 that provisions users to access/manage services (e.g., PaaS services) of the first cloud environment from another cloud environment.

The multi-cloud infrastructure provides a user experience as close as possible to that of the native cloud environments of the users (e.g., the second cloud environment 720), while providing simple integration between the cloud environments. It is noted that the MCCP 712 and the MCNDP 716 are components of the multi-cloud infrastructure that are deployed (and managed) in the first cloud environment 710, by the first cloud services provider. In some embodiments, the multi-cloud infrastructure includes another component (i.e., a multi-cloud service account 726A) that is deployed in the second cloud environment 720 and managed by the first cloud services provider.

According to some embodiments, the second cloud environment 720 includes a customer account 721 and an account for the first cloud services provider (referred to herein as a multi-cloud account or a multi-cloud service account 726A). It is noted that the second cloud environment 720 may also include a second cloud portal (not shown) that forms a centralized access point where customers of the second environment 720 can login and manage their native cloud deployments and instances. The second cloud portal may provide options for both monitoring and operating services provided by the second cloud infrastructure. According to some embodiments, the second cloud environment 720 includes a provisioning module 722, a monitoring module 724, and an identity system 723, which comprises an identity module 723A, and an access control module 723B (i.e., also referred to herein as an identity and access management (IAM) module). Further, included in the customer account 721 is a customer's virtual private cloud (VPC) 725A, which may host one or more compute instances 725B. The identity module 723A is configured to perform tasks such as creating a set of one or more roles (and associated policies, permissions etc., corresponding the respective roles) for one or more users of the second cloud environment 720. In some implementations, the access control module 723B acts as a user directory of the second cloud environment. Specifically, the access control module 723B may be configured to create a user pool, and perform functions such as add user sign-up, sign-in, and access control to web and mobile applications.

The provisioning module 722 corresponds to a service provided by the second cloud environment 720 that enables users to model and manage infrastructure resources in an automated and secure manner. For instance, using the provisioning module 722, developers may define and provision infrastructure resources using an Infrastructure as Code template. In other words, the provisioning module 722 automates pre-requisite setup of resources in the customer's account in the second cloud environment 720. As another example, the provisioning module 722 may also be configured to set up pre-requisite resources that permit a component of the first cloud environment to gain access to resources in the customer's account in the second cloud environment. By some embodiments, this is achieved via allowing the multi-cloud service account 726A to access resources in the customer's account 721 e.g., permitting the multi-cloud service account to peer with the customer's account, allowing a component of the multi-cloud infrastructure (e.g., observability adaptor to publish metrics in the second cloud environment, etc.). The monitoring module 724 enables monitoring of a complete stack (e.g., applications, infrastructure, network, and services) and use alarms, logs, and events data to perform automated actions. The monitoring module 724 may also utilize dashboards to visually depict (e.g., in GUI) one or more metrics data obtained from the first cloud environment.

The multi-cloud service account 726A includes a virtual private cloud 726B that hosts a transit gateway and a direct connect component. The direct connect component is a networking component that provides an alternative to using the Internet to utilize cloud services of the second cloud environment. Direct connect enables customers to have low latency, secure and private connections to the second cloud environment, for workloads which require higher speed or lower latency than the internet. The transit gateway is a networking hub that can be utilized to interconnect the VPC and on-premises networks. In some embodiments, the transit gateway in the multi-cloud service account 726A is utilized to peer (i.e., communicatively couple) with the customer's account 721 in the second cloud environment 720.

The first cloud environment 710 includes the MCCP 712, a customer tenancy 714, and the MCNDP 716. As stated previously, the MCCP 712 and the MCNDP 716 are portions of the multi-cloud infrastructure that provision users of other cloud environments (e.g., the second cloud environment 720) to access services provided by the first cloud environment 710 with a user experience as close as possible to that of the native cloud environments of the users, while providing simple integration between the cloud environments.

The first cloud environment 710 further includes a multi-cloud console 750 (different than the second cloud portal) that permits users authenticated in the second cloud infrastructure 720 to perform control plane operations on resources of the first cloud infrastructure 710 that are exposed via the multi-cloud infrastructure. In other words, the multi-cloud console 750 forms a gateway for users of the second cloud environment 720 to gain access to resources deployed in the first cloud environment 710. It is appreciated that a user 705 can issue requests (e.g., CRUD requests) with respect to resources provided by the first cloud infrastructure directly from the multi-cloud console 750.

The MCCP 712 included in the first cloud environment includes a plurality of microservices such as a proxy module 712A, a platform services module 712B, and a pool of adaptors 712C. The pool of adaptors 712C includes a cloud-link adaptor, a database (DB) adaptor, a network adaptor, an observability adaptor, and a support adaptor.

Each of the adaptors included in the pool of adaptors 712C is responsible for exposing a set of unique underlying resources (provided by the first cloud environment) to users of other cloud environments (e.g., second cloud environment). Specifically, each of the adaptors in the pool of adaptors 712C maps to a particular product or resource offered by the first cloud infrastructure. In some implementations, is noted that the actual resources may be created by a native control plane (not shown) of the first cloud infrastructure. The native control plane of the first cloud environment provides management and orchestration across the cloud environment. It is here where configuration baselines can be set, user and role access provisioned, and where applications reside so they can be executed with related services. For instance, with respect to database as a service (DBaaS), the DBaaS control plane included in the native control plane of the first cloud environment is configured to instantiate Exa-database resources in the customer tenancy 714 of the first cloud environment.

A request issued by the user 705 at the multi-cloud console 750 is routed to the proxy module 712A of the MCCP. It is noted that the incoming request is processed by the proxy module 712A for performing authentication and access control. Each request includes a token (described below) associated with the account of the user in the second cloud infrastructure. The proxy module extracts the token and validates the token in conjunction with access control module 723B (i.e., the identity provider system of the second cloud environment). Upon successful validation, the proxy module 712A may check roles (i.e., set of privileges) associated with the user. It is noted that a role may be associated with one or more tasks/operations that are permitted for the role.

According to one embodiment, the proxy module 712A is responsible for authenticating incoming requests to MCCP and authorizing if the user is allowed to perform the requested operation based on the roles associated with the token. In some implementations, the proxy module 712A may perform the authentication process described above by taking advantage of a custom authentication feature of a service platform (SPLAT) that is associated with the first cloud infrastructure. It is appreciated that a SPLAT, in a broad sense, is an infrastructure that facilitates delivery of various cloud services provided by a cloud services provider. SPLAT accepts an incoming request and forwards it to the proxy module 712A, which further parses the incoming request to determine an authorization decision and returns a success or failure message back to SPLAT. On success, the request may be directed by SPLAT to a routing module which directs the request to the appropriate adaptor in the pool of adaptors, whereas on failure, SPLAT returns an error response directly to the caller.

By one embodiment, the proxy module 712A accepts pre-authenticated requests from a service platform (i.e., SPLAT) of the first cloud environment and routes the requests to the appropriate adaptor based on path information included in the incoming request. In some implementations, the proxy module may extract an identifier (from the incoming request) corresponding to a provider of the service and routes the request to the appropriate adaptor in the pool of adaptors 712C.

The cloud-link adaptor included in the MCCP 712 is responsible for handling lifecycle operations of resources provided by the first cloud environment. The cloud-link adaptor is configured to create a mapping (or a relationship created at a sign-up process) between an account of a user in the second cloud environment to a corresponding tenancy/account of the user in the first cloud infrastructure. In other words, the cloud-link adaptor generates a mapping of a first identifier associated with the tenancy of the user in the first cloud environment to a second identifier associated with the account of the user in the second cloud environment.

In some implementations, the cloud-link adaptor performs translation between external cloud identifiers (e.g., second identifier associated with the account of the user in the second cloud environment) and a first identifier (associated with the tenancy of the user in the first cloud environment) to enable operations going through the MCCP to map to the appropriate underlying resource in the first cloud environment. In some embodiments, the cloud-link adaptor generates a data object to store the above-described mapping information. Additionally, the cloud-link adaptor also generates a resource-principal that is associated with the data object. The resource-principal is assigned one or more permissions based on the token (and associated roles thereof) included in the request. Access to downstream services provided by the first cloud environment is achieved by the user from the second cloud infrastructure based on the resource-principal. The cloud-link adaptor may store the data object and the associated resource-principal in a root compartment of a tenancy of the user in the first cloud infrastructure. Alternatively, or additionally, the cloud-link adaptor may also locally persist the data object and the resource-principal on a platform module 712B of the multi-cloud infrastructure for seamless access by other adaptors included in the multi-cloud infrastructure.

The network adaptor (also referred to as a network-link adaptor) is responsible for creating a network link (i.e., communication link/channel) between the customer account 721 (in the second cloud environment) and the corresponding customer tenancy/account (in the first cloud environment) 714. By some embodiments, the network link adaptor obtains a token (from the platform module 712B) and creates (1) a first peering relationship (in the first cloud environment) between the MCNDP 716 and the customer tenancy 714, and (2) a second peering relationship (in the second cloud environment) between the customer account 721 and the multi-cloud service account 726A of the first cloud services provider 717 included in the second cloud environment. The MCNDP 716 in the first cloud environment 710 includes a fast connect and a hub and spoke VCN that provisions for network connections (e.g., from on-premises locations, from external cloud environments) to be established with the customer tenancy 714 in the first cloud environment. On the other hand, the transit gateway included in the multi-cloud service account peers with the customer's account in the second cloud environment. The network adaptor can configure an interconnect 719 to communicatively couple the two cloud environments. Specifically, at one end, the interconnect is coupled with the direct connect (located in the multi-cloud service account 726A), whereas on the other end, the interconnect is coupled with the Fast connect in the MCDP. It is appreciated that the fast connect (included in the first cloud environment) and the direct connect that is included in the second cloud environment may be co-located in a same region. Furthermore, upon forming the network link between the two cloud environments, applications that are executed in the customer's account (e.g., in a customer VPC of the second cloud environment) are able to access resources e.g., Exa-database resource that is deployed in the customer tenancy 714 of the first cloud environment. It is appreciated that the network link communicatively couples a tenancy of the user in the first cloud environment to the account of the user in the second cloud environment.

As shown in FIG. 7, the observability module (included in the pool of adaptors 712C) is configured to mirror or forward (e.g., publishes) logs, metrics, and other performance parameters related to the resources deployed in the customer tenancy in the first cloud environment to a dashboard e.g., included in the monitoring module 724 included in the second cloud environment, for further processing. By some embodiments, the platform services module 712B included in multi-cloud infrastructure is configured to store credentials associated with services of the first cloud environment provided to the users of the second cloud infrastructure. The platform services module 712B provides, for instance, tokens/resource principals for the different adaptors included in the pool of adaptors 712C so that the adaptors can communicate with native control planes of the first cloud infrastructure. By some embodiments, the platform services module 712B exposes APIs that are called by different adaptors to perform tasks such as:

Vending a minimally scoped access token (issued by the second cloud infrastructure) to adaptors. For example, the network adaptor requires an access token to perform the above-described network peering operations.

Providing a resource principal that adaptors will use to call downstream services to create resources in customer tenancies of the first cloud infrastructure.

Triggering replication of observability data (logs, metrics, events) from the first cloud infrastructure to the second cloud infrastructure.

As stated previously, the pool of adaptors 712C includes a plurality of adaptors, each of which is responsible for exposing a set of unique underlying resources of the first cloud infrastructure to the users of the second cloud infrastructure i.e., each adaptor maps to a particular product or resource offered by the first cloud environment. For instance, an Exa-database adaptor acts as a proxy for the users of the second cloud infrastructure to create and utilize Exa-database resources. Exa-database is a pre-configured combination of hardware and software that provides an infrastructure for executing databases. By some embodiments, Exa-database comprises a stack of resources: (a) Exadata infrastructure (i.e., hardware), (b) VM cloud cluster, (c) container databases, and (d) pluggable databases. According to some embodiments, the multi-cloud infrastructure provides the ability (for users of the second cloud infrastructure) to analyze each of the levels of stacked infrastructure. Moreover, the MCCP provides flexibility for a user to simply issue a create command (via the multi-cloud console 750) for a workflow, where after the MCCP performs automatic creation of individual resources at each level of the stack. It is appreciated that although the pool of adaptors 712C as depicted in FIG. 7 includes five different adaptors, it is in no way limiting the scope of the MCCP architecture 700. The MCCP architecture may include other adaptors, for example, a dedicated adaptor directed for use by a specific cloud service provider based on requirements of the cloud services provider.

In operation, when user 705 accesses the multi-cloud console 750 (e.g., for the first time) to perform a sign-up operation (e.g., for multi-cloud services), the user 705 is redirected to the provisioning module 722 (included in the second cloud environment 720). The user may perform a login operation with respect to the second cloud environment i.e., using credentials associated with the second cloud environment. Upon successfully logging into the second cloud environment, the provisioning module 722 performs the pre-requisite set up of resources in the customer's account in the second cloud environment. It is noted that the provisioning of pre-requisite resources in the second cloud environment may include creation of roles (and associated policies) as well as the setting up of user pools with respect to the identity system 723.

The provisioning process permits for instance, the multi-cloud service account in the second cloud environment to access resources in the customer's account of the second cloud environment. In doing so, resources in the first cloud environment 710 may perform certain actions with respect to the second cloud environment. For example, the observability adaptor/module (included in the pool of adaptors 712C) may transmit metrics associated with resources deployed in the first cloud environment to the monitoring module of the second cloud environment. As another example of the provisioning process, the network adaptor (included in the pool of adaptors 712C) may attach the transit gateway to the customer's VPC in the second cloud environment i.e., form the peering in the second cloud environment.

According to some embodiments of the present disclosure, the identity system 723 of the second cloud environment 720 includes a feature (referred to herein as 'Assume Role') that allows a user or a service to temporarily take on the permissions of a different role. Such a feature enables cross-account access or delegation of permissions within or outside the same account. When a user or a service assumes a role, they receive a set of temporary security credentials that can include an access key, a secret access key, and a session token. These credentials can then be used to make API calls or access resources (of the second cloud environment) based on the permissions granted to the assumed role. Thus, as part of the provisioning process, the multi-cloud service account may be configured to assume certain roles with which the multi-cloud service account may gain access to customer accounts in the second cloud environment.

Upon the user successfully logging into the second cloud environment 720 and completing the above described provisioning process, an access token may be issued to the user. Such a token is then forwarded to the multi-cloud console 750, which in turn, forwards the token to the MCCP 712. The proxy module 712A included in the MCCP 712 performs the authentication of the user as described above and upon the user being successfully authorized (e.g., checking if the user has sufficient privileges to issue a particular type of request) forwards the request to appropriate adaptor included in the pool of adaptors 712C to execute the user's request.

Figure 8:
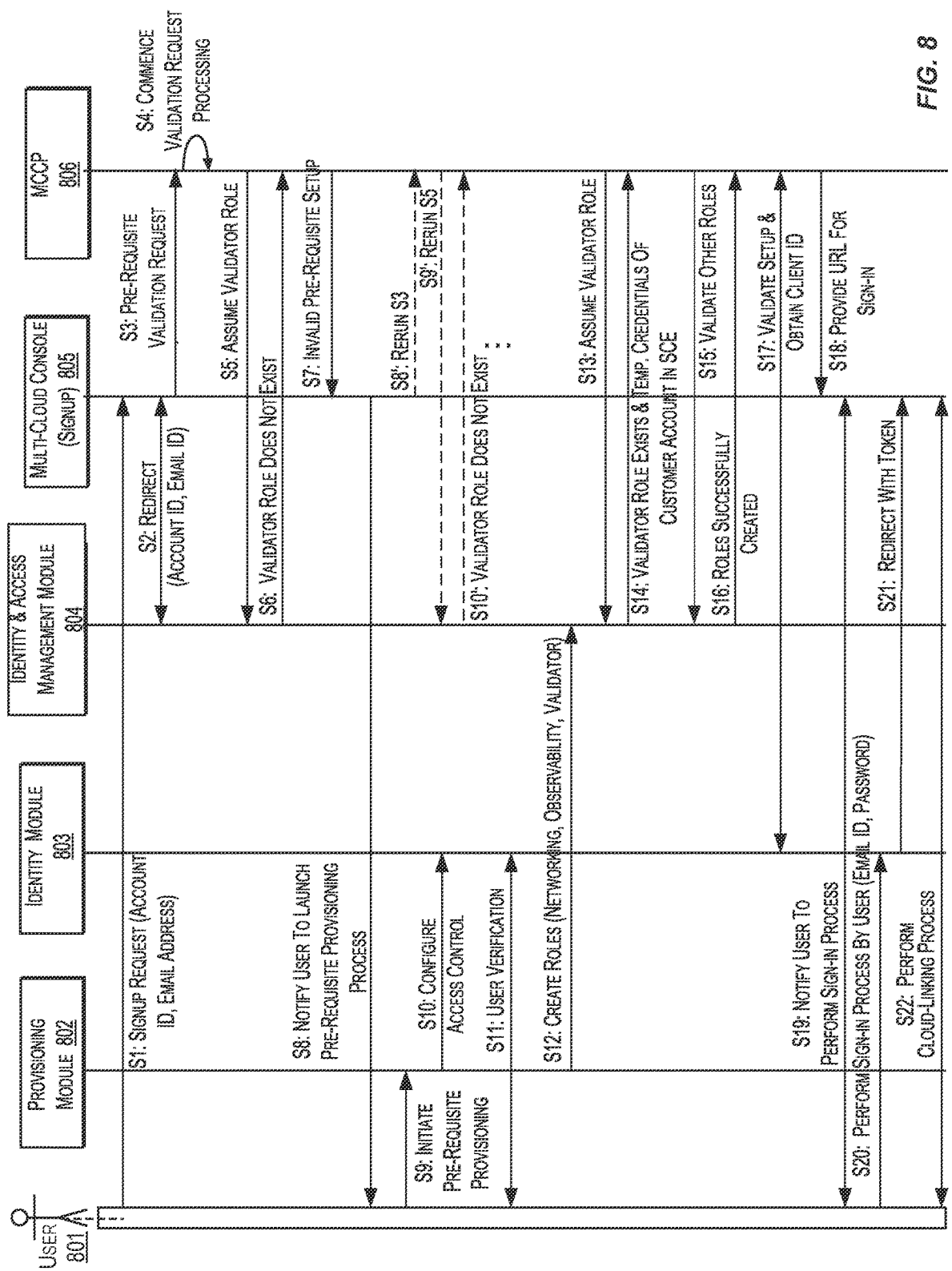
FIG. 8 depicts an exemplary swim diagram illustrating steps corresponding to a user sign-up process, according to some embodiments.

FIG. 8 depicts an exemplary swim diagram illustrating steps corresponding to a user sign-up process, according to some embodiments. Specifically, FIG. 8 depicts the steps performed in signing up a user (of a second cloud environment) to avail multi-cloud services offered by a first cloud environment that is different than the second cloud environment. FIG. 8 depicts interactions between a user 801, a provisioning module 802 of the second cloud environment, an identity module 803 of the second cloud environment, an identity and access management module (IAM) 804 of the second cloud environment (also referred to herein as an access control module), a multi-cloud console (e.g., a signup console) 805 included in a first cloud environment, and a multi-cloud control plane (MCCP) 806 of a multi-cloud infrastructure included in the first cloud environment. It is appreciated that the multi-cloud console 805 as well the MCCP 806 may be considered to be components of the multi-cloud infrastructure that is included in the first cloud environment.

The process commences in step S1, where the user 801 transmits a request to the multi-cloud console 805 e.g., a sign up API of the multi-cloud console to sign up for multi-cloud services provided by the first cloud environment. In some implementations, upon receiving the request, the user may be redirected to the second cloud environment to perform a login operation with respect to the second cloud environment i.e., the user 801 inputs his/her login credentials (of the second cloud environment) that can be verified by the identity system of the second cloud environment (e.g., identity module 803). Upon successfully logging into the second cloud environment (step S2), the user 801 may be redirected to the multi-cloud console 805. In some implementations, metadata information including an account ID of the user (corresponding to the account of the user in the second cloud environment), email address/ID of the user, etc., may be forwarded to the multi-cloud console 805. It is appreciated that the user may be provided with a link (e.g., a hyperlink) corresponding to the signup API of the multi-cloud console by various means e.g., via a service associated with the second cloud environment, via online documentation of the first cloud environment which may include the link to the signup console of the multi-cloud infrastructure, etc. Moreover, the service provided by the multi-cloud infrastructure may include an Exa-database service, a shared-autonomous database service, a dedicated-autonomous database service, or a virtual machine database service, etc.

The multi-cloud console 805 upon receiving the metadata information, transmits a request to the MCCP 806 to determine whether a set of pre-requisite resources have been configured for this user (step S3). In step S4, the MCCP commences processing to determine whether the set of pre-requisite resources have been configured. In step S5, the MCCP proceeds to assume a validator role i.e., a role which permits the MCCP to perform user validation. In some implementations, an API associated with the MCCP assumes the validator role to perform validation of the user. As it is the first time the user 801 is accessing the multi-cloud console 805 in order to sign up for the services provided by the multi-cloud infrastructure, the provisioning of the set of pre-requisite resources is not yet been performed. Thus, in step S6, the identity system of the second cloud environment (e.g., identity system 723 of FIG. 7), which includes the IAM module 804, transmits a notification to the MCCP indicating that the validator role does not exists.

The MCCP 806 transmits a notification to the multi-cloud console 805 (step S7) notifying that the pre-requisite setup of resources is incomplete or invalid. In turn, in step S8, the multi-cloud console provides a notification to the user (e.g., via the API associated with the multi-cloud console) to commence or launch the provisioning process of the pre-requisite resources. In step S9, the user 801 communicates with the provisioning module 802 included in the customer's account of the second cloud environment to trigger the provisioning process.

In step S10, the provisioning module 802 triggers the identity module 803 to commence the provisioning of pre-requisite resources for the user. For instance, as stated previously with reference to FIG. 7, the provisioning includes creating a set of one or more roles (and associated policies, permissions etc., corresponding the respective roles) for one or more users of the second cloud environment. In some implementations, the identity module 803 acts as a user directory of the second cloud environment. Additionally, the access control module 804 may be configured to create a user pool, and perform functions such as add user sign-up, sign-in, and access control to web and mobile applications. In some implementations, the provisioning module 802 is configured to create a hierarchy of resources, each of which is associated with a corresponding role e.g., a networking role, an observability role, and a validator role. It is appreciated that the networking role permits for the creation of a network link i.e., a communication path to interconnect the resources of the first cloud environment and the second cloud environment, whereas the observability role provisions for an observability module (of the MCCP) to publish metrics associated with one or more resources that are deployed in the first cloud environment to be transferred to a monitoring module of the second cloud environment.

The configuring of the pre-requisite resources is depicted in FIG. 8 in steps S10-S12. It is noted that in step S11, the identity module 803 of the second cloud environment may perform a user verification based on credentials (e.g., login information) of the user that are associated with the second cloud environment. It is appreciated that while the process of provisioning the pre-requisite resources is being performed in the second cloud environment, the multi-cloud console 805 of the first cloud environment may simultaneously communicate with the MCCP 806 to determine whether the pre-requisite validation of resources has been configured (steps S8' and S9'). As the provisioning of the pre-requisite resources is occurring concurrently (i.e., not yet completed), in step S10' the IAM module 804 of the second cloud environment transmits a notification to the MCCP 806 indicating that the roles have not yet been created.

In step S13, the MCCP 806 reattempts to assume the validator role. This time, as the roles have been created (i.e., completion of the provisioning of the pre-requisite resources in step S12), the MCCP 806 receives notification from the IAM module 804 of the second cloud environment notifying that the validator role exists. Moreover, in step S14, the IAM module 804 provides temporary credentials of the multi-cloud service account (e.g., that is deployed in the second cloud environment and controlled by the first CSP of the first cloud environment) to the MCCP. In step S15, the MCCP 806 validates other roles of the hierarchy of roles. For instance, the MCCP 806 verifies whether a networking role and an observability role have been created. A confirmation of the roles being created successfully is received by the MCCP 806 in step S16.

In step S17, the MCCP 806 transmits a request to the identity module 803 included in the identity system of the second cloud environment to validate a user setup (e.g., validate configuration of a user pool for the user) and obtains a client ID (e.g., ID of a user pool that the user 801 belongs to). Specifically, the user setup validation may include determining an identifier of a pool of users in the second cloud environment, and membership information indicating that the user is a member of the pool of users e.g., a group of administrators having sufficient rights/privileges. In step S18, the MCCP 806 provides a uniform resource link (URL) to the multi-cloud console 805. Such a URL corresponds to a sign-in URL i.e., sign-in for multi-cloud services provided by the first cloud environment. In step S19, a notification may be provided to the user 801 instructing the user to perform the sign-in process. It is appreciated that such a notification may be provided via the API associated with the multi-cloud console 805.

In step S20, once the user performs a sign-in process e.g., by logging into the identity system of the second cloud environment e.g., identity module 803, the user is directed to the multi-cloud console in step S21. It is noted that upon successful log-in of the user 801 with respect to the identity module 803 of the second cloud environment, an access token may be provided by the identity module 803 to the user. Such an access token may be forwarded to the multi-cloud console 805, wherein the token is used for authenticating privileges of the user, upon the user selecting any one of the services provided by the multi-cloud infrastructure.

In step S22, upon the user being successfully directed to the multi-cloud console, a cloud link adaptor included in the MCCP may be activated to provide an option to the user 801 to link the customers account in the second cloud environment with the customer's account in the first cloud environment. In other words, the cloud link adaptor performs a process of linking the two accounts of the customer in two different cloud environments as described previously with reference to FIG. 7. It is noted that upon linking the two accounts in the different cloud environments, user(s) of the second cloud environment can avail the service(s) provided by the multi-cloud infrastructure, which is included in the first cloud environment. Further, it is appreciated that the multi-cloud infrastructure may provide an option for the user to create a tenancy (for the user) in the first cloud environment in the event that the user does not have an account with the first cloud environment.

Figure 9:
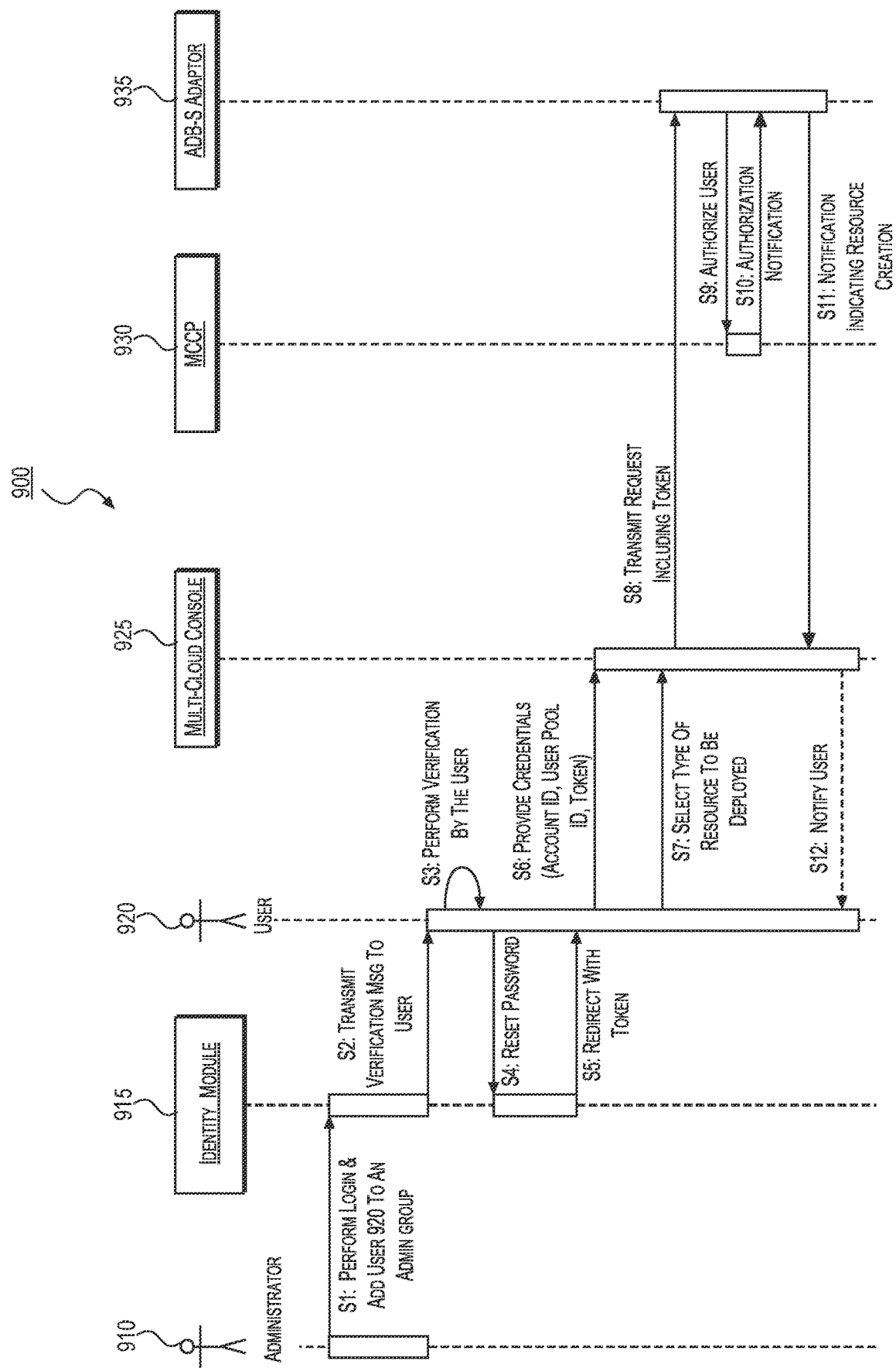
FIG. 9 depicts an exemplary swim diagram illustrating steps corresponding to an in-bound authorization process, according to some embodiments.

FIG. 9 depicts an exemplary swim diagram illustrating steps corresponding to an in-bound authorization process, according to some embodiments. The in-bound authorization process corresponds to a process where an action is initiated/created at the multi-cloud console and a result of the action is executed in a tenancy of a customer in the first cloud environment (e.g., OCI tenancy of the customer). FIG. 9 depicts interactions between several entities including an administrator 910, an identity module 915 (of the second cloud environment), a user 920, a multi-cloud console 925, a MCCP 930, and an adaptor (e.g., ADB-shared adaptor) 935.

As shown in FIG. 9, in step S1, a customer's administrator (i.e., personnel who performed the signup operation of FIG. 8) performs a login operation with respect to the identity module 915 of the second cloud environment. Note that the administrator performs the login operation using credentials associated with the second cloud environment. As the administrator has sufficient privileges, the administrator 910 may desire to add a particular user (e.g., user 920) to an administrative group. Upon adding the user 920 to the administrative group, in step S2, a verification message is transmitted to the user 920. For instance, the verification message may be transmitted via email to the user 920.

In step S3, upon receiving the verification message, the user 920 performs a verification process i.e., by logging in to the second cloud environment using his/her credentials. It is appreciated that the verification message may include a temporary password that is generated by the identity module 915. Upon the user 920 successfully logging into his/her account associated with the second cloud environment, the user may choose to reset the temporary password in step S4. Further, upon successful login with respect to the second cloud environment, a token (e.g., access token) is granted in step S5 to user by the identity module 915.

In step S6, the user is directed to the multi-cloud console 925 (e.g., a GUI of the multi-cloud console) included in a first cloud environment. It is appreciated that the token granted to user as well as metadata is forwarded to multi-cloud console 925. The metadata may include information including an account ID of the user in the second cloud environment, a user pool ID (i.e., identifier associated with a user group to which the user belongs to), etc. In step S7, the user 920 selects a type of resource from a plurality of types of resources that are available for deployment. It is noted that each of the various types of resources may be provided as icons on the GUI of the multi-cloud console 925, wherein the user may select a particular type of resource for deployment by selecting (e.g., clicking) on the corresponding icon on the GUI. Alternatively, the user 920 may select the desired type of resource for deployment from a drop-down menu of the GUI.

Upon the user 920 performing a selection of the type of resource that is desired to be deployed, in step S8, a request is transmitted from the multi-cloud console 925 to a corresponding adaptor (associated with the type of resource) included in a pool of adaptors of the multi-cloud infrastructure of the first cloud environment. For sake of illustration, it is assumed here that the user 920 desires to deploy an autonomous database-shared (ADB-S) resource. However, it is noted that this is in no way limiting the scope of the present disclosure. Further, the request includes the token and other metadata information (obtained in step S6) associated with the user 920. In some implementations, the request transmitted from the multi-cloud console 925 to the database adaptor 935 may be signed using a private key associated with the identity module of the second cloud environment to generate a signed request (i.e., a signature).

Upon the database adaptor 935 receiving the request to deploy the ADB-S resource in a customer tenancy in the first cloud environment of the customer, the database adaptor 935 forwards the signed request i.e., the signature, to the MCCP 930 in step S9 in order to authorize the user i.e., determine whether the user that initiated the request to deploy the type of resource at the multi-cloud console has sufficient privileges to issue the request. The MCCP 925 proceeds to authorize the user by decrypting the signed request using a public key associated with the identity module 915. If the MCCP 925 successfully decrypts the signature, the MCCP 925 extracts the token from the decrypted signed request and authorizes the user 920 based on the token e.g., determining based on the token, whether the user 920 is a member of a user group e.g., administrative group that has privileges to issue requests such as to deploy a resource. Upon successfully authorizing the user, the MCCP 925 transmits an authorization notification to the database adaptor 935 in step S10. It is noted that the above described authorization process may be performed by the proxy module (e.g., proxy module 712A of the MCCP).

Upon receiving the authorization notification, the database adaptor proceeds to deploy the selected type of resource e.g., ADB-S resource, in a compartment of a tenancy of the customer in the first cloud environment. For instance, in one implementation, database adaptor may obtain a link resource object that was previously created for the user. The link resource object includes information linking a tenancy associated with the user in the first cloud environment to an account associated with the user in the second cloud environment. The database adaptor transmits a notification indicative of the resource being deployed in the first cloud environment to the multi-cloud console 925 in step S11. The multi-cloud console 925 in turn, notifies the user 920 of the resource being deployed. It is appreciated that a similar notification may be transmitted from the database adaptor to the multi-cloud console upon the completion of resource deployment.

Figure 10:
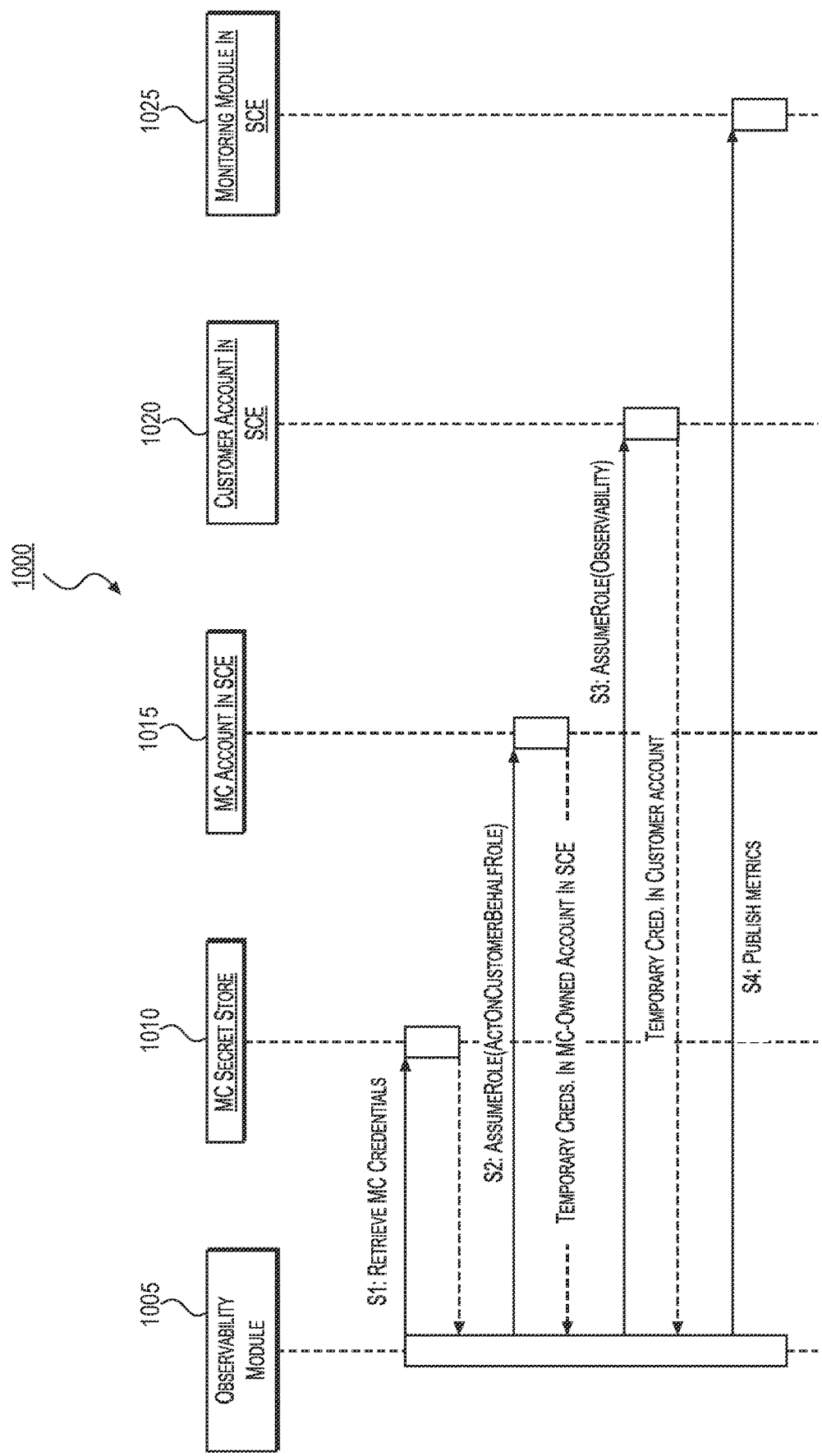
FIG. 10 depicts an exemplary swim diagram illustrating steps corresponding to an out-bound authorization process, according to some embodiments.

FIG. 10 depicts an exemplary swim diagram illustrating steps corresponding to an out-bound authorization process, according to some embodiments. The out-bound authorization process corresponds to a process where resources/components in a first cloud environment desire to access resource(s) in a second cloud environment (different from the first cloud environment). For instance, an example of an out-bound process may correspond to an observability module (e.g., observability adaptor) of the MCCP in a first cloud environment accessing resources (e.g., monitoring module of a second cloud environment) to publish one or more metrics associated with performance of one or more resources deployed in the first cloud environment. FIG. 10 depicts interactions between several entities including an observability module 1005, a multi-cloud secret store 1010 (e.g., a database), a multi-cloud service account 1015 (i.e., an account of the first cloud services provider in the second cloud environment), a customer account in the second cloud environment 1020, and a monitoring module in the second cloud environment 1025. The swim diagram depicted in FIG. 10 corresponds to a scenario where an observability module of the multi-cloud infrastructure (included in a first cloud environment) desires to access a monitoring module included in a second cloud environment in order to publish metrics associated with a performance of one or more resources (e.g., databases) that are deployed in the first cloud environment.

In step S1, the observability module 1005 retrieves, from a multi-cloud secret database 1010 (included in the multi-cloud infrastructure), credentials associated with a multi-cloud service account that is deployed in the second cloud environment (and controlled by the first CSP). This is performed in order to enable the observability module 1005 to gain access to the multi-cloud service account in the second cloud environment.

Upon retrieving the credentials associated with multi-cloud service account, in step S2, the observability module 1005 proceeds to assume a role in the multi-cloud service account to act of behalf on a customer. In other words, the observability module determines whether it has permission(s) to assume a role on behalf of the customer in the multi-cloud service account. Note that during the signup phase (described previously with respect to FIG. 8), in the steps of provisioning of the pre-requisite resources in the second cloud environment, the multi-cloud service account is granted permission to act on behalf of the customer. If the configuration of the pre-requisite resources is performed an appropriate manner, the observability module 1005 is granted permission (in step S2) to act on behalf of the customer.

In step S3, the observability module proceeds to assume a particular role (e.g., observability role) to push metrics associated with the one or more resources into the second cloud environment. In some implementations, the identity system 723 of the second cloud environment may validate the customer to ensure that the pre-requisite resource provisioning was appropriately configured to enable the multi-cloud service account to assume such a role. If the identity system 723 of the second cloud environment successfully validates the pre-requisite provisioning of resources, it provides the observability module 1005, a temporary credential to gain access to the customer's account in the second cloud environment. In other words, during the sign-up phase of FIG. 8, a trust policy is configured which enables the multi-cloud service account to assume the observability role in order to push metrics associated with the one or more resources in the first cloud environment to the second cloud environment. Upon successfully assuming the observability role, in step S4, the observability module transfers or pushes metrics to a monitoring module (e.g., monitoring module 724 of FIG. 7) in order to publish the metrics in a dashboard application of the monitoring module.

Figure 11A:
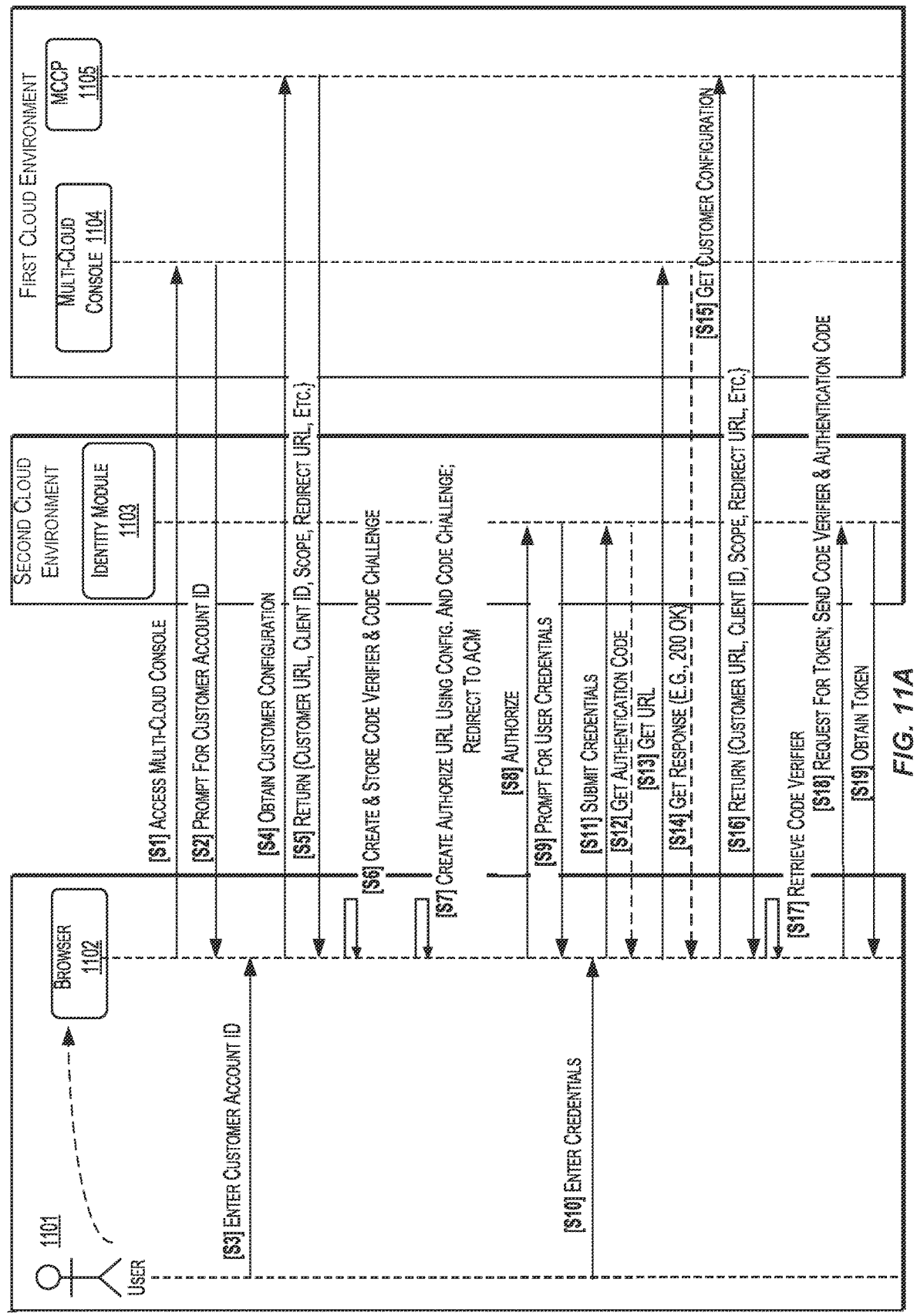
FIG. 11A depicts an exemplary swim diagram illustrating steps corresponding to a user sign-in process, according to some embodiments, according to certain embodiments.

FIG. 11A depicts an exemplary swim diagram illustrating steps corresponding to a user sign-in process, according to some embodiments, according to certain embodiments. FIG. 11A depicts interactions between several entities including a user 1101, a browser 1102, an identity module 1103 (of the second cloud environment), and a multi-cloud console 1104 and MCCP 1105, which are included in a first cloud environment.

In step S1, the user 1101 utilizes the browser 1102 to access the multi-cloud console 1104 e.g., an API of the multi-cloud console 1104. In step S2, the multi-cloud console 1104 provides a prompt to the user to enter an account ID associated with a customer (e.g., an organization). It is noted that the user is a member (e.g., employee) of the customer. In step S3, the user 1101 enters the customer's account ID, whereafter a request is transmitted from the browser to MCCP 1105 in order to obtain a unique configuration associated with the customer (step S4). It is noted that the configuration may correspond to information including a unique URL for the customer (e.g., a URL corresponding to the customer and associated with the second cloud environment, where the user may perform a login operation), and other metadata related to the customer e.g., client ID, a scope, a redirect URL e.g., an URL associated with the multi-cloud console to which the customer is to be directed, etc.

Based on the customer account ID obtained in S2, the MCCP 1105 in step S5 returns the customer configuration to the browser. It is appreciated that at customer signup process of FIG. 8, a mapping of the customer's account ID to the particular configuration associated with the customer may be stored in a database of the MCCP 1105. Steps S6 to S9 described below are related to authorization processing including a proof key for code exchange (PKCE) that enhances security for the customers. Specifically, in step S6, the browser may generate a code verifier and a code challenge and store the generated verifier and challenge in a browser storage. In some implementations, the code verifier corresponds to a cryptographically generated random string e.g., a high entropy secret string. Further, the code challenge may be generated based on the code verifier e.g., by performing a hash operation (using a hashing function e.g., SHA 256) on the code verifier. It is noted that the code verifier and the code challenge may be used to perform a challenge-response validation.

Based on the code challenge generated in step S6, and the configuration information received in step S5, in step S7, the browser configures/creates a URL for directing the user to the identity module 1103 of the second cloud environment. In step S8, the user 1101 accesses the generated URL in step S7 to perform a login operation. In some implementations, the authorization request of S8 may include the code challenge generated in step S6. In step S9, the identity module 1103 of the second cloud environment provides a prompt for the user 1101 to enter user credentials. Upon the user 1101 entering the user credentials, the credentials are submitted to the identity module 1103 of the second cloud environment in step S11.

In step S12, the identity provider of the second cloud environment redirects a user's browser with an authentication code. In step S13, the browser 1102 performs a GET function on the URL as directed in step S12. In step S14, a response is obtained from the multi-cloud console 1104. For instance, the response may correspond to a status response (e.g., 200 OK response) which includes a script (e.g., Java script) which performs the calls in the next steps.

In step S15, a request is transmitted from the browser to MCCP 1105 to obtain the unique configuration associated with the customer. It is noted that the configuration may correspond to information including a unique URL for the customer. The configuration information is obtained in step S16. It is noted that the configuration information includes the unique URL for the customer as well as other metadata including client ID, scope, redirect URL, etc. In step S17, the browser retrieves the code verifier from its local storage.

In step S18, in order to obtain a token from the identity system of the second cloud environment, the browser 1102 transmits a request to obtain the token, wherein the request includes the code verifier, and then authentication code. In some implementations, the identity module 1103 of the second cloud environment, may perform processing to determine: (i) whether the authentication code received in step S18 corresponds to the previously transmitted authentication code of step S12, and (ii) based on the code verifier the identity module 1103 may generate the code challenge and compare it to the challenge received in step S8. Based on the above conditions being verified, the identity module 1103 may generate one or more tokens for the user (step S19). It is noted that the user 1101, may utilize the token(s) to access multi-cloud services that are provided by the first cloud environment (via the multi-cloud console), and which is different than the cloud environment (i.e., second cloud environment) from which the user is initiating the request to access such services.

Figure 11B:
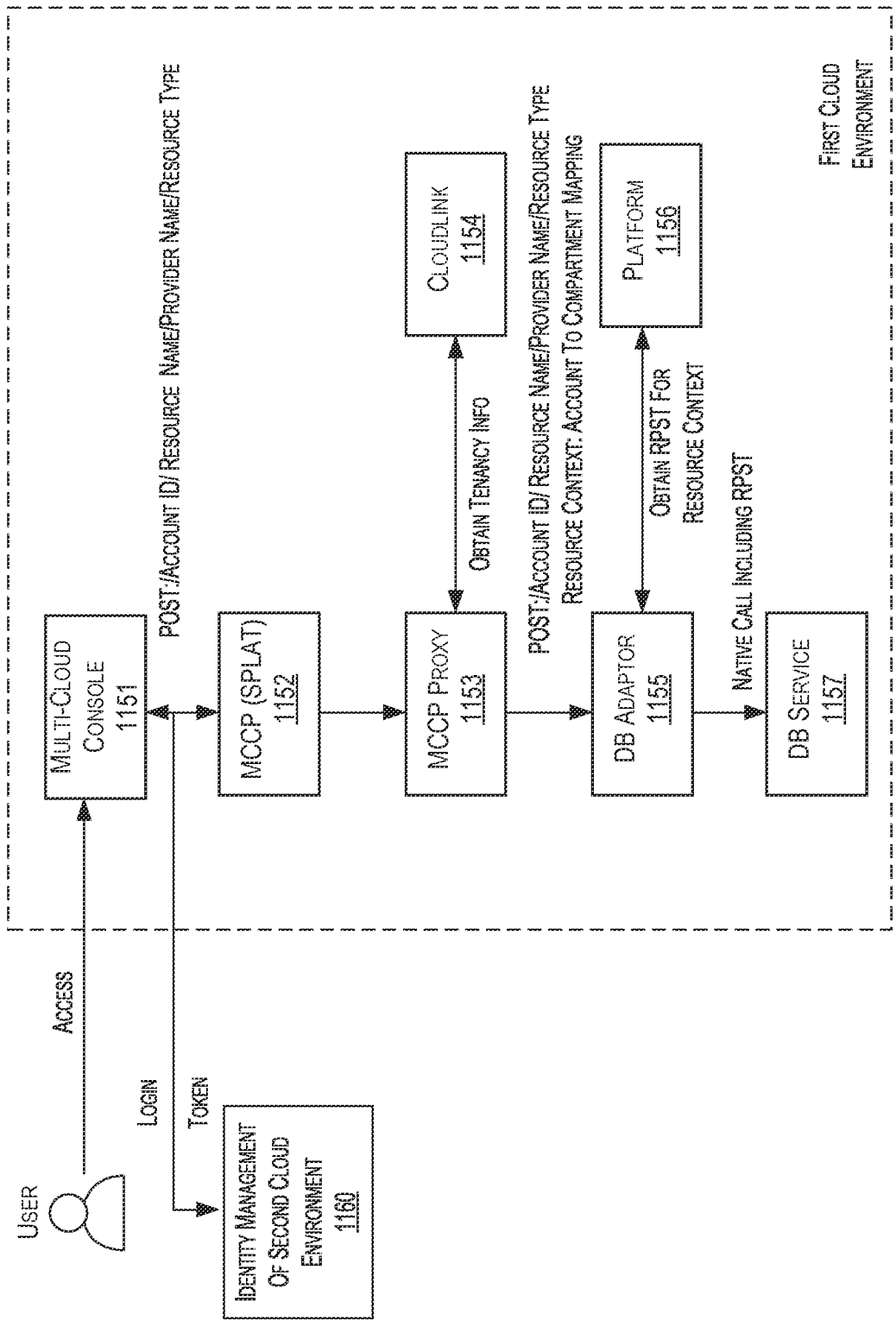
FIG. 11B depicts a schematic illustrating deployment of a resource by the multi-cloud infrastructure, according to some embodiments.

FIG. 11B depicts a schematic illustrating deployment of a resource by the multi-cloud infrastructure, according to some embodiments. As shown in FIG. 11B, the first cloud environment includes a multi-cloud console 1151, a service platform (SPLAT) 1152, a proxy 1153, a cloud-link adaptor 1154, a database adaptor 1155, and a platform 1156. Upon the user accessing the multi-cloud console 1151, the user in some implementations may be directed to the identity management system 1160 of the second cloud environment in order to perform a login operation with respect to the second cloud environment. It is noted that upon successful login, the user is re-directed back to the multi-cloud console 1151 along with a token e.g., an access token. It is appreciated that the user may utilize the multi-cloud console 1151 to issue commands to access, create, or update a resource in the tenancy of the user in the first cloud infrastructure. For sake of illustration, in what follows, there is described a scenario of the user utilizing the multi-cloud console 1151 to issue a request to create a database resource e.g., Exa-database resource.

The multi-cloud console 1151 provides a plurality of options e.g., create a resource, access a resource, update a resource etc. Such options may be provided to the user in the form of selectable icons (e.g., buttons) in the multi-cloud console 1151. Upon the user performing a selection (e.g., to create a resource), an API call is triggered to the service platform 1152. It is appreciated that in some implementations, the request made to the service platform 1151 may be a call such as a REST type call (or a POST call) including an authorization header that comprises a token associated with the user in the second cloud infrastructure. Also included in the request is metadata information including an account ID (of the second cloud environment), a resource name, a provider name, and a type of resource requested by the user.

The call including the token is further forwarded to the proxy module 1153 that performs authentication and access control operations. According to some embodiments, the proxy module 1153 performs an authentication operation by extracting the token included in the call. In some implementations, the proxy module 1153 validates the token by comparing a signature (used to sign the request) with a publicly available signature of the second cloud infrastructure to ensure that the request originates from a valid customer associated with the second cloud infrastructure. Additionally, the proxy module 1153 may also check roles i.e., privileges associated with the token e.g., whether the role corresponds to an DB administrator or the like. Based on the role, the proxy module 1153 may route the request to an appropriate adaptor included in the MCCP framework i.e., to one of the adaptors included the pool of adaptors 712C as shown in FIG. 7.

According to one embodiment, the proxy module 1153 compares the role (associated with the token) to a preconfigured list of roles that is published and assigned (as part of the API specification) for each of the adaptors. For example, if the role associated with the token corresponds to an 'Exadata DB administrator', then the request may be comprehended as one being of creating an Exa-database and thus the request is forwarded to the database adaptor 1155. Additionally, by some embodiments, the proxy module 1153 may analyze information included in the REST call such as a provider ID, resource type requested, etc., and based on the analyzed information, the proxy module 1153 may forward the request to the appropriate adaptor.

In some implementations, the request obtained by the proxy module 1153 may not include information identifying the tenancy of the user in the first cloud infrastructure where the resource is to be deployed. Thus, the proxy module 1153 communicates with the cloud-link adaptor 1154 to obtain mapping information of the user's account in the second cloud infrastructure to the tenancy of the user in the first cloud infrastructure. If the mapping information exists, then the proxy module 1153 obtains the information pertaining to the tenancy of the user in the first cloud infrastructure and passes the information to the database adaptor 1155. In this manner, the database adaptor 1155 is aware of the tenancy of the user in the first cloud infrastructure where the resource is to be created/deployed. However, if the cloud-link adaptor 1154 determines that no mapping information exists, then the proxy module 1153 may simply issue, as a response to the request to create the database resource, an 'unauthorized-access' message that is transmitted back to the user.

It is noted that in some implementations, the cloud-link adaptor 1154 creates a data object (referred to herein as a cloud-link resource object or a link resource object) for storing metadata information identifying the two accounts being linked. For example, the data object stores metadata information including a mapping of a first identifier associated with the tenancy (i.e., account) in the first cloud infrastructure and a second identifier associated with the account of the user with the second cloud service provider. Such a mapping is referred to herein as a resource context. Additionally, the cloud-link adaptor 1154 may also create a resource-principal (referred to herein as a cloud-link resource principal) associated with the resource context. The cloud-link adaptor 1154 may maintain the data object as well as the resource-principal within a root compartment of the tenancy of the user in the first cloud infrastructure. In some embodiments, the cloud-link adaptor 1154 may also locally persist the data object and/or the resource principal in the platform 1156.

In some implementations, the database adaptor 1155 may obtain the resource principal that is locally persisted in the platform 1156. The database adaptor 1155 may transmit a request (including the resource-principal) to one or more downstream services included in the first cloud infrastructure to create the resources in the tenancy of the user in the first cloud infrastructure. In other words, the downstream services included in the first cloud infrastructure utilizes the identity i.e., resource principal obtained from the platform 1156 to create/deploy the required resources e.g., Exa-database in the tenancy of the user in the first cloud infrastructure. Upon the user issuing the request to create the Exa-database, the user may intermittently poll the MCCP to obtain a status of the request. Upon the downstream services of the first cloud infrastructure creating the resource in the tenancy of the user in the first cloud infrastructure, the MCCP may notify the user regarding a successful completion of the request.

Examples of Cloud Infrastructure

As noted above, infrastructure as a service (IaaS) is one particular type of cloud computing. IaaS can be configured to provide virtualized computing resources over a public network (e.g., the Internet). In an IaaS model, a cloud computing provider can host the infrastructure components (e.g., servers, storage devices, network nodes (e.g., hardware), deployment software, platform virtualization (e.g., a hypervisor layer), or the like). In some cases, an IaaS provider may also supply a variety of services to accompany those infrastructure components (e.g., billing, monitoring, logging, security, load balancing and clustering, etc.). Thus, as these services may be policy-driven, IaaS users may be able to implement policies to drive load balancing to maintain application availability and performance.

In some instances, IaaS customers may access resources and services through a wide area network (WAN), such as the Internet, and can use the cloud provider's services to install the remaining elements of an application stack. For example, the user can log in to the IaaS platform to create virtual machines (VMs), install operating systems (OSs) on each VM, deploy middleware such as databases, create storage buckets for workloads and backups, and even install enterprise software into that VM. Customers can then use the provider's services to perform various functions, including balancing network traffic, troubleshooting application issues, monitoring performance, managing disaster recovery, etc.

In most cases, a cloud computing model will require the participation of a cloud provider. The cloud provider may, but need not be, a third-party service that specializes in providing (e.g., offering, renting, selling) IaaS. An entity might also opt to deploy a private cloud, becoming its own provider of infrastructure services.

In some examples, IaaS deployment is the process of putting a new application, or a new version of an application, onto a prepared application server or the like. It may also include the process of preparing the server (e.g., installing libraries, daemons, etc.). This is often managed by the cloud provider, below the hypervisor layer (e.g., the servers, storage, network hardware, and virtualization). Thus, the customer may be responsible for handling (OS), middleware, and/or application deployment (e.g., on self-service virtual machines (e.g., that can be spun up on demand) or the like.

In some examples, IaaS provisioning may refer to acquiring computers or virtual hosts for use, and even installing needed libraries or services on them. In most cases, deployment does not include provisioning, and the provisioning may need to be performed first.

In some cases, there are two different challenges for IaaS provisioning. First, there is the initial challenge of provisioning the initial set of infrastructure before anything is running. Second, there is the challenge of evolving the existing infrastructure (e.g., adding new services, changing services, removing services, etc.) once everything has been provisioned. In some cases, these two challenges may be addressed by enabling the configuration of the infrastructure to be defined declaratively. In other words, the infrastructure (e.g., what components are needed and how they interact) can be defined by one or more configuration files. Thus, the overall topology of the infrastructure (e.g., what resources depend on which, and how they each work together) can be described declaratively. In some instances, once the topology is defined, a workflow can be generated that creates and/or manages the different components described in the configuration files.

In some examples, an infrastructure may have many interconnected elements. For example, there may be one or more virtual private clouds (VPCs) (e.g., a potentially on-demand pool of configurable and/or shared computing resources), also known as a core network. In some examples, there may also be one or more security group rules provisioned to define how the security of the network will be set up and one or more virtual machines (VMs). Other infrastructure elements may also be provisioned, such as a load balancer, a database, or the like. As more and more infrastructure elements are desired and/or added, the infrastructure may incrementally evolve.

In some instances, continuous deployment techniques may be employed to enable deployment of infrastructure code across various virtual computing environments. Additionally, the described techniques can enable infrastructure management within these environments. In some examples, service teams can write code that is desired to be deployed to one or more, but often many, different production environments (e.g., across various different geographic locations, sometimes spanning the entire world). However, in some examples, the infrastructure on which the code will be deployed must first be set up. In some instances, the provisioning can be done manually, a provisioning tool may be utilized to provision the resources, and/or deployment tools may be utilized to deploy the code once the infrastructure is provisioned.

Figure 12:
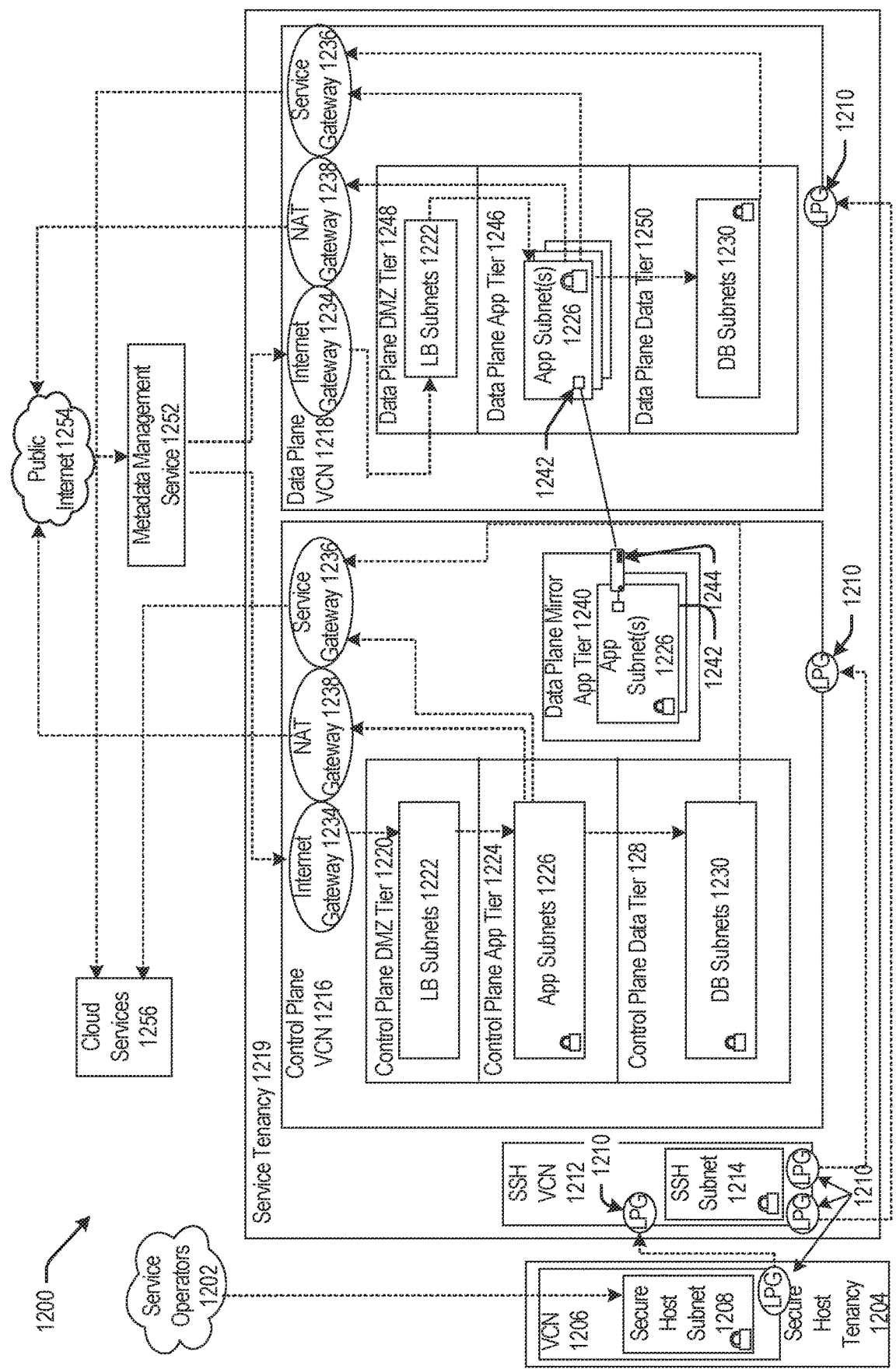
FIG. 12 is a block diagram illustrating one pattern for implementing a cloud infrastructure as a service system, according to at least one embodiment.

FIG. 12 is a block diagram 1200 illustrating an example pattern of an IaaS architecture, according to at least one embodiment. Service operators 1202 can be communicatively coupled to a secure host tenancy 1204 that can include a virtual cloud network (VCN) 1206 and a secure host subnet 1208. In some examples, the service operators 1202 may be using one or more client computing devices, which may be portable handheld devices (e.g., an iPhone®, cellular telephone, an iPad®, computing tablet, a personal digital assistant (PDA)) or wearable devices (e.g., a Google Glass® head mounted display), running software such as Microsoft Windows Mobile®, and/or a variety of mobile operating systems such as iOS, Windows Phone, Android, BlackBerry 8, Palm OS, and the like, and being Internet, e-mail, short message service (SMS), Blackberry®, or other communication protocol enabled. Alternatively, the client computing devices can be general purpose personal computers including, by way of example, personal computers and/or laptop computers running various versions of Microsoft Windows®, Apple Macintosh®, and/or Linux operating systems. The client computing devices can be workstation computers running any of a variety of commercially available UNIX® or UNIX-like operating systems, including without limitation the variety of GNU/Linux operating systems, such as for example, Google Chrome OS. Alternatively, or in addition, client computing devices may be any other electronic device, such as a thin-client computer, an Internet-enabled gaming system (e.g., a Microsoft Xbox gaming console with or without a Kinect® gesture input device), and/or a personal messaging device, capable of communicating over a network that can access the VCN 1206 and/or the Internet.

The VCN 1206 can include a local peering gateway (LPG) 1210 that can be communicatively coupled to a secure shell (SSH) VCN 1212 via an LPG 1210 contained in the SSH VCN 1212. The SSH VCN 1212 can include an SSH subnet 1214, and the SSH VCN 1212 can be communicatively coupled to a control plane VCN 1216 via the LPG 1210 contained in the control plane VCN 1216. Also, the SSH VCN 1212 can be communicatively coupled to a data plane VCN 1218 via an LPG 1210. The control plane VCN 1216 and the data plane VCN 1218 can be contained in a service tenancy 1219 that can be owned and/or operated by the IaaS provider.

The control plane VCN 1216 can include a control plane demilitarized zone (DMZ) tier 1220 that acts as a perimeter network (e.g., portions of a corporate network between the corporate intranet and external networks). The DMZ-based servers may have restricted responsibilities and help keep security breaches contained. Additionally, the DMZ tier 1220 can include one or more load balancer (LB) subnet(s) 1222, a control plane app tier 1224 that can include app subnet(s) 1226, a control plane data tier 1228 that can include database (DB) subnet(s) 1230 (e.g., frontend DB subnet(s) and/or backend DB subnet(s)). The LB subnet(s) 1222 contained in the control plane DMZ tier 1220 can be communicatively coupled to the app subnet(s) 1226 contained in the control plane app tier 1224 and an Internet gateway 1234 that can be contained in the control plane VCN 1216, and the app subnet(s) 1226 can be communicatively coupled to the DB subnet(s) 1230 contained in the control plane data tier 1228 and a service gateway 1236 and a network address translation (NAT) gateway 1238. The control plane VCN 1216 can include the service gateway 1236 and the NAT gateway 1238.

The control plane VCN 1216 can include a data plane mirror app tier 1240 that can include app subnet(s) 1226. The app subnet(s) 1226 contained in the data plane mirror app tier 1240 can include a virtual network interface controller (VNIC) 1242 that can execute a compute instance 1244. The compute instance 1244 can communicatively couple the app subnet(s) 1226 of the data plane mirror app tier 1240 to app subnet(s) 1226 that can be contained in a data plane app tier 1246.

The data plane VCN 1218 can include the data plane app tier 1246, a data plane DMZ tier 1248, and a data plane data tier 1250. The data plane DMZ tier 1248 can include LB subnet(s) 1222 that can be communicatively coupled to the app subnet(s) 1226 of the data plane app tier 1246 and the Internet gateway 1234 of the data plane VCN 1218. The app subnet(s) 1226 can be communicatively coupled to the service gateway 1236 of the data plane VCN 1218 and the NAT gateway 1238 of the data plane VCN 1218. The data plane data tier 1250 can also include the DB subnet(s) 1230 that can be communicatively coupled to the app subnet(s) 1226 of the data plane app tier 1246.

The Internet gateway 1234 of the control plane VCN 1216 and of the data plane VCN 1218 can be communicatively coupled to a metadata management service 1252 that can be communicatively coupled to public Internet 1254. Public Internet 1254 can be communicatively coupled to the NAT gateway 1238 of the control plane VCN 1216 and of the data plane VCN 1218. The service gateway 1236 of the control plane VCN 1216 and of the data plane VCN 1218 can be communicatively couple to cloud services 1256.

In some examples, the service gateway 1236 of the control plane VCN 1216 or of the data plane VCN 1218 can make application programming interface (API) calls to cloud services 1256 without going through public Internet 1254. The API calls to cloud services 1256 from the service gateway 1236 can be one-way: the service gateway 1236 can make API calls to cloud services 1256, and cloud services 1256 can send requested data to the service gateway 1236. But, cloud services 1256 may not initiate API calls to the service gateway 1236.

In some examples, the secure host tenancy 1204 can be directly connected to the service tenancy 1219, which may be otherwise isolated. The secure host subnet 1208 can communicate with the SSH subnet 1214 through an LPG 1210 that may enable two-way communication over an otherwise isolated system. Connecting the secure host subnet 1208 to the SSH subnet 1214 may give the secure host subnet 1208 access to other entities within the service tenancy 1219.

The control plane VCN 1216 may allow users of the service tenancy 1219 to set up or otherwise provision desired resources. Desired resources provisioned in the control plane VCN 1216 may be deployed or otherwise used in the data plane VCN 1218. In some examples, the control plane VCN 1216 can be isolated from the data plane VCN 1218, and the data plane mirror app tier 1240 of the control plane VCN 1216 can communicate with the data plane app tier 1246 of the data plane VCN 1218 via VNICs 1242 that can be contained in the data plane mirror app tier 1240 and the data plane app tier 1246.

In some examples, users of the system, or customers, can make requests, for example create, read, update, or delete (CRUD) operations, through public Internet 1254 that can communicate the requests to the metadata management service 1252. The metadata management service 1252 can communicate the request to the control plane VCN 1216 through the Internet gateway 1234. The request can be received by the LB subnet(s) 1222 contained in the control plane DMZ tier 1220. The LB subnet(s) 1222 may determine that the request is valid, and in response to this determination, the LB subnet(s) 1222 can transmit the request to app subnet(s) 1226 contained in the control plane app tier 1224. If the request is validated and requires a call to public Internet 1254, the call to public Internet 1254 may be transmitted to the NAT gateway 1238 that can make the call to public Internet 1254. Memory that may be desired to be stored by the request can be stored in the DB subnet(s) 1230.

In some examples, the data plane mirror app tier 1240 can facilitate direct communication between the control plane VCN 1216 and the data plane VCN 1218. For example, changes, updates, or other suitable modifications to configuration may be desired to be applied to the resources contained in the data plane VCN 1218. Via a VNIC 1242, the control plane VCN 1216 can directly communicate with, and can thereby execute the changes, updates, or other suitable modifications to configuration to, resources contained in the data plane VCN 1218.

In some embodiments, the control plane VCN 1216 and the data plane VCN 1218 can be contained in the service tenancy 1219. In this case, the user, or the customer, of the system may not own or operate either the control plane VCN 1216 or the data plane VCN 1218. Instead, the IaaS provider may own or operate the control plane VCN 1216 and the data plane VCN 1218, both of which may be contained in the service tenancy 1219. This embodiment can enable isolation of networks that may prevent users or customers from interacting with other users', or other customers', resources. Also, this embodiment may allow users or customers of the system to store databases privately without needing to rely on public Internet 1254, which may not have a desired level of security, for storage.

In other embodiments, the LB subnet(s) 1222 contained in the control plane VCN 1216 can be configured to receive a signal from the service gateway 1236. In this embodiment, the control plane VCN 1216 and the data plane VCN 1218 may be configured to be called by a customer of the IaaS provider without calling public Internet 1254. Customers of the IaaS provider may desire this embodiment since database(s) that the customers use may be controlled by the IaaS provider and may be stored on the service tenancy 1219, which may be isolated from public Internet 1254.

Figure 13:
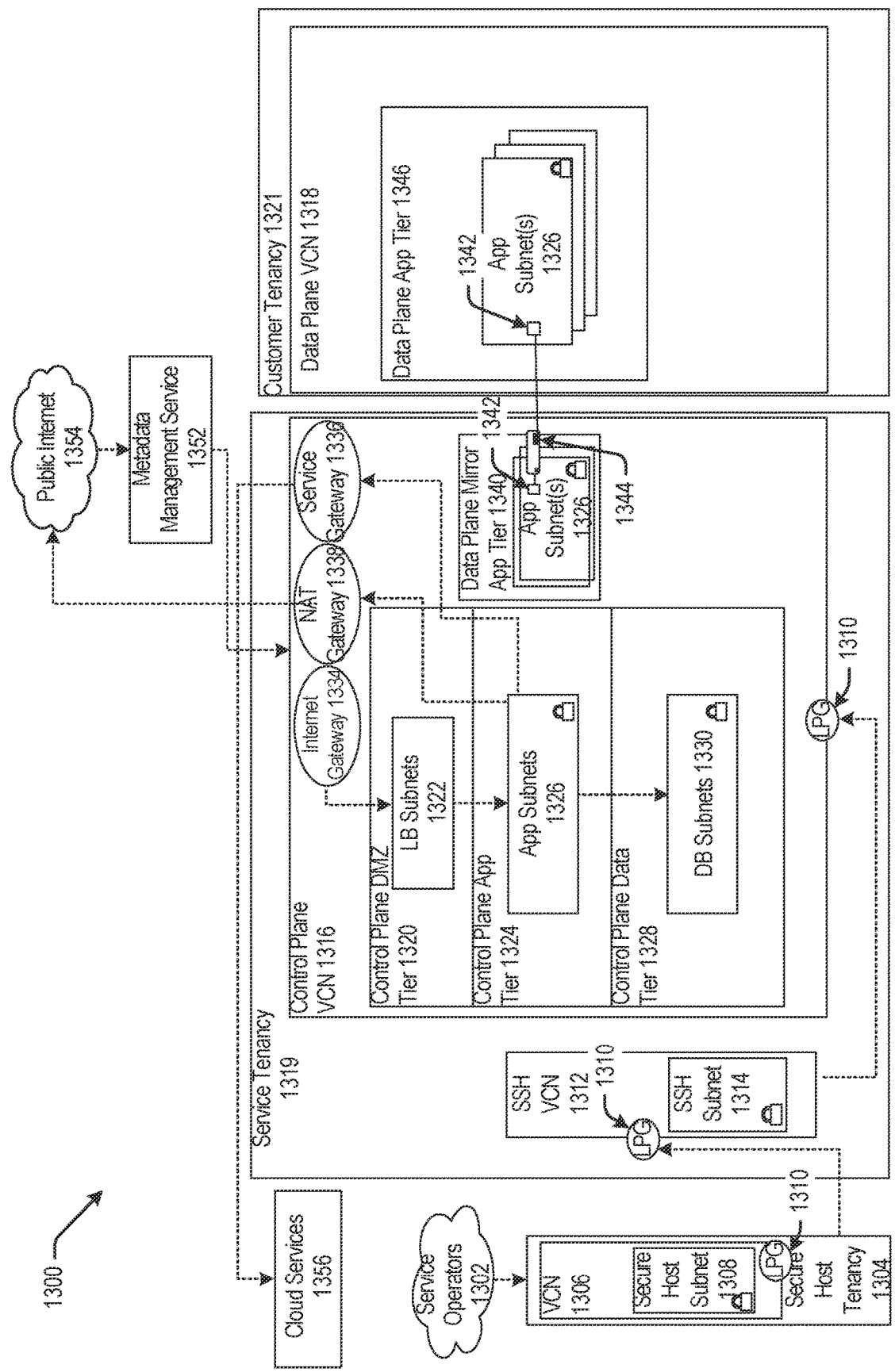
FIG. 13 is a block diagram illustrating another pattern for implementing a cloud infrastructure as a service system, according to at least one embodiment.

FIG. 13 is a block diagram 1300 illustrating another example pattern of an IaaS architecture, according to at least one embodiment. Service operators 1302 (e.g., service operators 1202 of FIG. 12) can be communicatively coupled to a secure host tenancy 1304 (e.g., the secure host tenancy 1204 of FIG. 12) that can include a virtual cloud network (VCN) 1306 (e.g., the VCN 1206 of FIG. 12) and a secure host subnet 1308 (e.g., the secure host subnet 1208 of FIG. 12). The VCN 1306 can include a local peering gateway (LPG) 1310 (e.g., the LPG 1210 of FIG. 12) that can be communicatively coupled to a secure shell (SSH) VCN 1312 (e.g., the SSH VCN 1212 of FIG. 12) via an LPG 1310 contained in the SSH VCN 1312. The SSH VCN 1312 can include an SSH subnet 1314 (e.g., the SSH subnet 1214 of FIG. 12), and the SSH VCN 1312 can be communicatively coupled to a control plane VCN 1316 (e.g., the control plane VCN 1216 of FIG. 12) via an LPG 1310 contained in the control plane VCN 1316. The control plane VCN 1316 can be contained in a service tenancy 1319 (e.g., the service tenancy 1219 of FIG. 12), and the data plane VCN 1318 (e.g., the data plane VCN 1218 of FIG. 12) can be contained in a customer tenancy 1321 that may be owned or operated by users, or customers, of the system.

The control plane VCN 1316 can include a control plane DMZ tier 1320 (e.g. the control plane DMZ tier 1220 of FIG. 12) that can include LB subnet(s) 1322 (e.g. LB subnet(s) 1222 of FIG. 12), a control plane app tier 1324 (e.g. the control plane app tier 1224 of FIG. 12) that can include app subnet(s) 1326 (e.g. app subnet(s) 1226 of FIG. 12), a control plane data tier 1328 (e.g. the control plane data tier 1228 of FIG. 12) that can include database (DB) subnet(s) 1330 (e.g. similar to DB subnet(s) 1230 of FIG. 12). The LB subnet(s) 1322 contained in the control plane DMZ tier 1320 can be communicatively coupled to the app subnet(s) 1326 contained in the control plane app tier 1324 and an Internet gateway 1334 (e.g. the Internet gateway 1234 of FIG. 12) that can be contained in the control plane VCN 1316, and the app subnet(s) 1326 can be communicatively coupled to the DB subnet(s) 1330 contained in the control plane data tier 1328 and a service gateway 1336 (e.g. the service gateway of FIG. 12) and a network address translation (NAT) gateway 1338 (e.g. the NAT gateway 1238 of FIG. 12). The control plane VCN 1316 can include the service gateway 1336 and the NAT gateway 1338.

The control plane VCN 1316 can include a data plane mirror app tier 1340 (e.g., the data plane mirror app tier 1240 of FIG. 12) that can include app subnet(s) 1326. The app subnet(s) 1326 contained in the data plane mirror app tier 1340 can include a virtual network interface controller (VNIC) 1342 (e.g., the VNIC of 1242) that can execute a compute instance 1344 (e.g., similar to the compute instance 1244 of FIG. 12). The compute instance 1344 can facilitate communication between the app subnet(s) 1326 of the data plane mirror app tier 1340 and the app subnet(s) 1326 that can be contained in a data plane app tier 1346 (e.g., the data plane app tier 1246 of FIG. 12) via the VNIC 1342 contained in the data plane mirror app tier 1340 and the VNIC 1342 contained in the data plane app tier 1346.

The Internet gateway 1334 contained in the control plane VCN 1316 can be communicatively coupled to a metadata management service 1352 (e.g., the metadata management service 1252 of FIG. 12) that can be communicatively coupled to public Internet 1354 (e.g., public Internet 1254 of FIG. 12). Public Internet 1354 can be communicatively coupled to the NAT gateway 1338 contained in the control plane VCN 1316. The service gateway 1336 contained in the control plane VCN 1316 can be communicatively couple to cloud services 1356 (e.g., cloud services 1256 of FIG. 12).

In some examples, the data plane VCN 1318 can be contained in the customer tenancy 1321. In this case, the IaaS provider may provide the control plane VCN 1316 for each customer, and the IaaS provider may, for each customer, set up a unique compute instance 1344 that is contained in the service tenancy 1319. Each compute instance 1344 may allow communication between the control plane VCN 1316, contained in the service tenancy 1319, and the data plane VCN 1318 that is contained in the customer tenancy 1321. The compute instance 1344 may allow resources, which are provisioned in the control plane VCN 1316 that is contained in the service tenancy 1319, to be deployed or otherwise used in the data plane VCN 1318 that is contained in the customer tenancy 1321.

In other examples, the customer of the IaaS provider may have databases that live in the customer tenancy 1321. In this example, the control plane VCN 1316 can include the data plane mirror app tier 1340 that can include app subnet(s) 1326. The data plane mirror app tier 1340 can reside in the data plane VCN 1318, but the data plane mirror app tier 1340 may not live in the data plane VCN 1318. That is, the data plane mirror app tier 1340 may have access to the customer tenancy 1321, but the data plane mirror app tier 1340 may not exist in the data plane VCN 1318 or be owned or operated by the customer of the IaaS provider. The data plane mirror app tier 1340 may be configured to make calls to the data plane VCN 1318 but may not be configured to make calls to any entity contained in the control plane VCN 1316. The customer may desire to deploy or otherwise use resources in the data plane VCN 1318 that are provisioned in the control plane VCN 1316, and the data plane mirror app tier 1340 can facilitate the desired deployment, or other usage of resources, of the customer.

In some embodiments, the customer of the IaaS provider can apply filters to the data plane VCN 1318. In this embodiment, the customer can determine what the data plane VCN 1318 can access, and the customer may restrict access to public Internet 1354 from the data plane VCN 1318. The IaaS provider may not be able to apply filters or otherwise control access of the data plane VCN 1318 to any outside networks or databases. Applying filters and controls by the customer onto the data plane VCN 1318, contained in the customer tenancy 1321, can help isolate the data plane VCN 1318 from other customers and from public Internet 1354.

In some embodiments, cloud services 1356 can be called by the service gateway 1336 to access services that may not exist on public Internet 1354, on the control plane VCN 1316, or on the data plane VCN 1318. The connection between cloud services 1356 and the control plane VCN 1316 or the data plane VCN 1318 may not be live or continuous. Cloud services 1356 may exist on a different network owned or operated by the IaaS provider. Cloud services 1356 may be configured to receive calls from the service gateway 1336 and may be configured to not receive calls from public Internet 1354. Some cloud services 1356 may be isolated from other cloud services 1356, and the control plane VCN 1316 may be isolated from cloud services 1356 that may not be in the same region as the control plane VCN 1316. For example, the control plane VCN 1316 may be located in "Region 1," and cloud service "Deployment 12," may be located in Region 1 and in "Region 2." If a call to Deployment 12 is made by the service gateway 1336 contained in the control plane VCN 1316 located in Region 1, the call may be transmitted to Deployment 12 in Region 1. In this example, the control plane VCN 1316, or Deployment 12 in Region 1, may not be communicatively coupled to, or otherwise in communication with, Deployment 12 in Region 2.

Figure 14:
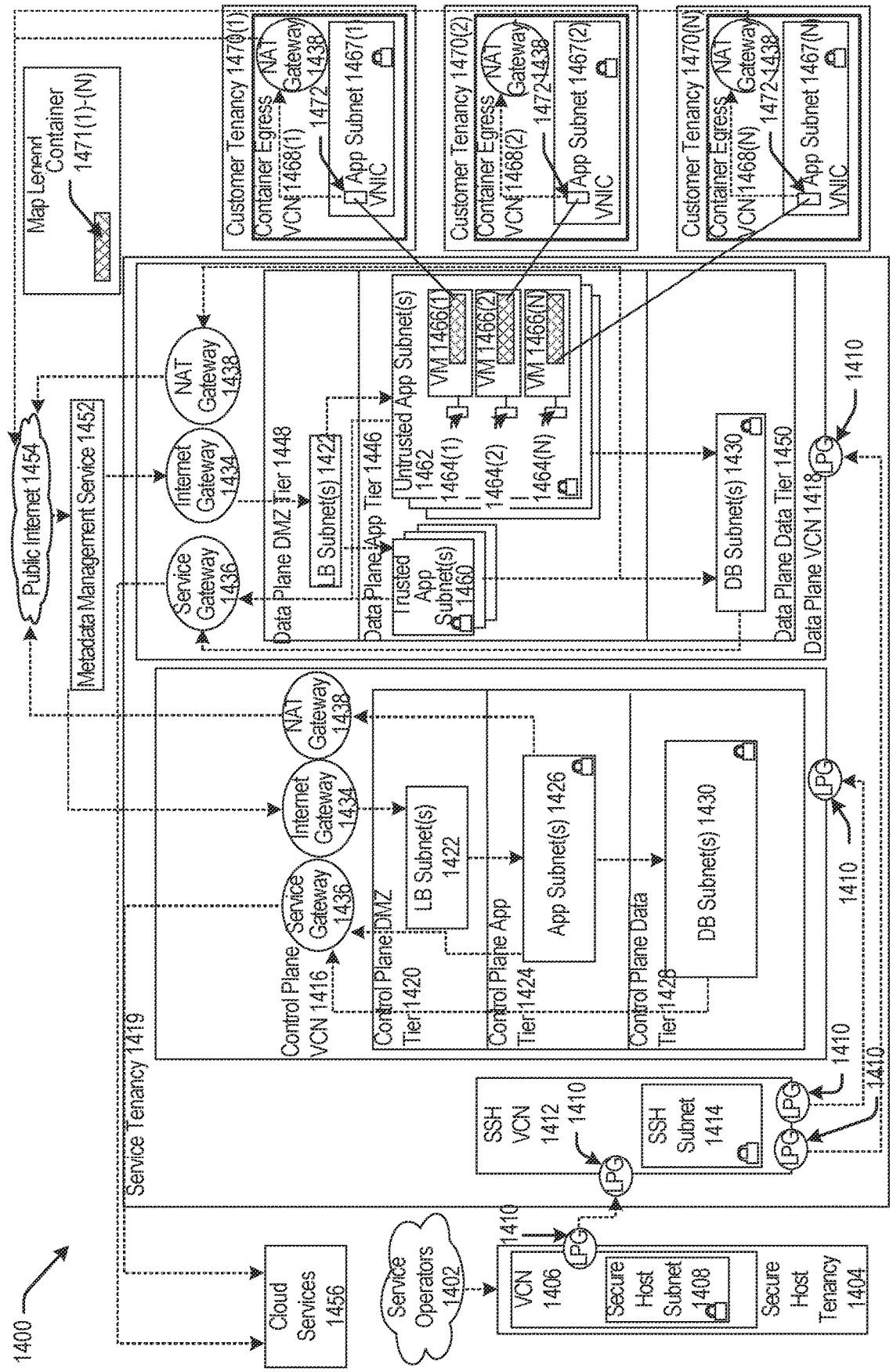
FIG. 14 is a block diagram illustrating another pattern for implementing a cloud infrastructure as a service system, according to at least one embodiment.

FIG. 14 is a block diagram 1400 illustrating another example pattern of an IaaS architecture, according to at least one embodiment. Service operators 1402 (e.g., service operators 1202 of FIG. 12) can be communicatively coupled to a secure host tenancy 1404 (e.g., the secure host tenancy 1204 of FIG. 12) that can include a virtual cloud network (VCN) 1406 (e.g., the VCN 1206 of FIG. 12) and a secure host subnet 1408 (e.g., the secure host subnet 1208 of FIG. 12). The VCN 1406 can include an LPG 1410 (e.g., the LPG 1210 of FIG. 12) that can be communicatively coupled to an SSH VCN 1412 (e.g., the SSH VCN 1212 of FIG. 12) via an LPG 1410 contained in the SSH VCN 1412. The SSH VCN 1412 can include an SSH subnet 1414 (e.g., the SSH subnet 1214 of FIG. 12), and the SSH VCN 1412 can be communicatively coupled to a control plane VCN 1416 (e.g. the control plane VCN 1216 of FIG. 12) via an LPG 1410 contained in the control plane VCN 1416 and to a data plane VCN 1418 (e.g. the data plane 1218 of FIG. 12) via an LPG 1410 contained in the data plane VCN 1418. The control plane VCN 1416 and the data plane VCN 1418 can be contained in a service tenancy 1419 (e.g., the service tenancy 1219 of FIG. 12).

The control plane VCN 1416 can include a control plane DMZ tier 1420 (e.g. the control plane DMZ tier 1220 of FIG. 12) that can include load balancer (LB) subnet(s) 1422 (e.g. LB subnet(s) 1222 of FIG. 12), a control plane app tier 1424 (e.g. the control plane app tier 1224 of FIG. 12) that can include app subnet(s) 1426 (e.g. similar to app subnet(s) 1226 of FIG. 12), a control plane data tier 1428 (e.g. the control plane data tier 1228 of FIG. 12) that can include DB subnet(s) 1430. The LB subnet(s) 1422 contained in the control plane DMZ tier 1420 can be communicatively coupled to the app subnet(s) 1426 contained in the control plane app tier 1424 and to an Internet gateway 1434 (e.g. the Internet gateway 1234 of FIG. 12) that can be contained in the control plane VCN 1416, and the app subnet(s) 1426 can be communicatively coupled to the DB subnet(s) 1430 contained in the control plane data tier 1428 and to a service gateway 1436 (e.g. the service gateway of FIG. 12) and a network address translation (NAT) gateway 1438 (e.g. the NAT gateway 1238 of FIG. 12). The control plane VCN 1416 can include the service gateway 1436 and the NAT gateway 1438.

The data plane VCN 1418 can include a data plane app tier 1446 (e.g., the data plane app tier 1246 of FIG. 12), a data plane DMZ tier 1448 (e.g., the data plane DMZ tier 1248 of FIG. 12), and a data plane data tier 1450 (e.g., the data plane data tier 1250 of FIG. 12). The data plane DMZ tier 1448 can include LB subnet(s) 1422 that can be communicatively coupled to trusted app subnet(s) 1460 and untrusted app subnet(s) 1462 of the data plane app tier 1446 and the Internet gateway 1434 contained in the data plane VCN 1418. The trusted app subnet(s) 1460 can be communicatively coupled to the service gateway 1436 contained in the data plane VCN 1418, the NAT gateway 1438 contained in the data plane VCN 1418, and DB subnet(s) 1430 contained in the data plane data tier 1450. The untrusted app subnet(s) 1462 can be communicatively coupled to the service gateway 1436 contained in the data plane VCN 1418 and DB subnet(s) 1430 contained in the data plane data tier 1450. The data plane data tier 1450 can include DB subnet(s) 1430 that can be communicatively coupled to the service gateway 1436 contained in the data plane VCN 1418.

The untrusted app subnet(s) 1462 can include one or more primary VNICs 1464(1)-(N) that can be communicatively coupled to tenant virtual machines (VMs) 1466(1)-(N). Each tenant VM 1466(1)-(N) can be communicatively coupled to a respective app subnet 1467(1)-(N) that can be contained in respective container egress VCNs 1468(1)-(N) that can be contained in respective customer tenancies 1470(1)-(N). Respective secondary VNICs 1472(1)-(N) can facilitate communication between the untrusted app subnet(s) 1462 contained in the data plane VCN 1418 and the app subnet contained in the container egress VCNs 1468(1)-(N). Each container egress VCNs 1468(1)-(N) can include a NAT gateway 1438 that can be communicatively coupled to public Internet 1454 (e.g., public Internet 1254 of FIG. 12).

The Internet gateway 1434 contained in the control plane VCN 1416 and contained in the data plane VCN 1418 can be communicatively coupled to a metadata management service 1452 (e.g., the metadata management system 1252 of FIG. 12) that can be communicatively coupled to public Internet 1454. Public Internet 1454 can be communicatively coupled to the NAT gateway 1438 contained in the control plane VCN 1416 and contained in the data plane VCN 1418. The service gateway 1436 contained in the control plane VCN 1416 and contained in the data plane VCN 1418 can be communicatively couple to cloud services 1456.

In some embodiments, the data plane VCN 1418 can be integrated with customer tenancies 1470. This integration can be useful or desirable for customers of the IaaS provider in some cases such as a case that may desire support when executing code. The customer may provide code to run that may be destructive, may communicate with other customer resources, or may otherwise cause undesirable effects. In response to this, the IaaS provider may determine whether to run code given to the IaaS provider by the customer.

In some examples, the customer of the IaaS provider may grant temporary network access to the IaaS provider and request a function to be attached to the data plane tier app 1446. Code to run the function may be executed in the VMs 1466(1)-(N), and the code may not be configured to run anywhere else on the data plane VCN 1418. Each VM 1466(1)-(N) may be connected to one customer tenancy 1470. Respective containers 1471(1)-(N) contained in the VMs 1466(1)-(N) may be configured to run the code. In this case, there can be a dual isolation (e.g., the containers 1471(1)-(N) running code, where the containers 1471(1)-(N) may be contained in at least the VM 1466(1)-(N) that are contained in the untrusted app subnet(s) 1462), which may help prevent incorrect or otherwise undesirable code from damaging the network of the IaaS provider or from damaging a network of a different customer. The containers 1471(1)-(N) may be communicatively coupled to the customer tenancy 1470 and may be configured to transmit or receive data from the customer tenancy 1470. The containers 1471(1)-(N) may not be configured to transmit or receive data from any other entity in the data plane VCN 1418. Upon completion of running the code, the IaaS provider may kill or otherwise dispose of the containers 1471(1)-(N).

In some embodiments, the trusted app subnet(s) 1460 may run code that may be owned or operated by the IaaS provider. In this embodiment, the trusted app subnet(s) 1460 may be communicatively coupled to the DB subnet(s) 1430 and be configured to execute CRUD operations in the DB subnet(s) 1430. The untrusted app subnet(s) 1462 may be communicatively coupled to the DB subnet(s) 1430, but in this embodiment, the untrusted app subnet(s) may be configured to execute read operations in the DB subnet(s) 1430. The containers 1471(1)-(N) that can be contained in the VM 1466(1)-(N) of each customer and that may run code from the customer may not be communicatively coupled with the DB subnet(s) 1430.

In other embodiments, the control plane VCN 1416 and the data plane VCN 1418 may not be directly communicatively coupled. In this embodiment, there may be no direct communication between the control plane VCN 1416 and the data plane VCN 1418. However, communication can occur indirectly through at least one method. An LPG 1410 may be established by the IaaS provider that can facilitate communication between the control plane VCN 1416 and the data plane VCN 1418. In another example, the control plane VCN 1416 or the data plane VCN 1418 can make a call to cloud services 1456 via the service gateway 1436. For example, a call to cloud services 1456 from the control plane VCN 1416 can include a request for a service that can communicate with the data plane VCN 1418.

Figure 15:
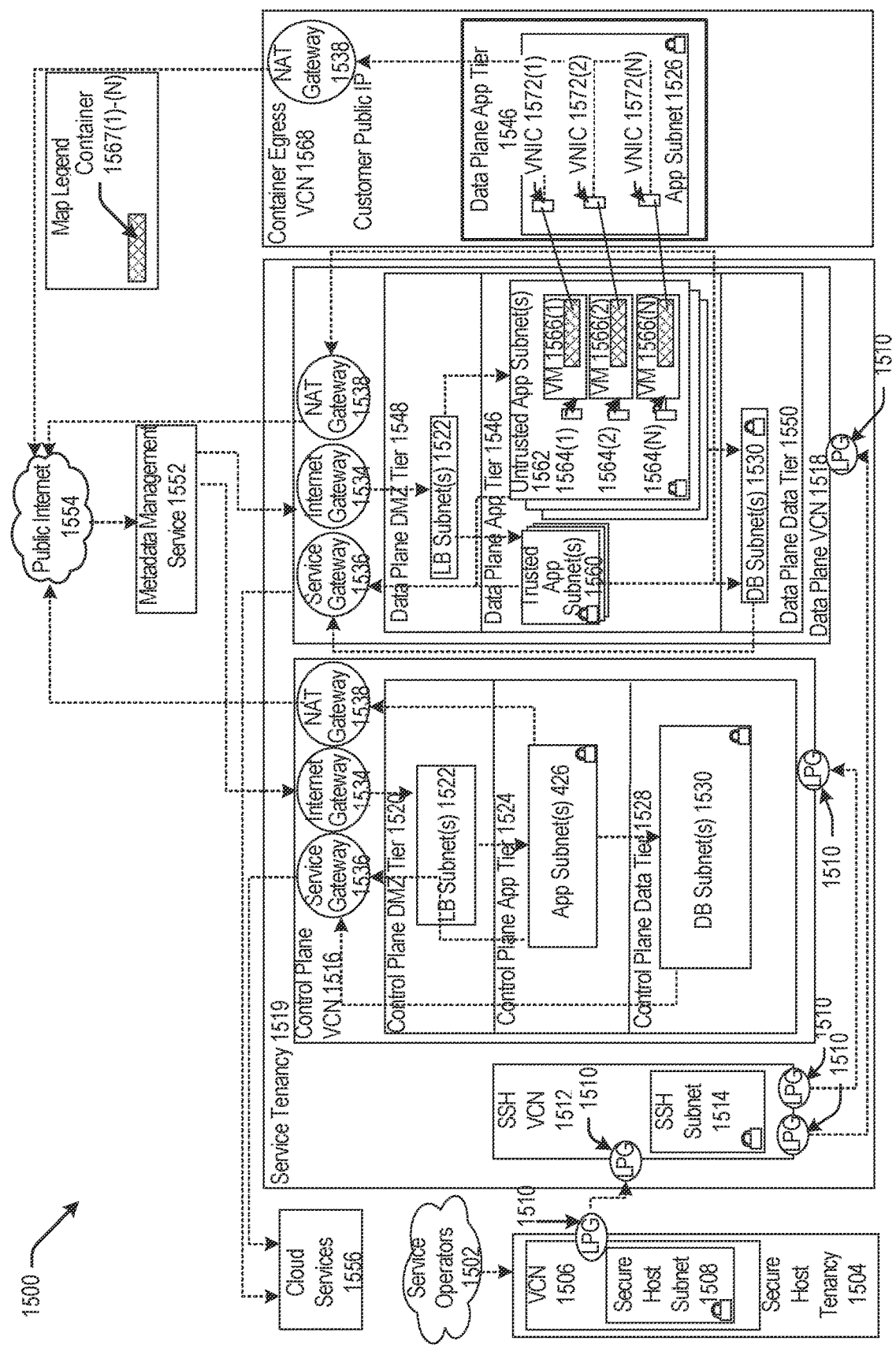
FIG. 15 is a block diagram illustrating another pattern for implementing a cloud infrastructure as a service system, according to at least one embodiment.

FIG. 15 is a block diagram 1500 illustrating another example pattern of an IaaS architecture, according to at least one embodiment. Service operators 1502 (e.g., service operators 1202 of FIG. 12) can be communicatively coupled to a secure host tenancy 1504 (e.g., the secure host tenancy 1204 of FIG. 12) that can include a virtual cloud network (VCN) 1506 (e.g., the VCN 1206 of FIG. 12) and a secure host subnet 1508 (e.g., the secure host subnet 1208 of FIG. 12). The VCN 1506 can include an LPG 1510 (e.g., the LPG 1210 of FIG. 12) that can be communicatively coupled to an SSH VCN 1512 (e.g., the SSH VCN 1212 of FIG. 12) via an LPG 1510 contained in the SSH VCN 1512. The SSH VCN 1512 can include an SSH subnet 1514 (e.g., the SSH subnet 1214 of FIG. 12), and the SSH VCN 1512 can be communicatively coupled to a control plane VCN 1516 (e.g. the control plane VCN 1216 of FIG. 12) via an LPG 1510 contained in the control plane VCN 1516 and to a data plane VCN 1518 (e.g. the data plane 1218 of FIG. 12) via an LPG 1510 contained in the data plane VCN 1518. The control plane VCN 1516 and the data plane VCN 1518 can be contained in a service tenancy 1519 (e.g., the service tenancy 1219 of FIG. 12).

The control plane VCN 1516 can include a control plane DMZ tier 1520 (e.g. the control plane DMZ tier 1220 of FIG. 12) that can include LB subnet(s) 1522 (e.g. LB subnet(s) 1222 of FIG. 12), a control plane app tier 1524 (e.g. the control plane app tier 1224 of FIG. 12) that can include app subnet(s) 1526 (e.g. app subnet(s) 1226 of FIG. 12), a control plane data tier 1528 (e.g. the control plane data tier 1228 of FIG. 12) that can include DB subnet(s) 1530 (e.g. DB subnet(s) 1430 of FIG. 14). The LB subnet(s) 1522 contained in the control plane DMZ tier 1520 can be communicatively coupled to the app subnet(s) 1526 contained in the control plane app tier 1524 and to an Internet gateway 1534 (e.g. the Internet gateway 1234 of FIG. 12) that can be contained in the control plane VCN 1516, and the app subnet(s) 1526 can be communicatively coupled to the DB subnet(s) 1530 contained in the control plane data tier 1528 and to a service gateway 1536 (e.g. the service gateway of FIG. 12) and a network address translation (NAT) gateway 1538 (e.g. the NAT gateway 1238 of FIG. 12). The control plane VCN 1516 can include the service gateway 1536 and the NAT gateway 1538.

The data plane VCN 1518 can include a data plane app tier 1546 (e.g., the data plane app tier 1246 of FIG. 12), a data plane DMZ tier 1548 (e.g., the data plane DMZ tier 1248 of FIG. 12), and a data plane data tier 1550 (e.g., the data plane data tier 1250 of FIG. 12). The data plane DMZ tier 1548 can include LB subnet(s) 1522 that can be communicatively coupled to trusted app subnet(s) 1560 (e.g., trusted app subnet(s) 1460 of FIG. 14) and untrusted app subnet(s) 1562 (e.g. untrusted app subnet(s) 1462 of FIG. 14) of the data plane app tier 1546 and the Internet gateway 1534 contained in the data plane VCN 1518. The trusted app subnet(s) 1560 can be communicatively coupled to the service gateway 1536 contained in the data plane VCN 1518, the NAT gateway 1538 contained in the data plane VCN 1518, and DB subnet(s) 1530 contained in the data plane data tier 1550. The untrusted app subnet(s) 1562 can be communicatively coupled to the service gateway 1536 contained in the data plane VCN 1518 and DB subnet(s) 1530 contained in the data plane data tier 1550. The data plane data tier 1550 can include DB subnet(s) 1530 that can be communicatively coupled to the service gateway 1536 contained in the data plane VCN 1518.

The untrusted app subnet(s) 1562 can include primary VNICs 1564(1)-(N) that can be communicatively coupled to tenant virtual machines (VMs) 1566(1)-(N) residing within the untrusted app subnet(s) 1562. Each tenant VM 1566(1)-(N) can run code in a respective container 1567(1)-(N) and be communicatively coupled to an app subnet 1526 that can be contained in a data plane app tier 1546 that can be contained in a container egress VCN 1568. Respective secondary VNICs 1572(1)-(N) can facilitate communication between the untrusted app subnet(s) 1562 contained in the data plane VCN 1518 and the app subnet contained in the container egress VCN 1568. The container egress VCN can include a NAT gateway 1538 that can be communicatively coupled to public Internet 1554 (e.g., public Internet 1254 of FIG. 12).

The Internet gateway 1534 contained in the control plane VCN 1516 and contained in the data plane VCN 1518 can be communicatively coupled to a metadata management service 1552 (e.g., the metadata management system 1252 of FIG. 12) that can be communicatively coupled to public Internet 1554. Public Internet 1554 can be communicatively coupled to the NAT gateway 1538 contained in the control plane VCN 1516 and contained in the data plane VCN 1518. The service gateway 1536 contained in the control plane VCN 1516 and contained in the data plane VCN 1518 can be communicatively couple to cloud services 1556.

In some examples, the pattern illustrated by the architecture of block diagram 1500 of FIG. 15 may be considered an exception to the pattern illustrated by the architecture of block diagram 1400 of FIG. 14 and may be desirable for a customer of the IaaS provider if the IaaS provider cannot directly communicate with the customer (e.g., a disconnected region). The respective containers 1567(1)-(N) that are contained in the VMs 1566(1)-(N) for each customer can be accessed in real-time by the customer. The containers 1567(1)-(N) may be configured to make calls to respective secondary VNICs 1572(1)-(N) contained in app subnet(s) 1526 of the data plane app tier 1546 that can be contained in the container egress VCN 1568. The secondary VNICs 1572(1)-(N) can transmit the calls to the NAT gateway 1538 that may transmit the calls to public Internet 1554. In this example, the containers 1567(1)-(N) that can be accessed in real-time by the customer can be isolated from the control plane VCN 1516 and can be isolated from other entities contained in the data plane VCN 1518. The containers 1567(1)-(N) may also be isolated from resources from other customers.

In other examples, the customer can use the containers 1567(1)-(N) to call cloud services 1556. In this example, the customer may run code in the containers 1567(1)-(N) that requests a service from cloud services 1556. The containers 1567(1)-(N) can transmit this request to the secondary VNICs 1572(1)-(N) that can transmit the request to the NAT gateway that can transmit the request to public Internet 1554. Public Internet 1554 can transmit the request to LB subnet(s) 1522 contained in the control plane VCN 1516 via the Internet gateway 1534. In response to determining the request is valid, the LB subnet(s) can transmit the request to app subnet(s) 1526 that can transmit the request to cloud services 1556 via the service gateway 1536.

It should be appreciated that IaaS architectures 1200, 1300, 1400, 1500 depicted in the figures may have other components than those depicted. Further, the embodiments shown in the figures are only some examples of a cloud infrastructure system that may incorporate an embodiment of the disclosure. In some other embodiments, the IaaS systems may have more or fewer components than shown in the figures, may combine two or more components, or may have a different configuration or arrangement of components.

In certain embodiments, the IaaS systems described herein may include a suite of applications, middleware, and database service offerings that are delivered to a customer in a self-service, subscription-based, elastically scalable, reliable, highly available, and secure manner. An example of such an IaaS system is the Oracle Cloud Infrastructure (OCI) provided by the present assignee.

Figure 16:
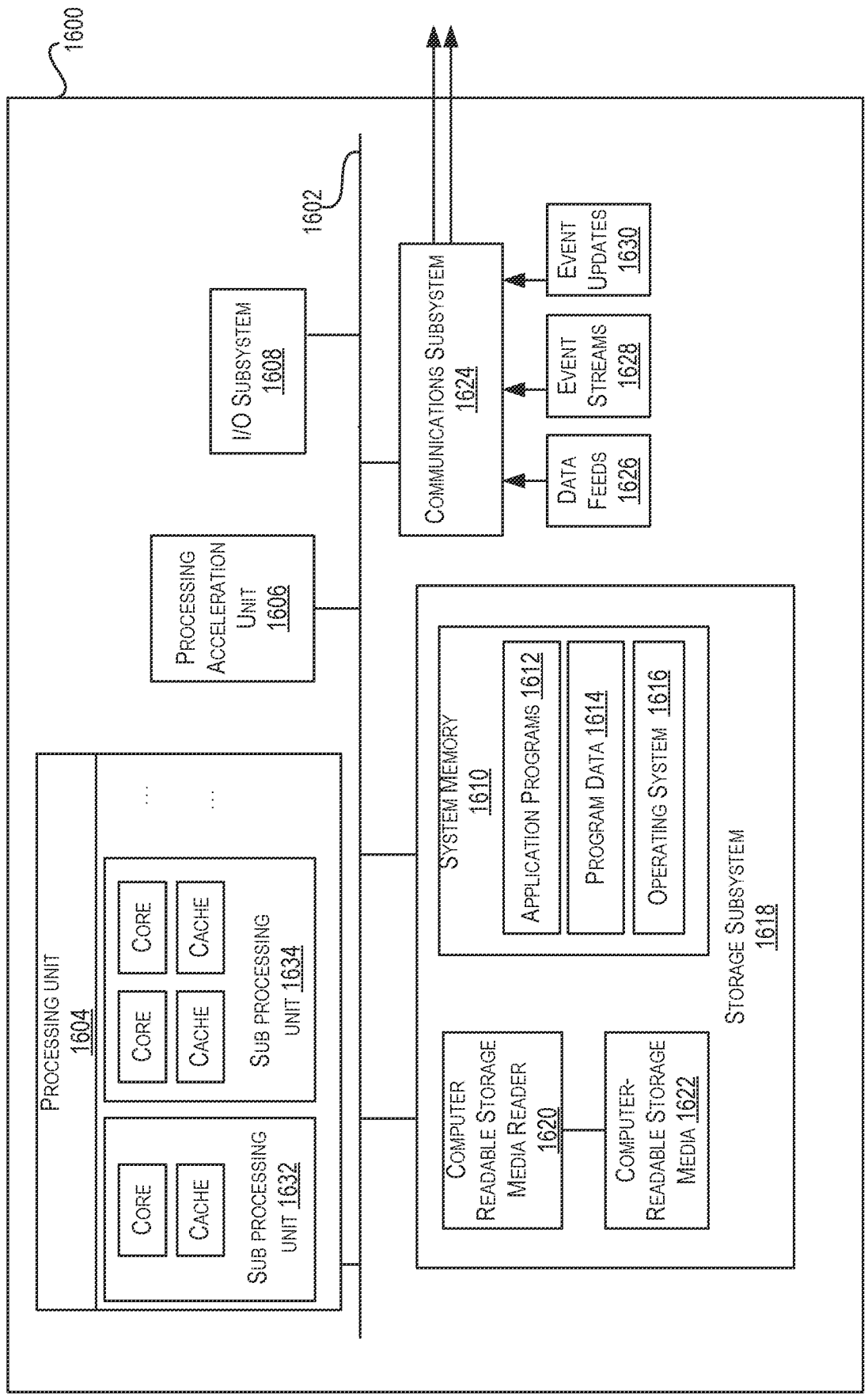
FIG. 16 is a block diagram illustrating an example computer system, according to at least one embodiment.

FIG. 16 illustrates an example computer system 1600, in which various embodiments may be implemented. The system 1600 may be used to implement any of the computer systems described above. As shown in the figure, computer system 1600 includes a processing unit 1604 that communicates with a number of peripheral subsystems via a bus subsystem 1602. These peripheral subsystems may include a processing acceleration unit 1606, and I/O subsystem 1608, a storage sub system 1618 and a communications sub system 1624. Storage sub system 1618 includes tangible computer-readable storage media 1622 and a system memory 1610.

Bus subsystem 1602 provides a mechanism for letting the various components and subsystems of computer system 1600 communicate with each other as intended. Although bus subsystem 1602 is shown schematically as a single bus, alternative embodiments of the bus subsystem may utilize multiple buses. Bus subsystem 1602 may be any of several types of bus structures including a memory bus or memory controller, a peripheral bus, and a local bus using any of a variety of bus architectures. For example, such architectures may include an Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus, which can be implemented as a Mezzanine bus manufactured to the IEEE P1386.1 standard.

Processing unit 1604, which can be implemented as one or more integrated circuits (e.g., a conventional microprocessor or microcontroller), controls the operation of computer system 1600. One or more processors may be included in processing unit 1604. These processors may include single core or multicore processors. In certain embodiments, processing unit 1604 may be implemented as one or more independent processing units 1632 and/or 1634 with single or multicore processors included in each processing unit. In other embodiments, processing unit 1604 may also be implemented as a quad-core processing unit formed by integrating two dual-core processors into a single chip.

In various embodiments, processing unit 1604 can execute a variety of programs in response to program code and can maintain multiple concurrently executing programs or processes. At any given time, some or all of the program code to be executed can be resident in processor(s) 1604 and/or in storage subsystem 1618. Through suitable programming, processor(s) 1604 can provide various functionalities described above. Computer system 1600 may additionally include a processing acceleration unit 1606, which can include a digital signal processor (DSP), a special-purpose processor, and/or the like.

I/O subsystem 1608 may include user interface input devices and user interface output devices. User interface input devices may include a keyboard, pointing devices such as a mouse or trackball, a touchpad or touch screen incorporated into a display, a scroll wheel, a click wheel, a dial, a button, a switch, a keypad, audio input devices with voice command recognition systems, microphones, and other types of input devices. User interface input devices may include, for example, motion sensing and/or gesture recognition devices such as the Microsoft Kinect® motion sensor that enables users to control and interact with an input device, such as the Microsoft Xbox® 360 game controller, through a natural user interface using gestures and spoken commands. User interface input devices may also include eye gesture recognition devices such as the Google Glass® blink detector that detects eye activity (e.g., 'blinking' while taking pictures and/or making a menu selection) from users and transforms the eye gestures as input into an input device (e.g., Google Glass®). Additionally, user interface input devices may include voice recognition sensing devices that enable users to interact with voice recognition systems (e.g., Siri® navigator), through voice commands.

User interface input devices may also include, without limitation, three dimensional (3D) mice, joysticks or pointing sticks, gamepads and graphic tablets, and audio/visual devices such as speakers, digital cameras, digital camcorders, portable media players, webcams, image scanners, fingerprint scanners, barcode reader 3D scanners, 3D printers, laser rangefinders, and eye gaze tracking devices. Additionally, user interface input devices may include, for example, medical imaging input devices such as computed tomography, magnetic resonance imaging, position emission tomography, medical ultrasonography devices. User interface input devices may also include, for example, audio input devices such as MIDI keyboards, digital musical instruments and the like.

User interface output devices may include a display subsystem, indicator lights, or non-visual displays such as audio output devices, etc. The display subsystem may be a cathode ray tube (CRT), a flat-panel device, such as that using a liquid crystal display (LCD) or plasma display, a projection device, a touch screen, and the like. In general, use of the term "output device" is intended to include all possible types of devices and mechanisms for outputting information from computer system 1600 to a user or other computer. For example, user interface output devices may include, without limitation, a variety of display devices that visually convey text, graphics and audio/video information such as monitors, printers, speakers, headphones, automotive navigation systems, plotters, voice output devices, and modems.

Computer system 1600 may comprise a storage subsystem 1618 that comprises software elements, shown as being currently located within a system memory 1610. System memory 1610 may store program instructions that are loadable and executable on processing unit 1604, as well as data generated during the execution of these programs.

Depending on the configuration and type of computer system 1600, system memory 1610 may be volatile (such as random-access memory (RAM)) and/or non-volatile (such as read-only memory (ROM), flash memory, etc.) The RAM typically contains data and/or program modules that are immediately accessible to and/or presently being operated and executed by processing unit 1604. In some implementations, system memory 1610 may include multiple different types of memory, such as static random-access memory (SRAM) or dynamic random-access memory (DRAM). In some implementations, a basic input/output system (BIOS), containing the basic routines that help to transfer information between elements within computer system 1600, such as during start-up, may typically be stored in the ROM. By way of example, and not limitation, system memory 1610 also illustrates application programs 1612, which may include client applications, Web browsers, mid-tier applications, relational database management systems (RDBMS), etc., program data 1614, and an operating system 1616. By way of example, operating system 1616 may include various versions of Microsoft Windows®, Apple Macintosh®, and/or Linux operating systems, a variety of commercially available UNIX® or UNIX-like operating systems (including without limitation the variety of GNU/Linux operating systems, the Google Chrome® OS, and the like) and/or mobile operating systems such as iOS, Windows® Phone, Android® OS, BlackBerry® 16 OS, and Palm® OS operating systems.

Storage subsystem 1618 may also provide a tangible computer-readable storage medium for storing the basic programming and data constructs that provide the functionality of some embodiments. Software (programs, code modules, instructions) that when executed by a processor provide the functionality described above may be stored in storage subsystem 1618. These software modules or instructions may be executed by processing unit 1604. Storage subsystem 1618 may also provide a repository for storing data used in accordance with the present disclosure.

Storage subsystem 1600 may also include a computer-readable storage media reader 1620 that can further be connected to computer-readable storage media 1622. Together and optionally, in combination with system memory 1610, computer-readable storage media 1622 may comprehensively represent remote, local, fixed, and/or removable storage devices plus storage media for temporarily and/or more permanently containing, storing, transmitting, and retrieving computer-readable information.

Computer-readable storage media 1622 containing code, or portions of code, can also include any appropriate media known or used in the art, including storage media and communication media, such as but not limited to, volatile and non-volatile, removable and non-removable media implemented in any method or technology for storage and/or transmission of information. This can include tangible computer-readable storage media such as RAM, ROM, electronically erasable programmable ROM (EEPROM), flash memory or other memory technology, CD-ROM, digital versatile disk (DVD), or other optical storage, magnetic cassettes, magnetic tape, magnetic disk storage or other magnetic storage devices, or other tangible computer readable media. This can also include nontangible computer-readable media, such as data signals, data transmissions, or any other medium which can be used to transmit the desired information, and which can be accessed by computing system 1600.

By way of example, computer-readable storage media 1622 may include a hard disk drive that reads from or writes to non-removable, nonvolatile magnetic media, a magnetic disk drive that reads from or writes to a removable, non-volatile magnetic disk, and an optical disk drive that reads from or writes to a removable, nonvolatile optical disk such as a CD ROM, DVD, and Blu-Ray® disk, or other optical media. Computer-readable storage media 1622 may include, but is not limited to, Zip® drives, flash memory cards, universal serial bus (USB) flash drives, secure digital (SD) cards, DVD disks, digital video tape, and the like. Computer-readable storage media 1622 may also include, solid-state drives (SSD) based on non-volatile memory such as flash-memory based SSDs, enterprise flash drives, solid state ROM, and the like, SSDs based on volatile memory such as solid-state RAM, dynamic RAM, static RAM, DRAM-based SSDs, magneto resistive RAM (MRAM) SSDs, and hybrid SSDs that use a combination of DRAM and flash memory based SSDs. The disk drives and their associated computer-readable media may provide non-volatile storage of computer-readable instructions, data structures, program modules, and other data for computer system 1600.

Communications subsystem 1624 provides an interface to other computer systems and networks. Communications subsystem 1624 serves as an interface for receiving data from and transmitting data to other systems from computer system 1600. For example, communications subsystem 1624 may enable computer system 1600 to connect to one or more devices via the Internet. In some embodiments communications subsystem 1624 can include radio frequency (RF) transceiver components for accessing wireless voice and/or data networks (e.g., using cellular telephone technology, advanced data network technology, such as 3G, 4G or EDGE (enhanced data rates for global evolution), Wi-Fi (IEEE 802.11 family standards, or other mobile communication technologies, or any combination thereof), global positioning system (GPS) receiver components, and/or other components. In some embodiments communications subsystem 1624 can provide wired network connectivity (e.g., Ethernet) in addition to or instead of a wireless interface.

In some embodiments, communications subsystem 1624 may also receive input communication in the form of structured and/or unstructured data feeds 1626, event streams 1628, event updates 1630, and the like on behalf of one or more users who may use computer system 1600.

By way of example, communications subsystem 1624 may be configured to receive data feeds 1626 in real-time from users of social networks and/or other communication services such as Twitter® feeds, Facebook® updates, web feeds such as Rich Site Summary (RSS) feeds, and/or real-time updates from one or more third party information sources.

Additionally, communications subsystem 1624 may also be configured to receive data in the form of continuous data streams, which may include event streams 1628 of real-time events and/or event updates 1630 that may be continuous or unbounded in nature with no explicit end. Examples of applications that generate continuous data may include, for example, sensor data applications, financial tickers, network performance measuring tools (e.g., network monitoring and traffic management applications), clickstream analysis tools, automobile traffic monitoring, and the like.

Communications subsystem 1624 may also be configured to output the structured and/or unstructured data feeds 1626, event streams 1628, event updates 1630, and the like to one or more databases that may be in communication with one or more streaming data source computers coupled to computer system 1600.

Computer system 1600 can be one of various types, including a handheld portable device (e.g., an iPhone® cellular phone, an iPad® computing tablet, a PDA), a wearable device (e.g., a Google Glass® head mounted display), a PC, a workstation, a mainframe, a kiosk, a server rack, or any other data processing system.

Due to the ever-changing nature of computers and networks, the description of computer system 1600 depicted in the figure is intended only as a specific example. Many other configurations having more or fewer components than the system depicted in the figure are possible. For example, customized hardware might also be used and/or particular elements might be implemented in hardware, firmware, software (including applets), or a combination. Further, connection to other computing devices, such as network input/output devices, may be employed. Based on the disclosure and teachings provided herein, a person of ordinary skill in the art will appreciate other ways and/or methods to implement the various embodiments.

Although specific embodiments have been described, various modifications, alterations, alternative constructions, and equivalents are also encompassed within the scope of the disclosure. Embodiments are not restricted to operation within certain specific data processing environments but are free to operate within a plurality of data processing environments. Additionally, although embodiments have been described using a particular series of transactions and steps, it should be apparent to those skilled in the art that the scope of the present disclosure is not limited to the described series of transactions and steps. Various features and aspects of the above-described embodiments may be used individually or jointly.

Further, while embodiments have been described using a particular combination of hardware and software, it should be recognized that other combinations of hardware and software are also within the scope of the present disclosure. Embodiments may be implemented only in hardware, or only in software, or using combinations thereof. The various processes described herein can be implemented on the same processor or different processors in any combination. Accordingly, where components or modules are described as being configured to perform certain operations, such configuration can be accomplished, e.g., by designing electronic circuits to perform the operation, by programming programmable electronic circuits (such as microprocessors) to perform the operation, or any combination thereof. Processes can communicate using a variety of techniques including but not limited to conventional techniques for inter process communication, and different pairs of processes may use different techniques, or the same pair of processes may use different techniques at different times.

The specification and drawings are, accordingly, to be regarded in an illustrative rather than a restrictive sense. It will, however, be evident that additions, subtractions, deletions, and other modifications and changes may be made thereunto without departing from the broader spirit and scope as set forth in the claims. Thus, although specific disclosure embodiments have been described, these are not intended to be limiting. Various modifications and equivalents are within the scope of the following claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments and does not pose a limitation on the scope of the disclosure unless otherwise claimed. No language in the specification should be construed as indicating any non-claimed element as essential to the practice of the disclosure.

Disjunctive language such as the phrase "at least one of X, Y, or Z," unless specifically stated otherwise, is intended to be understood within the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Preferred embodiments of this disclosure are described herein, including the best mode known for carrying out the disclosure. Variations of those preferred embodiments may become apparent to those of ordinary skill in the art upon reading the foregoing description. Those of ordinary skill should be able to employ such variations as appropriate and the disclosure may be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein.

All references, including publications, patent applications, and patents, cited herein are hereby incorporated by reference to the same extent as if each reference were individually and specifically indicated to be incorporated by reference and were set forth in its entirety herein. In the foregoing specification, aspects of the disclosure are described with reference to specific embodiments thereof, but those skilled in the art will recognize that the disclosure is not limited thereto. Various features and aspects of the above-described disclosure may be used individually or jointly. Further, embodiments can be utilized in any number of environments and applications beyond those described herein without departing from the broader spirit and scope of the specification. The specification and drawings are, accordingly, to be regarded as illustrative rather than restrictive.

What is claimed is:

1. A method comprising:
receiving, by a multi-cloud infrastructure included in a first cloud environment, a request from a user associated with an account in a second cloud environment, the request requesting a signup of the user with respect to a service provided by the multi-cloud infrastructure, and including metadata information associated with the user;

responsive to determining, based on the metadata information, that a set of pre-requisite resources is not configured in the second cloud environment for the user, transmitting by the multi-cloud infrastructure, a notification to the user, the notification indicating that the set of pre-requisite resources is to be configured in the second cloud environment;

validating, by the multi-cloud infrastructure, the set of pre-requisite resources and a user setup configured in the second cloud environment; and creating, by the multi-cloud infrastructure, a link resource object that includes information linking a tenancy of the user in the first cloud environment to the account of the user in the second cloud environment, the link resource object enabling the user to utilize the service provided by the multi-cloud infrastructure.

2. The method of claim 1, wherein a first cloud infrastructure of the first cloud environment is provided by a first cloud services provider (CSP), and a second cloud infrastructure corresponding to the second cloud environment is provided by a second CSP that is different from the first CSP, the first cloud environment being different than the second cloud environment.

3. The method of claim 1, wherein the metadata information included in the request includes an identifier of the account of the user in the second cloud environment or an email address of the user.

4. The method of claim 1, wherein the set of pre-requisite resources includes a hierarchy of resources, each resource in the hierarchy of resources being associated with a respective role.

5. The method of claim 4, wherein a hierarchy of roles associated with the hierarchy of resources includes a networking role, an observability role, and a validator role, and wherein the networking role permits creation of a network link between the first cloud environment and the second cloud environment, the observability role permits an observability module included in the multi-cloud infrastructure to publish data associated with resources deployed in the first cloud environment to the second cloud environment, and the validator role permits a control plane of the multi-cloud infrastructure to perform user validation.

6. The method of claim 1, wherein the user setup includes data corresponding to: (i) an identifier of a pool of users in the second cloud environment, and (ii) membership information indicating that the user is a member of the pool of users.

7. The method of claim 1, further comprising:
obtaining, by the multi-cloud infrastructure, an access token from the second cloud environment in response to the user successfully configuring the set of pre-requisite resources in the second cloud environment; and triggering, by the multi-cloud infrastructure, a cloud-link adaptor to execute the creating.

8. The method of claim 1, wherein the request from the user is received by a signup API associated with a multi-cloud console of the multi-cloud infrastructure.

9. The method of claim 1, further comprising:
creating, by the multi-cloud infrastructure, a network link that communicatively couples the tenancy of the user in the first cloud environment to the account of the user in the second cloud environment.

10. The method of claim 1, wherein the service is one of: an Exa-database service, a shared-autonomous database service, a dedicated-autonomous database service, or a virtual machine database service.

11. One or more computer readable non-transitory media storing computer-executable instructions that, when executed by one or more processors, cause:

receiving, by a multi-cloud infrastructure included in a first cloud environment, a request from a user associated with an account in a second cloud environment, the request requesting a signup of the user with respect to a service provided by the multi-cloud infrastructure, and including metadata information associated with the user;

responsive to determining, based on the metadata information, that a set of pre-requisite resources is not configured in the second cloud environment for the user, transmitting by the multi-cloud infrastructure, a notification to the user, the notification indicating that the set of pre-requisite resources is to be configured in the second cloud environment;

validating, by the multi-cloud infrastructure, the set of pre-requisite resources and a user setup configured in the second cloud environment; and creating, by the multi-cloud infrastructure, a link resource object that includes information linking a tenancy of the user in the first cloud environment to the account of the user in the second cloud environment, the link resource object enabling the user to utilize the service provided by the multi-cloud infrastructure.

12. The one or more computer readable non-transitory media storing computer-executable instructions of claim 11, wherein a first cloud infrastructure of the first cloud environment is provided by a first cloud services provider (CSP), and a second cloud infrastructure corresponding to the second cloud environment is provided by a second CSP that is different from the first CSP, the first cloud environment being different than the second cloud environment.

13. The one or more computer readable non-transitory media storing computer-executable instructions of claim 11, wherein the metadata information included in the request includes an identifier of the account of the user in the second cloud environment or an email address of the user.

14. The one or more computer readable non-transitory media storing computer-executable instructions of claim 11, wherein the set of pre-requisite resources includes a hierarchy of resources, each resource in the hierarchy of resources being associated with a respective role.

15. The one or more computer readable non-transitory media storing computer-executable instructions of claim 14, wherein a hierarchy of roles associated with the hierarchy of resources includes a networking role, an observability role, and a validator role, and wherein the networking role permits creation of a network link between the first cloud environment and the second cloud environment, the observability role permits an observability module included in the multi-cloud infrastructure to publish data associated with resources deployed in the first cloud environment to the second cloud environment, and the validator role permits a control plane of the multi-cloud infrastructure to perform user validation.

16. The one or more computer readable non-transitory media storing computer-executable instructions of claim 11, wherein the user setup includes data corresponding to: (i) an identifier of a pool of users in the second cloud environment, and (ii) membership information indicating that the user is a member of the pool of users.

17. The one or more computer readable non-transitory media storing computer-executable instructions of claim 11, further comprising:
obtaining, by the multi-cloud infrastructure, an access token from the second cloud environment in response to the user successfully configuring the set of pre-requisite resources in the second cloud environment; and
triggering, by the multi-cloud infrastructure, a cloud-link adaptor to execute the creating.

18. The one or more computer readable non-transitory media storing computer-executable instructions of claim 11, wherein the request from the user is received by a signup API associated with a multi-cloud console of the multi-cloud infrastructure.

19. The one or more computer readable non-transitory media storing computer-executable instructions of claim 11, further comprising:
creating, by the multi-cloud infrastructure, a network link that communicatively couples the tenancy of the user in the first cloud environment to the account of the user in the second cloud environment.

20. A computing device comprising:
one or more processors; and
a memory including instructions that, when executed with the one or more processors, cause the computing device to, at least:
receive, by a multi-cloud infrastructure included in a first cloud environment, a request from a user associated with an account in a second cloud environment, the request requesting a signup of the user with respect to a service provided by the multi-cloud infrastructure, and including metadata information associated with the user;
responsive to determining, based on the metadata information, that a set of pre-requisite resources is not configured in the second cloud environment for the user, transmit by the multi-cloud infrastructure, a notification to the user, the notification indicating that the set of pre-requisite resources is to be configured in the second cloud environment;
validate, by the multi-cloud infrastructure, the set of pre-requisite resources and a user setup configured in the second cloud environment; and
create, by the multi-cloud infrastructure, a link resource object that includes information linking a tenancy of the user in the first cloud environment to the account of the user in the second cloud environment, the link resource object enabling the user to utilize the service provided by the multi-cloud infrastructure.

* * * * *